US012579183B2

(12) United States Patent
Butts et al.

(10) Patent No.: US 12,579,183 B2
(45) Date of Patent: Mar. 17, 2026

(54) SYSTEMS AND METHODS FOR MAINTAINING DISTRIBUTED MEDIA CONTENT HISTORY AND PREFERENCES

(71) Applicant: Sonos, Inc., Goleta, CA (US)

(72) Inventors: Christopher D. Butts, Wilmette, IL (US); Ryan Michael Bello, Sammamish, WA (US); Dayn Wilberding, Portland, OR (US); Matthew Benatan, Stockport (GB); Kurt Thomas Soto, Ventura, CA (US); Ian Ward Frank, Arlington, TX (US); Daniel Jones, London (GB); James A. Nesfield, Edinburgh (GB); Gershon Dublon, London (GB)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 19/188,886

(22) Filed: Apr. 24, 2025

(65) Prior Publication Data

US 2025/0265287 A1 Aug. 21, 2025

Related U.S. Application Data

(63) Continuation of application No. PCT/US2024/039870, filed on Jul. 26, 2024.
(Continued)

(51) Int. Cl.
*G06F 16/435* (2019.01)
*G06F 3/16* (2006.01)
(Continued)

(52) U.S. Cl.
CPC ............ *G06F 16/435* (2019.01); *G06F 3/165* (2013.01); *G06F 16/438* (2019.01); *G10L 15/22* (2013.01);
(Continued)

(58) Field of Classification Search
CPC ............................ G06F 16/435; G06F 16/438
(Continued)

(56) References Cited

U.S. PATENT DOCUMENTS 9,116,928 B1    8/2015  Maennel
9,122,752 B2    9/2015  Bill
(Continued)

FOREIGN PATENT DOCUMENTS

CN        113379875 A    9/2021
EP          1876583 A1    1/2008
(Continued)

OTHER PUBLICATIONS

International Search Report and Written Opinion mailed May 21, 2024; International Application No. PCT/US2023/066776; 16 pages.
(Continued)

*Primary Examiner* — Kimberly L Wilson
(74) *Attorney, Agent, or Firm* — Fortem IP LLP

(57) ABSTRACT

Distributed media content history and preferences can be stored and maintained by media playback systems including one or more blockchain-capable playback devices. Content record sets, such as content experience record sets and content network record sets, can be stored via distributed ledgers and updated at least in part based on media consumption events performed or detected by playback devices, service providers, or other participants. Such distributed data can also be accessed to facilitate playback of media content for particular users, devices, households, or environments.

29 Claims, 17 Drawing Sheets

Related U.S. Application Data

(60) Provisional application No. 63/589,762, filed on Oct. 12, 2023, provisional application No. 63/516,343, filed on Jul. 28, 2023.

(51) Int. Cl.

| | |
|---|---|
| *G06F 16/438* | (2019.01) |
| *G10L 15/22* | (2006.01) |
| *G10L 15/30* | (2013.01) |

(52) U.S. Cl.
CPC ........ *G10L 2015/223* (2013.01); *G10L 15/30* (2013.01)

(58) Field of Classification Search
USPC ........................................................ 707/722
See application file for complete search history.

(56) References Cited

U.S. PATENT DOCUMENTS

| | | | |
|---|---|---|---|
| 9,167,388 | B2 | 10/2015 | Varoglu et al. |
| 10,176,309 | B2 | 1/2019 | Tormasov et al. |
| 11,063,759 | B2 | 7/2021 | Kocsis et al. |
| 11,076,035 | B2 | 7/2021 | Lambourne et al. |
| 11,197,117 | B2 | 12/2021 | Reilly et al. |
| 11,240,563 | B1 | 2/2022 | Samarthyam et al. |
| 11,403,510 | B2 | 8/2022 | Mathur et al. |
| 11,483,361 | B2 | 10/2022 | Scott et al. |
| 11,627,412 | B2 | 4/2023 | Filson et al. |
| 11,669,296 | B2 | 6/2023 | Cassidy et al. |
| 11,756,541 | B1 | 9/2023 | Mrani et al. |
| 11,924,524 | B2 | 3/2024 | Thompson |
| 12,167,062 | B2 | 12/2024 | Wilberding et al. |
| 12,259,962 | B1 * | 3/2025 | Warnick .................. G06F 21/45 |
| 12,361,048 | B2 | 7/2025 | Wilberding et al. |
| 2002/0143643 | A1 | 10/2002 | Catan |
| 2003/0195851 | A1 | 10/2003 | Ong |
| 2008/0090524 | A1 | 4/2008 | Lee et al. |
| 2008/0130886 | A1 | 6/2008 | Kocher et al. |
| 2013/0086173 | A1 | 4/2013 | Kim |
| 2016/0231981 | A1 | 8/2016 | Lin et al. |
| 2017/0054778 | A1 | 2/2017 | Tornielli |
| 2018/0293553 | A1 | 10/2018 | Dembo et al. |
| 2019/0155840 | A1 | 5/2019 | O'konski et al. |
| 2019/0158552 | A1 | 5/2019 | Robbin et al. |
| 2019/0174190 | A1 | 6/2019 | Newell et al. |
| 2019/0370606 | A1 | 12/2019 | Kehl et al. |
| 2020/0005284 | A1 * | 1/2020 | Vijayan ................ G06Q 20/065 |
| 2020/0089720 | A1 | 3/2020 | Dallara |
| 2020/0160466 | A1 | 5/2020 | Hori |
| 2020/0168250 | A1 | 5/2020 | Vijil et al. |
| 2020/0243055 | A1 | 7/2020 | Grace |
| 2020/0364703 | A1 | 11/2020 | Joveski et al. |
| 2021/0144127 | A1 | 5/2021 | Veeningen |
| 2021/0165824 | A1 | 6/2021 | Xu |
| 2021/0208841 | A1 | 7/2021 | Wilberding |
| 2021/0224319 | A1 | 7/2021 | Ingel et al. |
| 2021/0248213 | A1 | 8/2021 | Balassanian et al. |
| 2021/0266637 | A1 | 8/2021 | Punja et al. |
| 2021/0272017 | A1 | 9/2021 | Singla et al. |
| 2021/0304200 | A1 | 9/2021 | Doney et al. |
| 2021/0398336 | A1 | 12/2021 | Jin et al. |
| 2022/0051129 | A1 | 2/2022 | Malvankar et al. |
| 2022/0114479 | A1 * | 4/2022 | Zhao .................... G06N 3/0985 |
| 2022/0148268 | A1 | 5/2022 | Yilanci et al. |
| 2022/0159377 | A1 | 5/2022 | Wilberding et al. |
| 2022/0197983 | A1 | 6/2022 | Rios et al. |
| 2022/0253724 | A1 | 8/2022 | Parchami et al. |
| 2022/0276940 | A1 | 9/2022 | Wald |
| 2022/0318793 | A1 | 10/2022 | Meinzer |
| 2022/0337898 | A1 | 10/2022 | Dorogusker et al. |
| 2022/0351270 | A1 | 11/2022 | Emmanuel et al. |
| 2022/0417660 | A1 | 12/2022 | Wilberding et al. |
| 2023/0061896 | A1 | 3/2023 | Davis et al. |
| 2023/0079195 | A1 | 3/2023 | Matheson et al. |
| 2023/0093520 | A1 | 3/2023 | Young et al. |
| 2023/0162179 | A1 | 5/2023 | Deng |
| 2023/0217059 | A1 | 7/2023 | D'Amato et al. |
| 2023/0222091 | A1 | 7/2023 | Janzen |
| 2023/0296390 | A1 | 9/2023 | Davis et al. |
| 2023/0298016 | A1 | 9/2023 | Osborn et al. |
| 2023/0306412 | A1 | 9/2023 | Gaur et al. |
| 2023/0315194 | A1 | 10/2023 | D'amato et al. |
| 2023/0394287 | A1 | 12/2023 | Zhou et al. |
| 2024/0171413 | A1 * | 5/2024 | Dravneek ............. H04L 9/3273 |
| 2024/0289863 | A1 * | 8/2024 | Smith Lewis ......... G06N 3/008 |
| 2024/0311416 | A1 | 9/2024 | Wilberding et al. |
| 2024/0314379 | A1 | 9/2024 | Wilberding et al. |
| 2024/0428275 | A1 * | 12/2024 | Luus .................. G06Q 30/0631 |
| 2025/0061143 | A1 | 2/2025 | Wilberding et al. |
| 2025/0117422 | A1 | 4/2025 | Wilberding et al. |
| 2025/0225171 | A1 | 7/2025 | Wilberding et al. |
| 2025/0278429 | A1 | 9/2025 | Wilberding et al. |
| 2025/0322007 | A1 | 10/2025 | Wilberding et al. |

FOREIGN PATENT DOCUMENTS

| | | |
|---|---|---|
| KR | 1020200127150 A | 11/2020 |
| KR | 1020200127969 A | 11/2020 |
| KR | 1020210004951 A | 1/2021 |
| KR | 1020210129032 A | 10/2021 |
| WO | 2019004118 A1 | 1/2019 |
| WO | 2019067783 A1 | 4/2019 |
| WO | 2020086771 A1 | 4/2020 |
| WO | 2021163377 A1 | 8/2021 |
| WO | 2023225448 A2 | 11/2023 |

OTHER PUBLICATIONS

International Search Report and Written Opinion mailed Oct. 21, 2024, International Application No. PCT/US2024/039870, 15 pages.
Xu, et al., Architecture for Blockchain Applications In: "Architecture for Blockchain Applications" Mar. 15, 2019 (Mar. 15, 2019).

\* cited by examiner

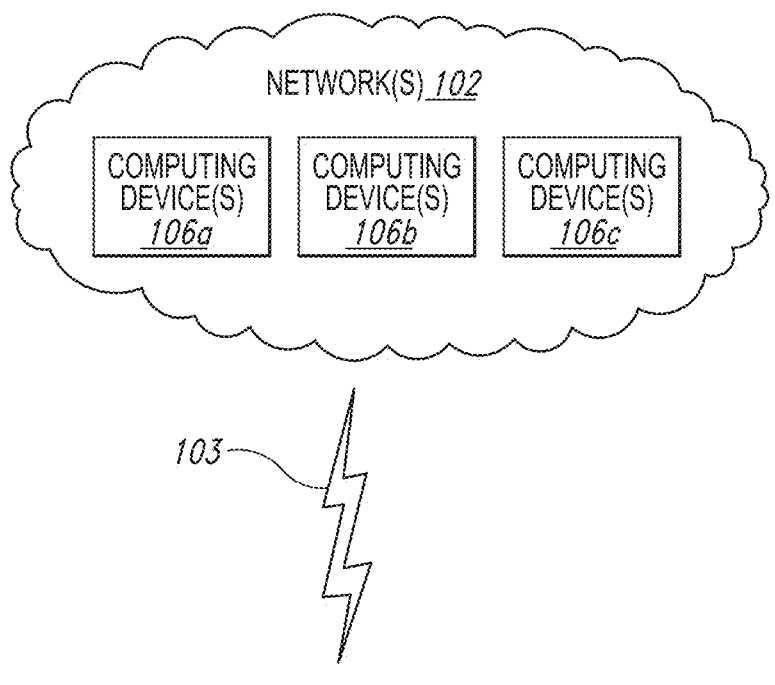
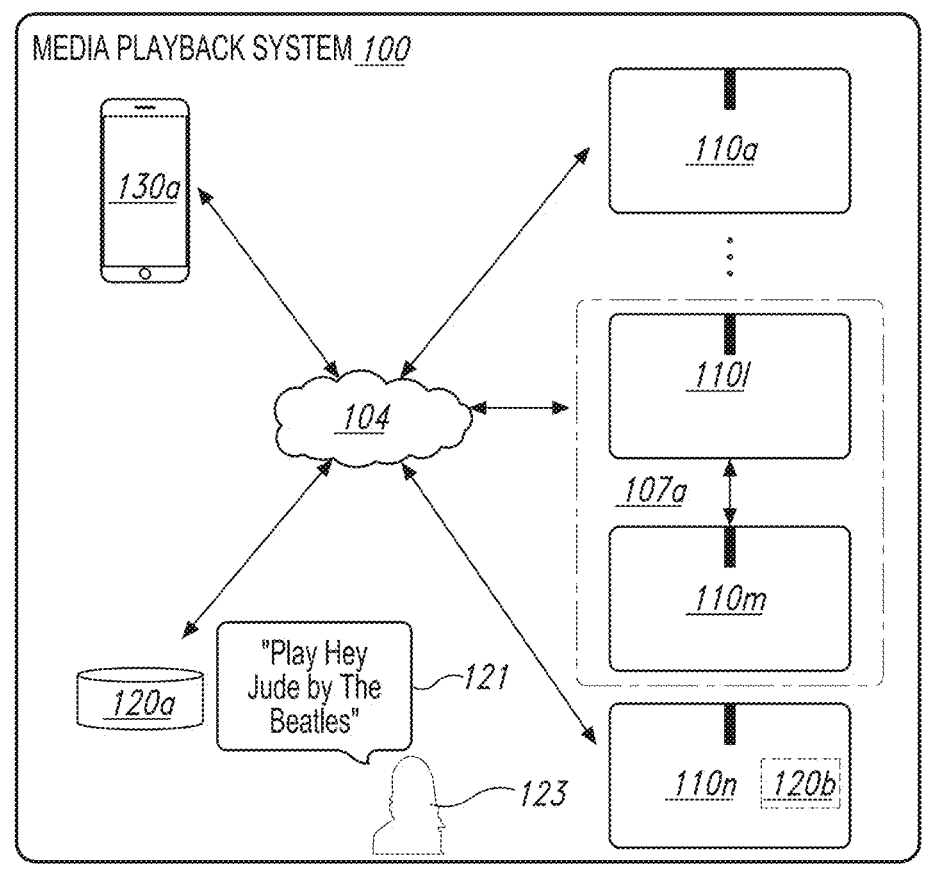
*Fig. 1B*

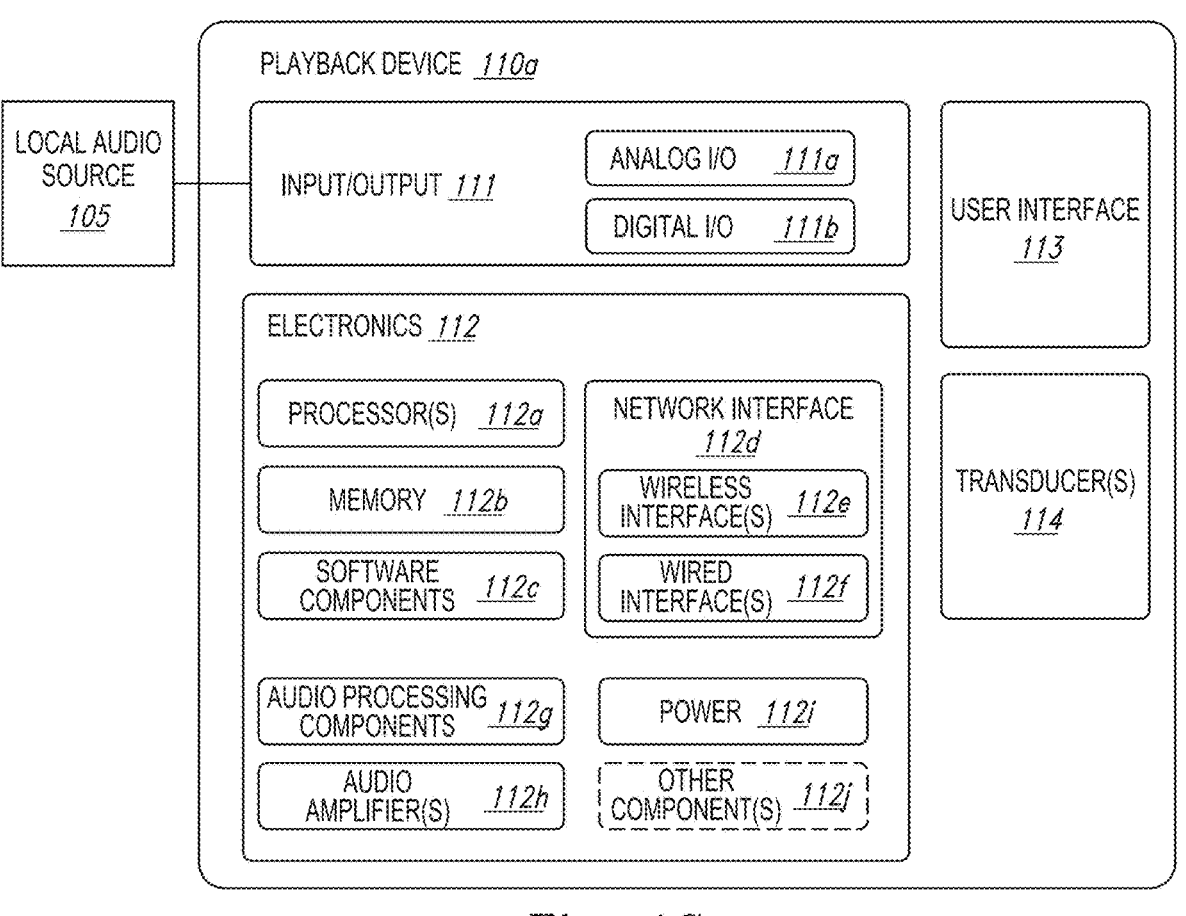
Fig. 1C
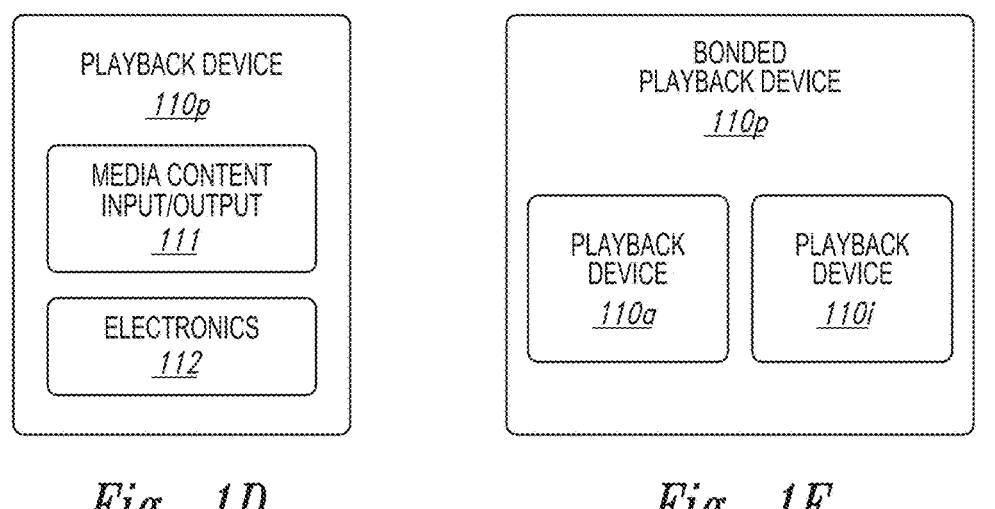
Fig. 1D                    Fig. 1E

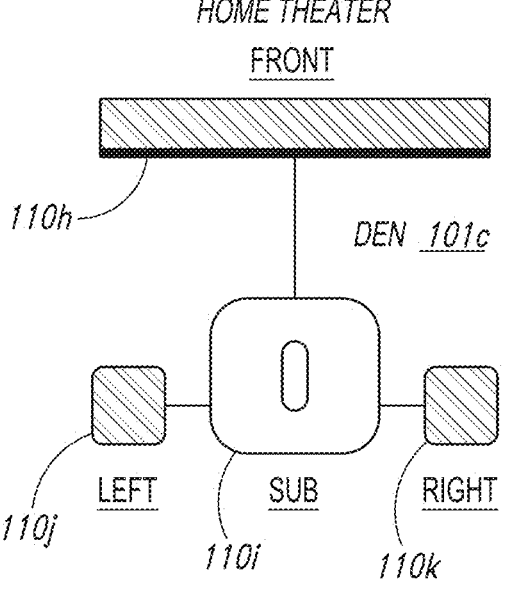
MASTER BEDROOM
*101b*
STEREO PAIR
*110l*     *110m*
*Fig. 1I*
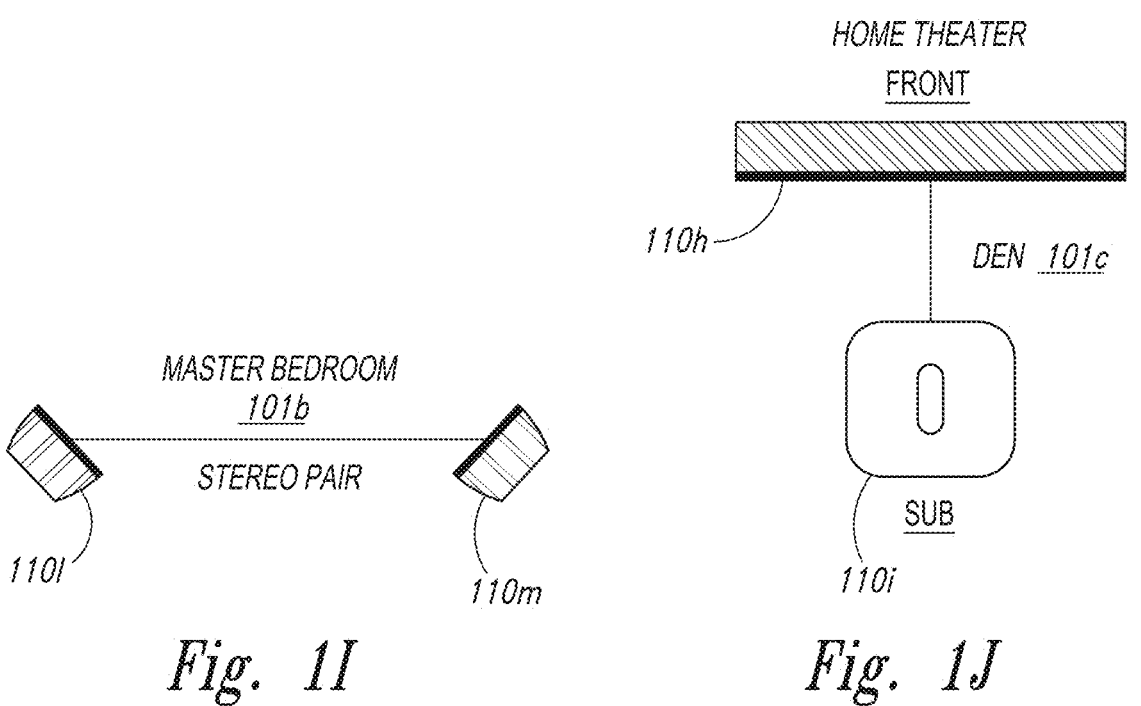
HOME THEATER
FRONT
*110h*
DEN  *101c*
SUB
*110i*
*Fig. 1J*
HOME THEATER
FRONT
*110h*
DEN  *101c*
LEFT     SUB     RIGHT
*110j*     *110i*     *110k*
*Fig. 1K*
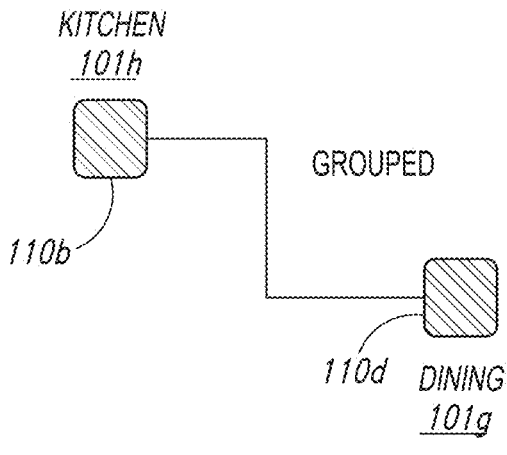
KITCHEN
*101h*
GROUPED
*110b*
*110d*  DINING
*101g*
*Fig. 1L*

300 →

| Consumption Event | Event Time | Player/Platform | Preference | Entity Adding Record | Source of Record | Content Meta Data | Transport Control | ... |
|---|---|---|---|---|---|---|---|---|
| - Playback<br>- Load playlist<br>- Add to playlist | - Time<br>- Duration<br>- Scrub | - Playback device<br>- Platform | - Service preference<br>- Other preference | - Player<br>- Platform<br>- Service | - How was the record information identified | - Name<br>- Universal ID | - Record of all control interactions | ... |

| Participant Category | Provider Name | Make/Model | Network ID | Settings | Configuration | Time | Additional Metadata | ... |
|---|---|---|---|---|---|---|---|---|
| - User<br>- Device<br>- Platform<br>- Content service<br>- Voice service | - Company<br>- Service<br>- Affiliations | - Device<br>- User type<br>- Account type | - IP Address<br>- MAC address | - Equalization<br>- Brightness (tv) | - Group/pair<br>- Room/location | - When registered<br>- Active/inactive<br>- When purchased | - Assigned name<br>- Location info | ... |

602 ACCESS DATA STORED VIA A DISTRIBUTED LEDGER

604 PLAY BACK MEDIA CONTENT BASED AT LEAST IN PART ON THE ACCESSED DATA

700

702 RECEIVE INDICATION OF A CONTENT CONSUMPTION EVENT

704 CAUSE DATA TO BE ADDED TO A DISTRIBIUTED LEDGER BASED AT LEAST IN PART ON THE RECEIVED INDICATION

800

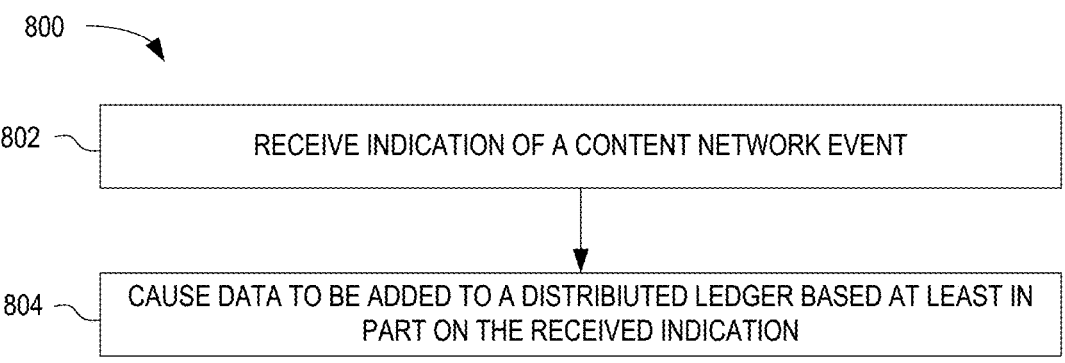

802 — RECEIVE INDICATION OF A CONTENT NETWORK EVENT

804 — CAUSE DATA TO BE ADDED TO A DISTRIBUTED LEDGER BASED AT LEAST IN PART ON THE RECEIVED INDICATION

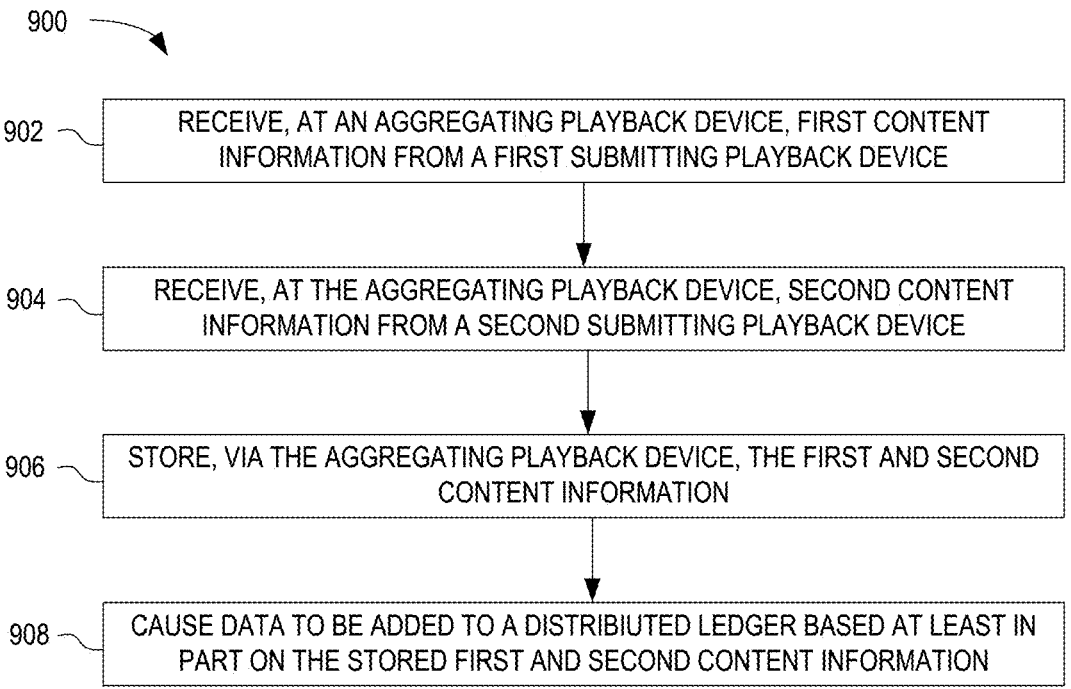

902 — RECEIVE, AT AN AGGREGATING PLAYBACK DEVICE, FIRST CONTENT INFORMATION FROM A FIRST SUBMITTING PLAYBACK DEVICE

904 — RECEIVE, AT THE AGGREGATING PLAYBACK DEVICE, SECOND CONTENT INFORMATION FROM A SECOND SUBMITTING PLAYBACK DEVICE

906 — STORE, VIA THE AGGREGATING PLAYBACK DEVICE, THE FIRST AND SECOND CONTENT INFORMATION

908 — CAUSE DATA TO BE ADDED TO A DISTRIBUTED LEDGER BASED AT LEAST IN PART ON THE STORED FIRST AND SECOND CONTENT INFORMATION

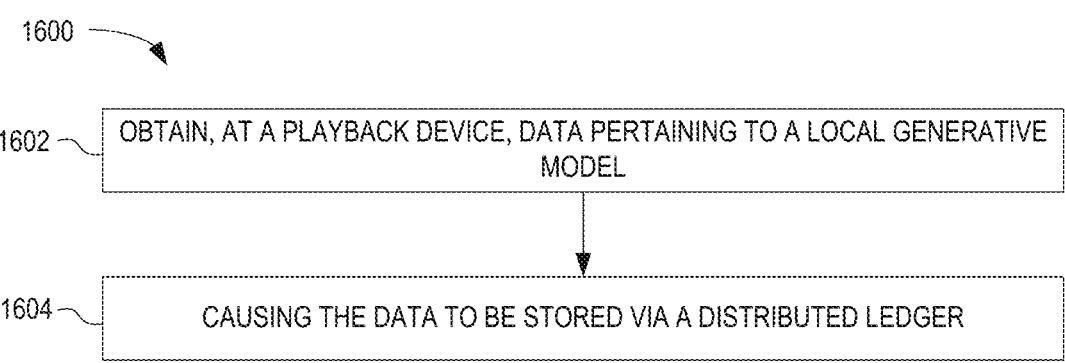

1602 — OBTAIN, AT A PLAYBACK DEVICE, DATA PERTAINING TO A LOCAL GENERATIVE MODEL

1604 — CAUSING THE DATA TO BE STORED VIA A DISTRIBUTED LEDGER

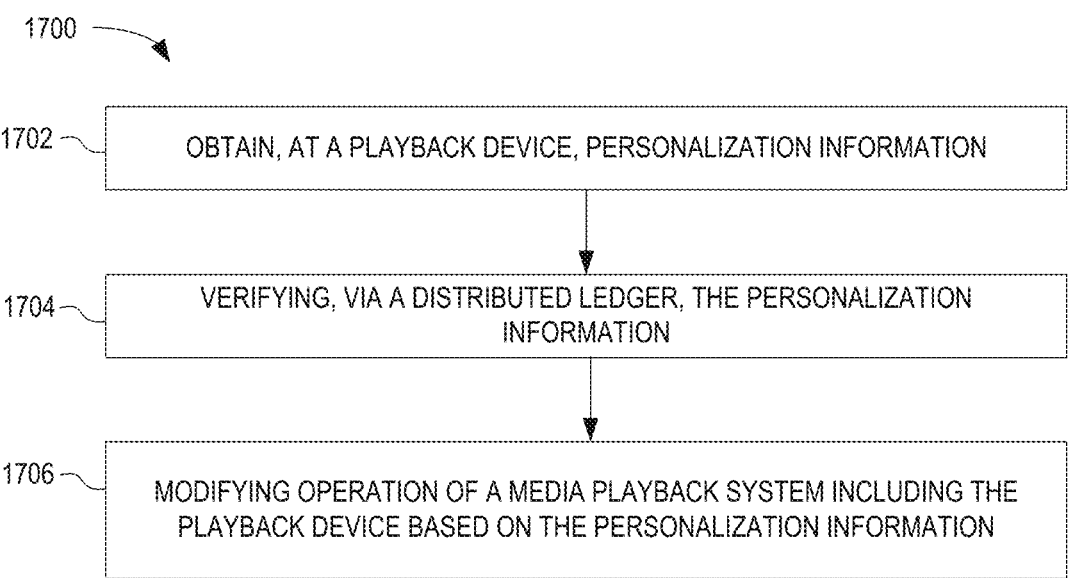

1702 — OBTAIN, AT A PLAYBACK DEVICE, PERSONALIZATION INFORMATION

1704 — VERIFYING, VIA A DISTRIBUTED LEDGER, THE PERSONALIZATION INFORMATION

1706 — MODIFYING OPERATION OF A MEDIA PLAYBACK SYSTEM INCLUDING THE PLAYBACK DEVICE BASED ON THE PERSONALIZATION INFORMATION

*Fig. 17*

SYSTEMS AND METHODS FOR MAINTAINING DISTRIBUTED MEDIA CONTENT HISTORY AND PREFERENCES

CROSS-REFERENCE TO RELATED APPLICATIONS

This application is a continuation of International Application No. PCT/US2024/039870, filed Jul. 26, 2024, which claims the benefit of priority to U.S. Provisional Application No. 63/589,762, filed Oct. 12, 2023, and U.S. Provisional Application No. 63/516,343, filed Jul. 28, 2023, each of which is hereby incorporated by reference in its entirety for all purposes.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1B is a schematic diagram of the media playback system of FIG. 1A and one or more networks.

FIG. 1C is a block diagram of a playback device.

FIG. 1D is a block diagram of a playback device.

FIG. 1E is a block diagram of a bonded playback device.

FIGS. 1I through 1L show schematic diagrams of corresponding media playback system zones.

FIG. 3 illustrates an example content experience record set in accordance with aspects of the disclosed technology.

FIG. 4 illustrates an example content network record set in accordance with aspects of the disclosed technology.

FIGS. 6-9 are flow diagrams illustrating example methods for accessing and updating content record data via a distributed ledger in accordance with aspects of the disclosed technology.

FIGS. 14-17 are flow diagrams illustrating example methods involving blockchain-capable playback devices with generative media components and/or generative context and control components.

Figure 1A:
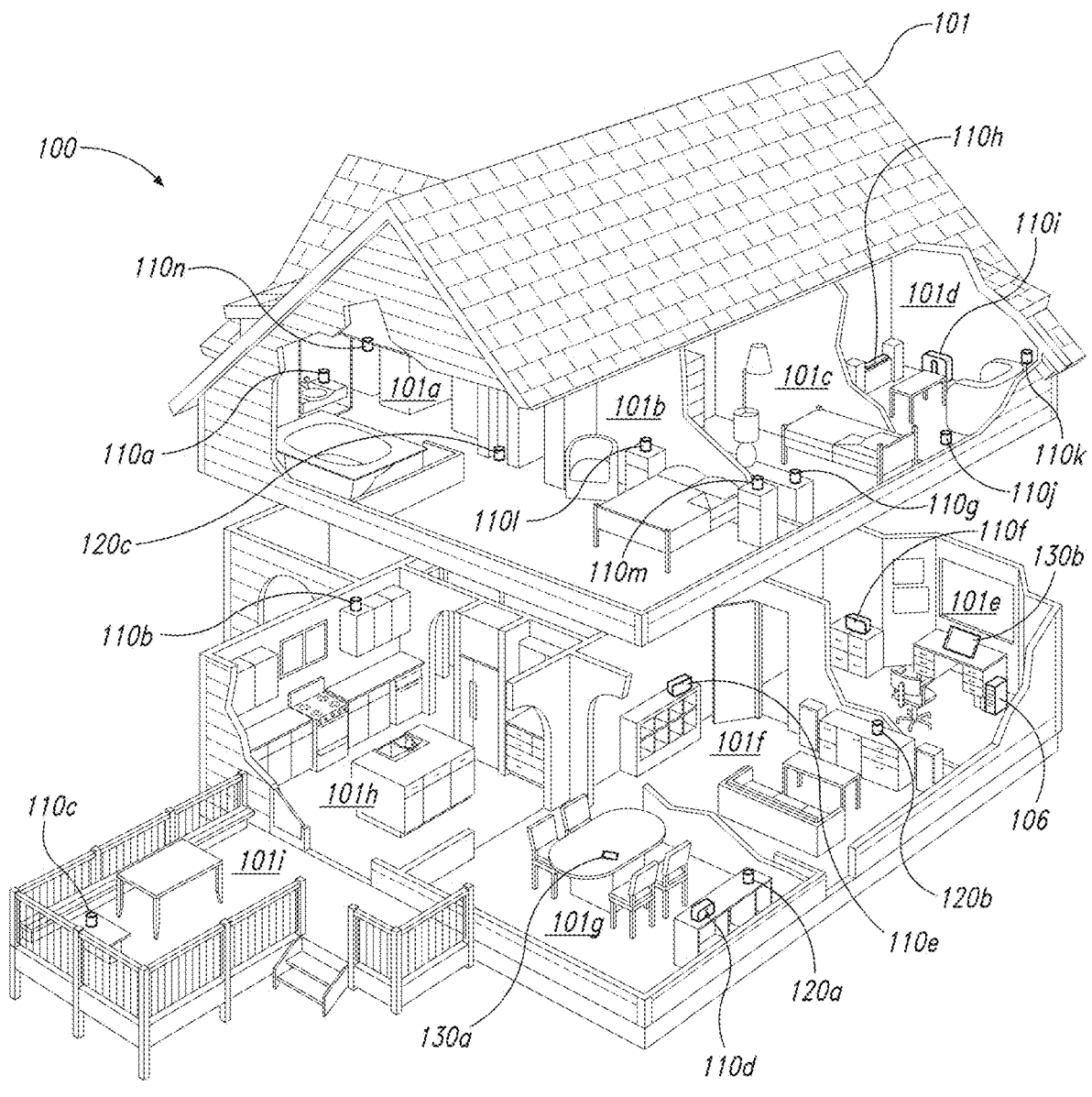
FIG. 1A is a partial cutaway view of an environment having a media playback system configured in accordance with aspects of the disclosed technology.

The drawings are for the purpose of illustrating examples of the present technology, but those of ordinary skill in the art will understand that the technology disclosed herein is not limited to the arrangements and/or instrumentality shown in the drawings.

DETAILED DESCRIPTION

I. Overview

Current approaches to maintaining user data regarding media content consumption rely on centralized data stores in which user data is effectively confined to the services or platforms on which the content was originally consumed. Moreover, in some instances the user data may be limited in availability—or not accessible at all—to the user in any form and rests solely with the applicable platform or service. As a result, data reflecting content consumption history and preferences is maintained in an application layer controlled by an entity other than the user, effectively amounting to a "walled garden" that operates to increase the user's switching costs between applications. For practical purposes, user data often is not transportable or otherwise usable outside of the limited reach of the given application itself.

The emergence of trustless, distributed networks unlocks the potential for content discovery, curation, and consumption in a manner unconstrained by the limitations imposed by legacy content providers and platforms. For example, systems and methods described herein provide for distributed maintenance of a user's media content history and preferences. Leveraging distributed storage of data, priority can be given to user access and control, and additionally data across a wide range of devices, services, and environments can be aggregated for a comprehensive perspective on a given user's content consumption history and preferences. This approach thereby empowers users to regain control of their own content history and preference data. Moreover, by empowering users in this way, ever expanding and improving features and experiences may be offered by service providers.

In various examples of the present technology, a blockchain-integrated network device (e.g., a playback device) is configured to facilitate communication with one or more distributed ledgers (e.g., blockchains such as Bitcoin, Ethereum, or others) to access, store, and update record sets associated with particular users, devices, or environments. For instance, content data associated with a particular user can be stored via a distributed ledger that is openly accessible to any user or network participant. The content data can include, for example, a content experience record set (CERS) that includes a history of content consumption events and associated data. Additionally or alternatively, the content data can include a content network record set (CNRS) that includes data regarding devices, platforms, content services, and so forth that form the user's overall ecosystem of content consumption. In operation, one or both of these record sets (or optionally other auxiliary record sets with different data) can be stored via a distributed ledger. Additionally, users can be given control to access and/or modify their data in a permissionless manner. In various implementations, access to the data may be restricted in a manner that requires user authorization, for instance allowing a user to expose only a subset of the data to a given entity.

In addition to allowing direct access by the user, various other entities may also be granted access to the user's data stored via the distributed ledgers. For instance, a user may wish to grant access to her CERS data to a particular media service provider so that it can automatically generate playlists based on her aggregated listening history. As described in more detail below, the use of one or more distributed ledger(s) to maintain user data regarding media content consumption history and preferences enables a wide variety of applications not otherwise feasible or possible. Additionally, specifically blockchain-integrated playback devices can beneficially allow users to leverage the benefits of distributed storage of their user data by providing a simple and streamlined interface for managing their own data.

In various examples of the present technology, a blockchain-capable playback device also includes hardware and/or software that enables the blockchain-capable playback device to engage in various tasks involving artificial intelligence and/or generative artificial intelligence, such as generative media components and/or generative context and control components. This combination of capabilities allows for unique and personalized media experiences that leverage, e.g., (a) multiple types of artificial intelligence capabilities and/or (b) both distributed ledger technologies and advanced generative artificial intelligence techniques.

As noted above, a blockchain-capable playback device can interact with one or more distributed ledgers, such as public blockchains (e.g., Bitcoin, Ethereum) or other suitable distributed data structures. This blockchain integration allows for secure, transparent, and user-controlled management of media consumption history and preferences across various platforms and services. The incorporation of generative media components into such a blockchain-capable playback device further enhances its capabilities. Generative media components, which may include one or more generative media modules, are configured to produce novel, synthetic media content based on various inputs and algorithms. This can include, for example, creating unique audio streams, modifying existing audio content, or generating accompanying visual or tactile outputs, among other examples known today and/or to be developed in the future. By leveraging data stored on the distributed ledger(s) as inputs for the generative process, the playback device can create highly personalized and context-aware media experiences. Additionally or alternatively, outputs of generative media modules can be written to a distributed ledger.

Additionally or alternatively, the integration of generative context and control components allows the blockchain-capable playback device to dynamically adapt its behavior based on a wide range of inputs. These components may include, for example, a positioning system application that determines the relative locations of devices within an environment, or a personalization service that learns and predicts user preferences over time. By combining these capabilities with blockchain-stored data and generative media components, the playback device can offer increased customization and responsiveness in media playback, as well as improved information curation, conditioning, and/or sharing among playback devices and/or playback device networks for use in enabling such experiences.

The combination of blockchain capabilities, generative media components, and generative context and control components provides distinct benefits for users and other participants in the media ecosystem. Users can enjoy dynamically created content that not only reflects their personal tastes and history (as recorded and shared via a blockchain) but also adapts in real-time to their current context and environment. This combination of technologies enables more immersive, personalized, and interactive media experiences that can evolve and improve over time, as technologies including those involving artificial intelligence continue to evolve.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. M any of the details, dimensions, angles and other features shown in the Figures are merely illustrative of particular examples of the disclosed technology. Accordingly, other examples can have other details, dimensions, angles and features without departing from the spirit or scope of the disclosure. In addition, those of ordinary skill in the art will appreciate that further examples of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs") 120 (identified individually as NMDs 120*a-c*), and one or more control devices 130 (identified individually as control devices 130*a* and 130*b*).

As used herein the term "playback device" can generally refer to a network device configured to receive, process, and/or output data of a media playback system. For example, a playback device can be a network device that receives and processes audio content. In some examples, a playback device includes one or more transducers or speakers powered by one or more amplifiers. In other examples, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some examples, an NMD is a stand-alone device configured primarily for audio detection. In other examples, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers or one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain examples, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some examples, for instance, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various examples of the disclosure are described in greater detail below with respect to FIGS. 1B-1H.

In the illustrated example of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain examples and examples are described below in the context of a home environment, the technologies described herein may be implemented in other types of environments. In some examples, for instance, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the outdoor patio 101*i*. In some aspects, a single playback zone may include multiple rooms or spaces. In certain aspects, a single room or space may include multiple playback zones.

In the illustrated example of FIG. 1A, the master bathroom 101*a*, the second bedroom 101*c*, the office 101*e*, living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some examples, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some examples, one or more of the computing devices 106 comprise modules of a single computer or server. In certain examples, one or more of the computing devices 106 comprise one or more modules, computers, and/or servers. Moreover, while the cloud network 102 is described above in the context of a single cloud network, in some examples the cloud network 102 comprises a plurality of cloud networks comprising communicatively coupled computing devices. Furthermore, while the cloud network 102 is shown in FIG. 1B as having three of the computing devices 106, in some examples, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Modules (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some examples, the network 104 comprises a dedicated communication network that the media playback system 100 uses to transmit messages between individual devices and/or to transmit media content to and from media content sources (e.g., one or more of the computing devices 106). In certain examples, the network 104 is configured to be accessible only to devices in the media playback system 100, thereby reducing interference and competition with other household devices. In other examples, however, the network 104 comprises an existing household communication network (e.g., a household WiFi network). In some examples, the links 103 and the network 104 comprise one or more of the same networks. In some aspects, for example, the links 103 and the network 104 comprise a telecommunication network (e.g., an LTE network, a 5G network). Moreover, in some examples, the media playback system 100 is implemented without the network 104, and devices comprising the media playback system 100 can communicate with each other, for example, via one or more direct connections, PANs, telecommunication networks, and/or other suitable communication links.

In some examples, audio content sources may be regularly added or removed from the media playback system 100. In some examples, for instance, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some examples, for instance, the media content database is stored on one or more of the playback devices 110, NMDs 120, and/or control devices 130.

In the illustrated example of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain examples, for instance, the group 107a comprises a bonded zone in which the playback devices 110l and 110m comprise left audio and right audio channels, respectively, of multi-channel audio content, thereby producing or enhancing a stereo effect of the audio content. In some examples, the group 107a includes additional playback devices 110. In other examples, however, the media playback system 100 omits the group 107a and/or other grouped arrangements of the playback devices 110.

The media playback system 100 includes the NMDs 120a and 120d, each comprising one or more microphones configured to receive voice utterances from a user. In the illustrated example of FIG. 1B, the NMD 120a is a standalone device and the NMD 120d is integrated into the playback device 110n. The NMD 120a, for example, is configured to receive voice input 121 from a user 123. In some examples, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to playback "Hey Jude" by the Beatles from a suitable media service (e.g., via one or more of the computing devices 106) on one or more of the playback devices 110.

b. Suitable Playback Devices

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some examples, the analog I/O 111*a* is an audio line-in input connection comprising, for example, an auto-detecting 3.5 mm audio line-in connection. In some examples, the digital I/O 111*b* comprises a Sony/Philips Digital Interface Format (S/PDIF) communication interface and/or cable and/or a Toshiba Link (TOSLINK) cable. In some examples, the digital I/O 111*b* comprises a High-Definition Multimedia Interface (HDMI) interface and/or cable. In some examples, the digital I/O 111*b* includes one or more wireless communication links comprising, for example, a radio frequency (RF), infrared, WiFi, Bluetooth, or another suitable communication protocol. In certain examples, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain examples, one or more of the playback devices 110, NMDs 120, and/or control devices 130 comprise the local audio source 105. In other examples, however, the media playback system omits the local audio source 105 altogether. In some examples, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some examples, the playback device 110*a* optionally includes one or more microphones 115 (e.g., a single microphone, a plurality of microphones, a microphone array) (hereinafter referred to as "the microphones 115"). In certain examples, for instance, the playback device 110*a* having one or more of the optional microphones 115 can operate as an NMD configured to receive voice input from a user and correspondingly perform one or more operations based on the received voice input.

In the illustrated example of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some examples, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some examples, the operations further include causing the playback device 110*a* to send audio data to another one of the playback devices 110*a* and/or another device (e.g., one of the NMDs 120). Certain examples include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some examples, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated example of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some examples, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain examples, the network interface 112*d* includes the wired interface 112*f* and excludes the wireless interface 112*e*. In some examples, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some examples, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain examples, one or more of the audio processing components 112*g* can comprise one or more subcomponents of the processors 112*a*. In some examples, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some examples, for instance, the amplifiers 112*h* include one or more switching or class-D power amplifiers. In other examples, however, the amplifiers include one or more other types of power amplifiers (e.g., linear gain power amplifiers, class-A amplifiers, class-B amplifiers, class-A B amplifiers, class-C amplifiers, class-D amplifiers, class-E amplifiers, class-F amplifiers, class-G and/or class H amplifiers, and/or another suitable type of power amplifier). In certain examples, the amplifiers 112*h* comprise a suitable combination of two or more of the foregoing types of power amplifiers. Moreover, in some examples, individual ones of the amplifiers 112*h* correspond to individual ones of the transducers 114. In other examples, however, the electronics 112 includes a single one of the amplifiers 112*h* configured to output amplified audio signals to a plurality of the transducers 114. In some other examples, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some examples, the transducers 114 can comprise a single transducer. In other examples, however, the transducers 114 comprise a plurality of audio transducers. In some examples, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain examples, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example examples disclosed herein. Additionally, one of ordinary skilled in the art will appreciate that a playback device is not limited to the examples described herein or to SONOS product offerings. In some examples, for instance, one or more playback devices 110 comprises wired or wireless headphones (e.g., over-the-ear headphones, on-ear headphones, in-ear earphones). In other examples, one or more of the playback devices 110 comprise a docking station and/or an interface configured to interact with a docking station for personal mobile media playback devices. In certain examples, a playback device may be integral to another device or component such as a television, a lighting fixture, or some other device for indoor or outdoor use. In some examples, a playback device omits a user interface and/or one or more transducers. For example, FIG. 1D is a block diagram of a playback device 110*p* comprising the input/output 111 and electronics 112 without the user interface 113 or transducers 114.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated example, the playback devices 110*a* and 110*i* are separate ones of the playback devices 110 housed in separate enclosures. In some examples, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some examples, for instance, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some examples, the bonded playback device 110*q* includes additional playback devices and/or another bonded playback device.

c. Suitable Network Microphone Devices (NMDs)

Figures 1F, 1G, 1H:
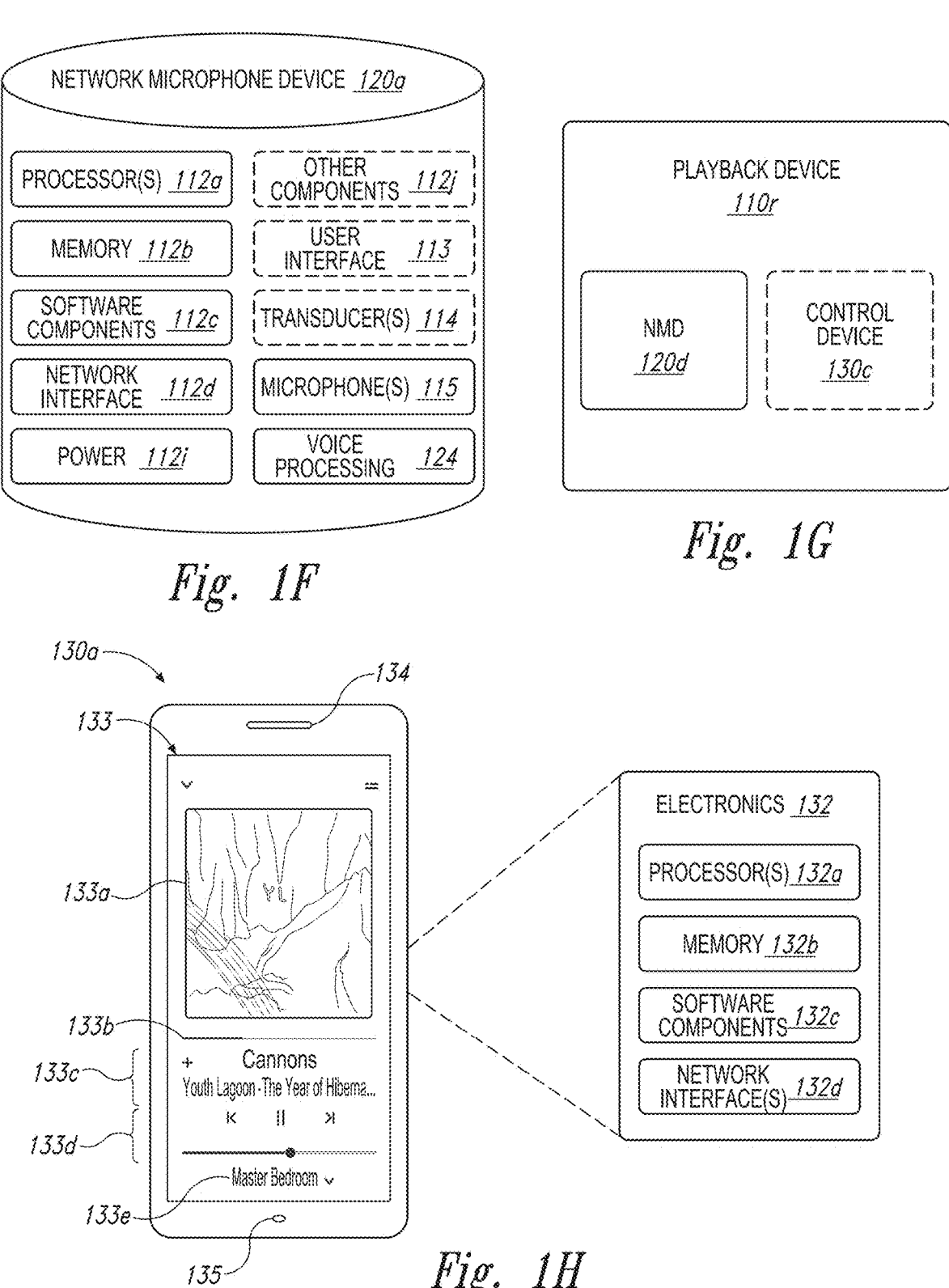
FIG. 1F is a block diagram of a network microphone device.
FIG. 1G is a block diagram of a playback device.
FIG. 1H is a partially schematic diagram of a control device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some examples, the NMD 120*a* is configured as a media playback device (e.g., one or more of the playback devices 110), and further includes, for example, one or more of the audio components 112*g* (FIG. 1C), the amplifiers, and/or other playback device components. In certain examples, the NMD 120*a* comprises an Internet of Things (IoT) device such as, for example, a thermostat, alarm panel, fire and/or smoke detector, etc. In some examples, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some examples, the NMD 120*a* includes additional components (e.g., one or more sensors, cameras, thermometers, barometers, hygrometers).

In some examples, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other examples, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated example, the control device 130*a* comprises a smartphone (e.g., an iPhone™, an Android phone) on which media playback system controller application software is installed. In some examples, the control device 130*a* comprises, for example, a tablet (e.g., an iPad™), a computer (e.g., a laptop computer, a desktop computer), and/or another suitable device (e.g., a television, an auto-mobile audio head unit, an IoT device). In certain examples, the control device 130*a* comprises a dedicated controller for the media playback system 100. In other examples, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 112*a* to perform those functions. The software components 132*c* can comprise applications and/or other executable software configured to facilitate control of the media playback system 100. The memory 112*b* can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some examples, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 130 to one or more of the playback devices 110. The network interface 132d can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others. Additional description of zones and groups can be found below with respect to FIGS. 1I through 1M.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated example, the user interface 133 comprises a display presented on a touch screen interface of a smartphone (e.g., an iPhone™, an Android phone). In some examples, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some examples, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some examples the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some examples, two or more of the microphones 135 are arranged to capture location information of an audio source (e.g., voice, audible sound) and/or configured to facilitate filtering of background noise. Moreover, in certain examples, the control device 130a is configured to operate as playback device and an NMD. In other examples, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

e. Suitable Playback Device Configurations

Figure 1M:
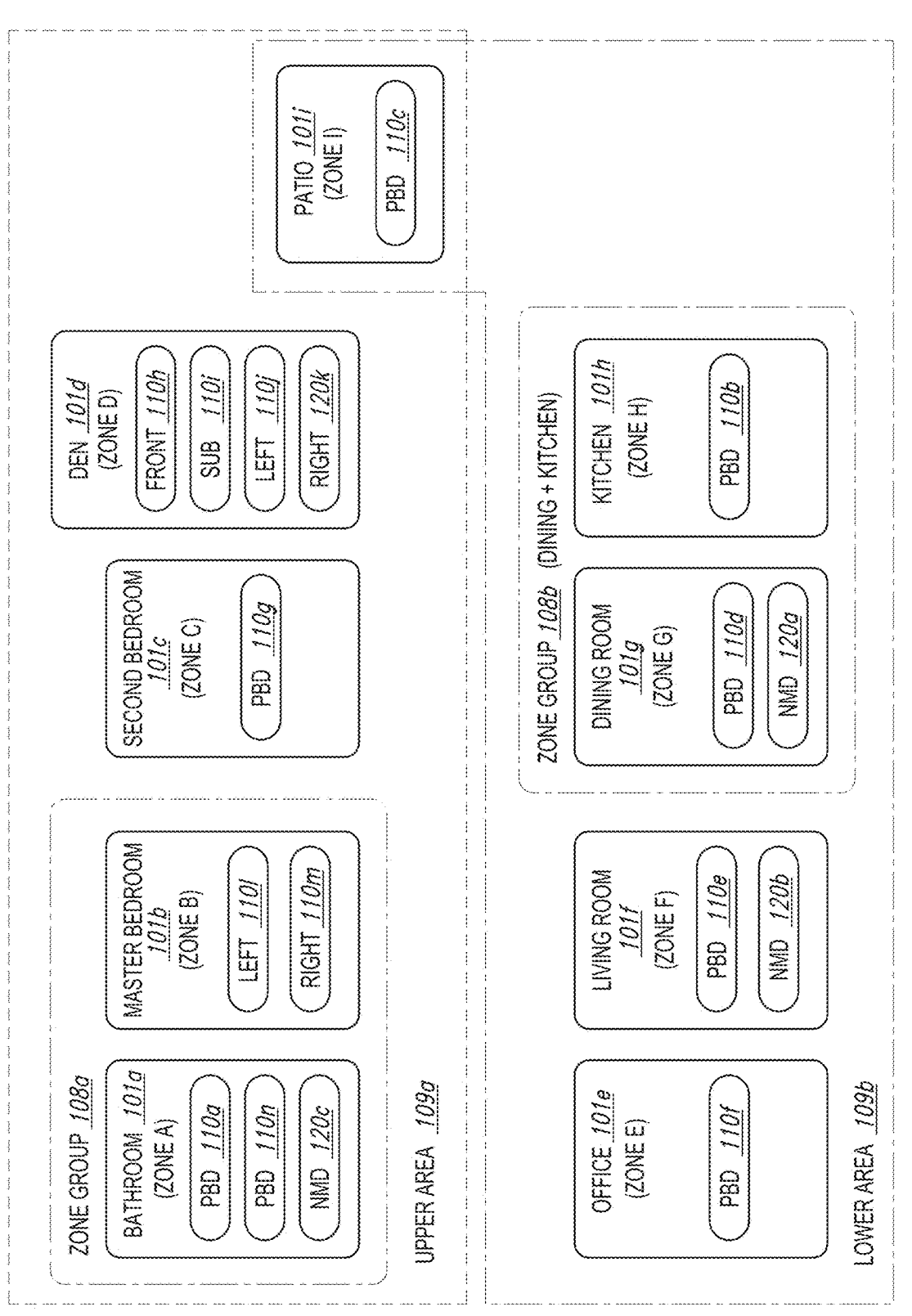
FIG. 1M shows a schematic diagram of media playback system areas.

FIGS. 1I through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named M aster Bathroom. Zone B may be provided as a single entity named M aster Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* the master bathroom have the single UI entity of Zone A. In one example, the playback devices 110*a* and 110*n* may each output the full range of audio content each respective playback devices 110*a* and 110*n* are capable of, in synchrony.

In some examples, an NMD is bonded or merged with another device so as to form a zone. For example, the NMD 120*b* may be bonded with the playback device 110*e*, which together form Zone F, named Living Room. In other examples, a stand-alone network microphone device may be in a zone by itself. In other examples, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can have be assigned a name such as "Dining+Kitchen", as shown in FIG. 1M. In some examples, a zone group may be given a unique name selected by a user.

Certain data may be stored in a memory of a playback device (e.g., the memory 112*b* of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some examples, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the media playback system 100 may variables or identifiers representing other associations of zones and zone groups, such as identifiers associated with Areas, as shown in FIG. 1M. A n area may involve a cluster of zone groups and/or zones not within a zone group. For instance, FIG. 1M shows an Upper A rea 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some examples, the media playback system 100 may not implement Areas, in which case the system may not store variables associated with Areas.

III. Distributed Maintenance of Media Content History and User Preferences a. Overview As noted previously, user data regarding media content consumption is typically maintained using centralized approaches, resulting in fragmentation of user data across a variety of different platforms, devices, and/or services. For instance, a user's listening history from SPOTIFY while at home may not be easily aggregated with her listening history using APPLE MUSIC while at work, nor with media content played back via local content sources. As another example, a user's listening history via a SONOS playback system may not be readily reconcilable with a history of the user's listening events via her smartphone.

Various aspects of the present technology relate to using distributed ledger technology to store, modify, and/or manage access to user data across a variety of different devices, service providers, and platforms. In particular, systems and methods described herein provide for distributed maintenance of a user's media content history and preferences, thereby empowering users to wrest control of their data from the walled gardens that would otherwise restrain it.

Figure 2:
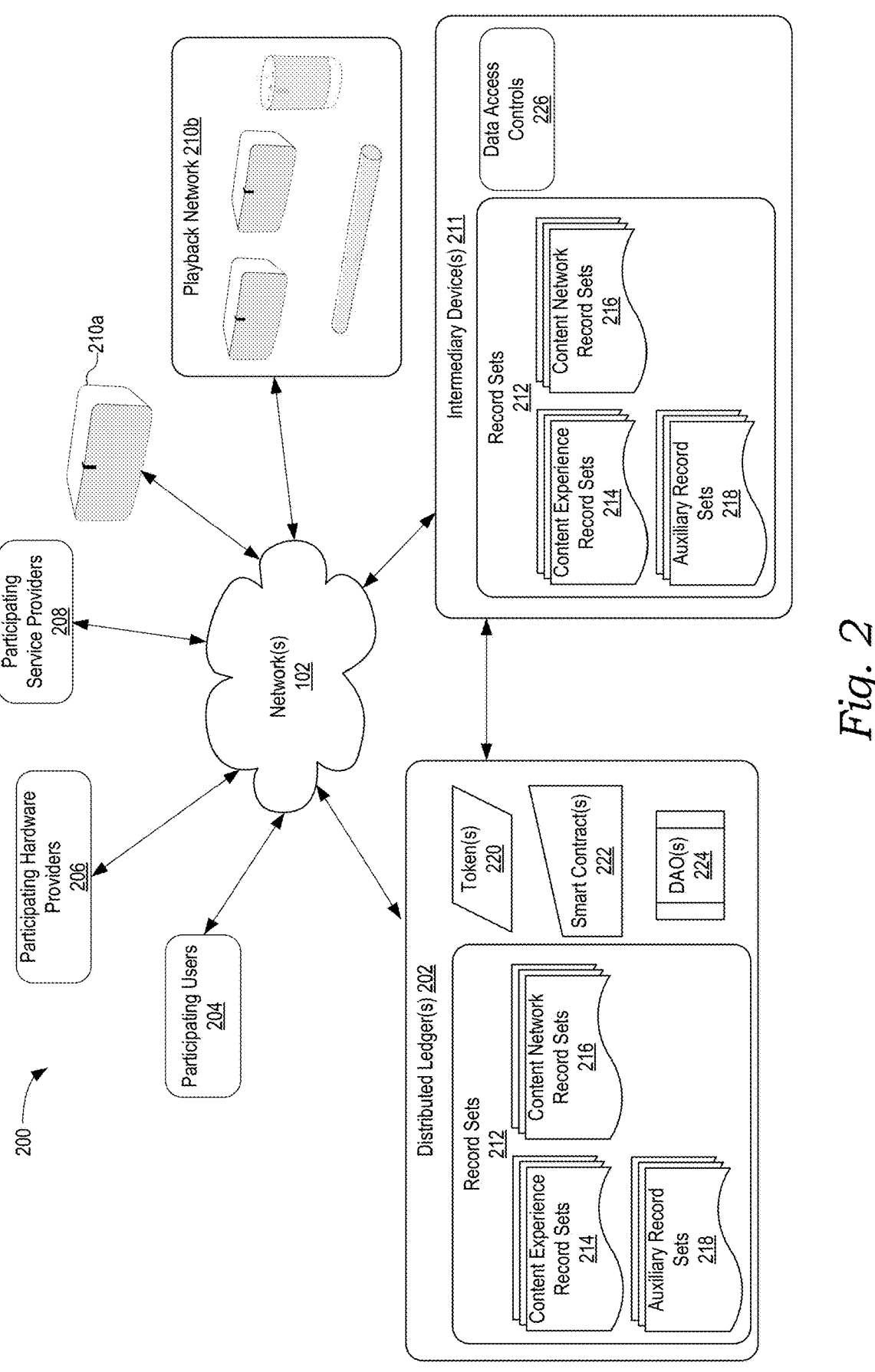
FIG. 2 is a schematic diagram of a media playback system including one or more distributed ledger(s) in accordance with aspects of the disclosed technology.

FIG. 2 is a schematic diagram of a system 200 including one or more distributed ledger(s) 202 in accordance with aspects of the disclosed technology. In various examples, and as described in more detail elsewhere herein, the distributed ledger(s) 202 can include public, permissionless blockchains such as Bitcoin, Ethereum, or many others. The distributed ledger(s) 202 may be used to store, modify, and/or manage access to user data (e.g., user data regarding media content consumption).

As shown in FIG. 2, the system 200 includes various network participants (e.g., participating users 204, participating hardware providers 206, participating service providers 208, as well as individual playback devices 210*a*, playback networks 210*b*, and/or intermediary device(s) 211). As used herein, these entities are "participants" by virtue of participating in exchanging, contributing, and/or consuming data, either directly or indirectly, with the distributed ledger(s) 202 to maintain and/or utilize data generated or obtained by the various participants. In addition to the participants 204, 206, 208, the system 200 can include one or more individual devices 210 (represented by playback device 210, as well as one or more playback network(s) 210*b*, which can include a collection of playback devices that are associated together (e.g., organized as a single household, account, zone, or otherwise associated together). Additionally, the system 200 optionally includes one or more intermediary device(s) 211, which as described below can facilitate interactions between the various participants 204, 206, 208, 210, and the distributed ledger(s) 202. Communication among these various entities and devices can be carried out via network(s) 102, which as noted above can include any suitable wired or wireless network connections or combinations thereof (e.g., WiFi network, a Bluetooth, a Z-Wave network, a ZigBee, an Ethernet connection, a Universal Serial Bus (USB) connection, etc.).

As described in more detail below, the system 200 is configured to maintain user data which can include various record sets 212. In the illustrated example, the record sets 212 include content experience record sets (CERS) 214, content network record sets (CNRS) 216, and auxiliary record sets 218. These record sets 212 can be stored, updated, and/or accessed, whether directly or indirectly, through the distributed ledger(s) 202. In some implementations, the record sets 212 can include data from a plurality of different participants, including one or more participating users 204, one or more participating hardware providers 206 (e.g., manufacturers or retailers of playback devices), and/or one or more participating service providers 208 (e.g., media content services, voice assistant services, internet-of-things platforms, etc.). Data from a variety of sources can therefore be aggregated and stored via the distributed ledger(s) 202.

In the illustrated example, the record sets 212 can be stored directly on the decentralized ledger(s) 202. Moreover, the distributed ledger(s) 202 can include, interact with, or implement one or more tokens 220 (including fungible tokens and/or non-fungible tokens (NFTs)), smart contracts 222, and/or decentralized autonomous organizations (DAOs) 224. In various implementations, these distributed objects and entities can be used to facilitate the storage, modification, and/or provisioning of access to the user's data.

Additionally or alternatively, the record sets 212 can be stored on one or more intermediary device(s) 211 which can facilitate management of data via the distributed ledger(s) 202. As described in more detail below, the intermediary device(s) 211 can include data access controls 226 that allow participants to have more fine-tuned control over which data is published to the decentralized ledger(s) 202. In various examples, the intermediary device(s) 211 can serve as identity hubs that store some or all of the participants' record sets 212 and allow for selective publication or revelation of record set data via the decentralized ledger(s) 202 and/or to other participants within the system 200. As described herein, data referred to as being stored on or via a blockchain or other distributed ledger may be either stored (and/or accessed) directly via such a blockchain or distributed ledger, or may be stored (and/or accessed) via an intermediary device, local data store, or other such component that is not itself a distributed ledger or blockchain. In such instances, the intermediary device, local data store, or other such component can contain a pointer to the blockchain data, and the data accessed thereby is in reference to the data ultimately stored via a blockchain.

b. Example Distributed Ledger(s)

As noted above, the system 200 can include and/or communicate with one or more distributed ledger(s) 202, which in turn can store, instantiate, or communicate with one or more tokens 220, smart contracts 222, and/or decentralized autonomous organizations (DAOs). Examples of suitable distributed ledgers 202 include public distributed ledgers such as Bitcoin, Ethereum, Solana, Avalanche, Polygon, and many others. In various implementations, the system 200 can include one or more distributed ledgers 202, which may optionally communicate directly with one another. Although several examples described herein relate to permissionless blockchains, in various examples any suitable distributed ledger technology may be used, including private or semi-private blockchains (e.g., Hyperledger Fabric, Corda, etc.), as well as non-blockchain implementations such as directed acyclic graphs (DAGs) (e.g., Nano, IOTA, etc.). Optionally, the distributed ledger(s) 202 can include so-called "layer 2" blockchains which operate on top of a respective "base layer" blockchain. Examples of such layer 2 networks include the Lightning Network (Bitcoin), the Raiden Network (Ethereum), Plasma (Ethereum), the Base Network (Ethereum), and many others.

In various examples, participants using a distributed ledger 202 can transact with one another in a peer-to-peer manner, and operation of the distributed ledger 202 can be distributed such that no one central entity controls operation of the network. Such distributed ledgers 202 can be used to track the creation, exchange, and redemption of certain real-world assets, such as currency. This approach enables robust auditing of asset transactions due to the practical immutability of data stored on a blockchain. Currency is only one of various assets that may be desirable to track on a distributed ledger. Other types of assets may differ from currency with respect to one or more behaviors that govern asset creation, exchange, and/or redemption. Moreover, different blockchain architectures may differ with respect to policies and protocols, and further with respect to the tools used to program asset behaviors.

In various examples, the distributed ledger(s) 202 can represent and manage transactions involving one or more tokens 220. In general, a distributed ledger 202 in which each unit of an asset is represented by some form of digital token 220 can be programmed to endow that token with a set of behaviors appropriate for the asset it represents. By way of example, "fungible" behavior enables an asset to be exchanged with other assets of the same class. Every unit of a given denomination of currency (e.g., a dollar) is fungible, because it has the same value as every other unit of the same denomination. A property title, by contrast, is "non-fungible" because its value depends on the size, location, and other aspects of the specified property. For each asset represented as a token 220, the appropriate fungible or non-fungible behavior is programmed into that token's class in the distributed ledger 202 that tracks the asset.

According to some embodiments, tokens 220 transacted via the distributed ledger 202 can be non-fungible. Such non-fungible tokens (NFTs) can be unique and non-interchangeable for any other token. The NFT may comprise and/or be associated with a unique media content, domain name, digital artwork, a digital collectible (e.g., Bored Ape Yacht Club, memes), an event ticket, part of a virtual world, a digital object used in games, an avatar or character, an item having utility (e.g., a specific function such as providing voting or governance rights), etc. In various examples, the NFTs may themselves include relevant data to facilitate media playback (e.g., the raw audio data for a music NFT may be stored on-chain), or the NFT may include a pointer (e.g., URL or URI) that directs to data stored elsewhere (e.g., audio data stored on a server maintained by the issuer of the music NFT or other suitable storage location). In further examples, the NFTs may themselves point back to other data stored on-chain, and that data may be used to facilitate media playback.

Such tokens 220, whether fungible or non-fungible, may be stored by appropriate entities (e.g., participants such as participating users 204, hardware providers 206, and/or service providers 208) via a digital wallet. A digital wallet can be a device, physical medium, program, or service that stores the public and/or private keys for blockchain transactions. In some instances, a digital wallet can store multiple public/private key pairs for various different blockchains, such that a user can store assets associated with different blockchains in a single wallet. Examples include MetaMask, Phantom, Coinbase Wallet, Ledger Nano, etc. In operation, a user can sign blockchain transactions via the wallet using the appropriate private key (or authorizing the wallet to sign the transaction with the private key). The transaction will then be confirmed if the transaction signature is valid, and then added to a corresponding block in the blockchain.

In some instances, ownership of a particular token 220 may be a prerequisite to accessing certain media content. Consider, for example, an artist (as a participating user 204) who wishes to provide access to her media content only to select fans (which may also be participating users 204). As one example, the artist's followers may be required to hold a particular NFT or other token 220 to access that artist's media content. In yet another example, a particular curated playlist or radio station may be accessible only to users who hold a particular NFT or other token 220. Similar concepts are described in commonly owned International Application No. PCT/US23/66776, filed May 9, 2023, titled "Generating Digital Media Based on Blockchain Data," which is hereby incorporated by reference in its entirety for all purposes.

Optionally, data (e.g., data facilitating playback of particular media content) corresponding to a token 220 (e.g., an NFT) can be stored or embedded via physical media. For example, data corresponding to an NFT can be embedded on a vinyl record, physical card or ticket, a poster, or any other suitable technique for storing data via the physical media (e.g., NFC or other RF tag). The NFT can may be read by an appropriate device (e.g., a device associated with a participating hardware provider 206, a blockchain-integrated playback device 210, etc.) which may then initiate playback of the appropriate media content.

In some examples, as described in more detail elsewhere herein, user data (e.g., the record sets 212) can be stored wholly or in part via the distributed ledger(s) 202. For example, the media consumption history, preferences, and/or other suitable information relating to a participating user 204 can be stored via the distributed ledger(s) 202 to provide a persistent and immutable data record. This can include media consumption history, as well as particular media content produced by the user (e.g., in the case of an artist or group). In some instances, "followers" of a particular user can subscribe to that user's listening history by accessing the data stored via the distributed ledger(s) 202. As blockchains are typically permissionless and transparent, followers may be free to access the listening history (or other content data associated with a particular network address).

In various implementations, the distributed ledger 202 can be configured to execute transactions automatically under one or more conditions. Such self-executing transactions can be referred to as smart contracts 222. A smart contract 222 may comprise computer code stored on the distributed ledger 202 that is configured to execute only in specified circumstances and in specified manners. For example, a smart contract can be configured such that a particular transaction executes when a threshold value is exceeded, at a certain time, based on one or more other transactions, or any other suitable criteria. In some examples, record sets 212 (e.g., content experience record sets 214, content network record sets 216, or other suitable record sets) can be automatically modified, transmitted to designated recipients, have access authorized or revoked, or any other suitable action based on a smart contract 222. A s such, one or more of the participants 204, 206, or 208 interacting with the smart contract 222 through the distributed ledger 202 can cause the smart contract to update record set(s) 212, to access the record set(s) 212, and/or to modify access permissions associated with the record set(s) 212.

Bitcoin Ordinals is one example standard for implementing smart contract-like functionality and storing information or rules on the Bitcoin blockchain, which can be leveraged by blockchain-capable playback devices. Unlike other smart contracts on platforms like Ethereum, Ordinals utilize Bitcoin's native scripting language to inscribe data directly onto individual satoshis, the smallest unit of Bitcoin. This approach allows for the creation of unique, non-fungible tokens (NFTs) and the storage of arbitrary data on the Bitcoin network. In the context of media playback systems, Ordinals can be used to encode and store various types of information relevant to the user's media experience, such as ownership rights to specific content, playback rules, or even small media files themselves. Blockchain-capable playback devices can interact with such Ordinals to verify content ownership, enforce usage restrictions, or access embedded metadata. Additionally or alternatively, Ordinals can be used to encode and store any of the various types of record set information described herein including, as just a few particular examples, any of the information discussed herein with respect to other example aspects of NFTs, and/or any of the information described in connection with FIG. 3 and/or FIG. 4. While Ordinals is provided as one example, any suitable smart-contract implementation may be utilized in conjunction with the blockchain-integrated playback devices described herein.

One organizational structure unique to distributed ledgers is a decentralized autonomous organization (DAO) 224. A DAO 224 is typically a community-led entity with no central authority. Such DAOs 224 may be fully autonomous and transparent, with smart contracts providing the foundational rules and executing the agreed-upon decisions. Community votes may be cast via token holders using on-chain transactions. Based on the outcome of particular votes, smart contracts can execute certain transactions or other code to implement the decisions of the DAO members. Typically, a DAO 224 issues tokens (e.g., tokens 220) to users, either in exchange for currency investment or donations, or without compensation (e.g., via an "air drop"). Token holders typically then retain certain voting rights, which may be proportional to their holdings. In some instances, token holders also receive financial proceeds, such as a share of transaction fees collected by the DAO. As one example, a DAO 224 associated with a particular artist, media content, or otherwise may hold certain music royalties which, when collected, can be distributed in part to holders of the appropriate NFTs or other tokens 220 (e.g., a participating user 204 holding an appropriate token 220 may receive economic benefits from the artist DAO 224 based at least in part on the user's ownership of the token 220). Optionally, the entire transaction can occur in an automatic and permissionless manner via the distributed ledger(s) 202.

In some instances, a DA 0 may itself serve as a network participant in the system 200, for example representing or being facilitated by one or more of certain users 204, hardware providers 206, or service providers 208. For example, a local DAO may be responsible for control of household or business devices and/or services associated with the system 200 and/or additional systems without involvement of a remote, centralized platform, in contrast with conventional approaches.

c. Example Participants

As shown in FIG. 2, the system 200 can include a number of different network participants that interact, whether directly or indirectly, with the distributed ledger(s) 202 to store, manage, modify, and/or access user data. As depicted, the participants can include participating users 204, participating hardware providers 206, and/or participating service providers 208. In some implementations, the communication protocol(s) by which the various data is aggregated and written to the distributed ledger(s) 202 includes a mechanism by which various participants can add themselves, or be added to, the network such that they have read and/or write access to the distributed ledger(s) 202. In the case of public, permissionless blockchains (e.g., Bitcoin, Ethereum), such a mechanism may likewise be public and permissionless, such that any entity is free to interact with the distributed ledger(s) 202 without relying on any centralized authority for providing permissions, granting access, etc. In some implementations, a centralized or quasi-centralized authority may manage access to the network such that only participants that have been granted access are permitted read and/or write access to the data stored via the distributed ledger(s) 202. Additionally or alternatively, a centralized or quasi-centralized authority may facilitate authentication and/or validation of data that is added to the distributed ledger(s) 202, such that viewers can ensure that the data written to the distributed ledger(s) 202 is legitimately a part of the content protocol or system involved. In this way, malicious actors may be prevented from spoofing data to the distributed ledger(s) 202 that purports to contribute to a participants' record set 212.

In various aspects, one or more of the participants may have one or more associated identifiers that are used to interact with the distributed ledger(s) 202. The identifiers may be unique to that participant, such that all access to the distributed ledger(s) 202 is mediated by the unique identifier. Various techniques are available for assigning and managing identifiers for persistent interactions with distributed ledger(s) 202. One approach involves distributed IDs (DIDs), which may serve as a building block for self-sovereign identity systems using distributed ledger technology. Various DID methods have been proposed that provide a specific set of rules, conventions, and procedures that define how a DID is created, resolved, updated, and deactivated within a particular blockchain or distributed ledger system. Examples of DID methods include: did:ethr (Ethereum DID method), which utilizes the Ethereum blockchain for creating and managing DIDs; did:ion (Microsoft's ION DID method), which utilizes the Bitcoin blockchain for creating and managing DIDs; and did:web (Web DID method), which is a more generic method for DIDs utilizing HTTP for resolution and without relying on a specific blockchain. In the case of public blockchains (e.g., Bitcoin and Ethereum), any participant is free to create a DID in a trustless environment. In the case of permissioned blockchains (e.g., Hyperledger Fabric, Corda, etc.), controlled access may be required to generate a DID. In various examples, a DID can utilize public/private key pairs, such that each DID is associated with a public key for identification and a private key for authentication and access control. The DIDs themselves may be strings of characters conforming to a specific syntax (e.g., did:method:specific-id). Optionally, each DID is globally unique and serves as a universal reference to an identity on the blockchain. Another suitable approach involves using the Ethereum Name Service (ENS) to establish persistent identifiers that participants can use to interact with the decentralized ledger(s) 202.

MicroStrategy's Orange platform is another example of a decentralized identity (DID) implementation that can be integrated into blockchain-capable playback devices. Orange leverages the Bitcoin network to create and manage self-sovereign digital identities, allowing users to maintain control over their personal data while interacting with various services and devices. This protocol employs a specific method referred to as Bitcoin Inscription DID (did:btc), which writes identity data directly into the blockchain through Bitcoin transactions, using UTXOs for DID control. In the context of a media playback ecosystem, a "centrally" created, deployed, and managed identity platform such as Orange can provide a secure and user-centric method for managing identities across multiple devices and platforms. Users can associate their 0 range-based DID with their content experience record sets (CERS) and content network record sets (CNRS), ensuring consistent and portable (i.e., decentralized and distributed) information including media preferences across different playback devices.

In some implementations, interoperability standards can be used to allow communication between different DIDs and identity systems. For example, standards and formats developed by W3C's Distributed Identity Working Group can be used to facilitate interoperability between different DIDs and identity systems.

A particular DID can be associated with particular data, which may be stored directly on-chain or via an intermediary device that in turn communicates with the distributed ledger(s) 202. In some examples, a DID can be associated with a DID document that contains metadata and public keys associated with a particular DID. This document can provide information on how to communicate with the subject of the DID, as well as including endpoints for services like verification methods, authentication, or other relevant services. In some instances, user content data (e.g., record sets 212 such as CERS 214, CNRS 216, or auxiliary record sets 218) can be stored in whole in part via a DID document. In some implementations, DIDs may link to off-chain storage systems (e.g., InterPlanetary File System (IPFS) or distributed file systems) for storing larger data sets associated with a particular identifiers.

In some cases, it may be beneficial for one or more participants to verify claims associated with their respective DID without revealing the underlying information or source data. For example, zero-knowledge proofs (ZKPs) can be used to prove to another party (the verifier) that the participant possess certain information or knowledge without revealing the actual information itself (e.g., providing that a participant knows a password without revealing the actual password). Various implementations of ZKPs are possible, including zk-SNARKs, zk-STARKs, or other suitable techniques.

Another similar approach involves verifiable credentials, which are a means of providing proof or evidence of certain attributes or claims associated with an identifier (e.g., age, citizenship, etc.) without revealing the underlying data. For instance, a participating hardware provider 206 may issue a verifiable credential to a buyer certifying that the buyer has purchased a particular playback device. The buyer (as a participating user 204) can then present the verifiable credential to prove purchase or ownership of the given device without revealing the underlying data. Verifiable credentials can take the form of structured data that includes information about the subject, the issuing entity, the claim being made, and cryptographic signatures to ensure the integrity and authenticity of the credential.

In some implementations, one or more "identity hubs" can be used to facilitate interaction with the distributed ledger(s) 202 using DIDs. In operation, an identity hub can be operated by an intermediary device 211, or may be instantiated within a given participant (e.g., users 204, hardware providers 206, and/or service providers 208). Identity hubs (or similar entities) can also be implemented by individual playback devices 210 and/or playback networks 210b. Identity hubs can serve as intermediaries that store data (e.g., the DID document or other suitable data), which can be encrypted to ensure that only the owner or authorized user of the identity hub possesses the necessary keys to access and decrypt it. The owner maintains granular control over who can access the stored information, with the ability to grant or revoke permissions for specific entities or applications. When interacting with third parties, individuals can selectively disclose relevant information from their identity hub, depending on the context and requirements. Additionally, identity hubs may incorporate features for revocation and expiration of access permissions, enabling the owner to cease data access as needed. Some implementations may also utilize off-chain storage solutions for larger or less sensitive identity-related data, while leveraging the underlying blockchain for authentication and key management. Additionally, identity hubs may incorporate event logging mechanisms. These logs comprehensively record every access request and action taken within the hub. This audit trail significantly enhances transparency and accountability, which can be beneficial for compliance and security.

Among examples, participating users 204 can include private individuals such as individual personal users (e.g., media content consumers, purchasers of media playback devices, etc.). Additionally or alternatively, participating users 204 can include businesses and commercial users, as well as artists, tastemakers, influencers, or other such individuals involved in generating or consuming media content. As described throughout, data regarding the user's content consumption history, media preferences, and/or any other suitable data can be stored, modified, and/or shared with other entities by virtue of the distributed ledger(s) 202. Additionally, participating users 204 may read data from the distributed ledger(s) 202 for use in playback, for instance obtaining a playlist from another user that has been shared via the distributed ledger(s) 202.

Participating hardware providers 206 can include platforms associated with playback devices (e.g., the SONOS media playback platform; a smart television platform for managing various content sources, etc.), as well as manufacturers or retailers of such playback devices. Additionally or alternatively, the participating hardware providers 206 can include providers of individual playback devices (e.g., audio playback device 210, a smart television, etc.), a group of such devices within the same household, or other such arrangement. In various examples, the participating hardware provider(s) 206 may contribute data to, and read data from, the distributed ledger(s) 202. For instance, the hardware provider(s) 206 may access a user's aggregated media content history and preferences via the distributed ledger(s) and utilize such data to facilitate media playback (e.g., generating playlists, tailoring playback of requested content according to the user's preferences, etc.).

In some cases, a participating hardware provider 206 such as a platform associated with playback devices (e.g., the SONOS media playback platform) may provide certain infrastructure services associated with the distributed maintenance of user content history and preferences. For instance, such as a platform may maintain a cross-service content database (e.g., a library that universally identifies all content independent of any particular media service). Such a database may aggregate, in addition to basic identifying information, various metadata pertaining to the content. Such metadata may include various content IDs that can be used for content across different content services (e.g., a universal ID can have associated therewith a first content ID for use to retrieve the media content SPOTIFY, a second ID for use to retrieve the particular content via APPLE MUSIC, and so forth). Accordingly, the database may be used by the system 200 to divorce content information from any single service provider.

As another example, a participating hardware provider 206 such as a media playback platform may serve as an "issuer" and/or a "verifier" for verifiable credentials to help administer formal credentials within the system 200. Such credentials can include, for instance, verified registration of certain participants such as service providers, 208, additional hardware providers 206, artists, and/or other commercial actors. Such credentials may indicate to an end user that a given account purporting to be associated with a particular person or entity (e.g., Taylor Swift's DID) is in fact associated with the person or entity that it purports.

Participating service providers 208 can include media content services (e.g., music content providers such as SPOTIFY, PANDORA, etc., video content providers such as NETFLIX, HULU, etc.). Additionally or alternatively, participating service providers 208 include voice assistant services (e.g., GOOGLE ASSISTANT, AMAZON'S ALEXA, APPLE'S SIRI, etc.). In additional examples, participating service providers 208 can include any entity that feeds system inputs associated with media playback (e.g., SONOS as a universal track ID provider), a lyrics database provider, a provider of auxiliary content or information provided by artists or labels, social media influencer supplemental content, and so forth. In various examples, the participating service provider(s) 208 may likewise contribute data to, and read data from, the distributed ledger(s) 202. For instance, the service provider(s) 208 may access a user's aggregated media content history and preferences via the distributed ledger(s) and utilize such data to facilitate media playback (e.g., generating playlists, tailoring results of voice-based search results according to user preferences, etc.).

In various instances, an individual device 210 takes the form of a blockchain-capable playback device 210. For instance, the playback device 210 can be configured to interact with the distributed ledger(s) 202 to perform certain operations specific to distributed ledger(s) 202, such as mining, staking, validating transactions, etc. In some examples, the blockchain-capable playback device 210 can include suitable hardware components (e.g., sufficient memory to store some or all of a blockchain history, one or more special-purpose processors (e.g., GPUs, ASICs, etc.), or otherwise) such that the blockchain-capable playback device 210 is configured to perform operations associated with the distributed ledger(s) 202. Examples include enforcing consensus mechanisms to confirm or validate transactions to be added to the distributed ledger(s) 202, such as mining (e.g., mining Bitcoin or other proof-of-work cryptocurrencies), validating (e.g., serving as a validator for Ethereum or other proof-of-stake cryptocurrencies), or other such operations. In some cases, the blockchain-capable playback device 210 can be configured to serve as a node of the distributed ledger(s) 202 (e.g., a full node storing a complete implementation of the decentralized protocol, an archival node, a pruned node, a mining node, a lightweight node, a second-layer node (e.g. a Lightning node operating on top of the Bitcoin blockchain), etc.).

In some implementations, a blockchain-capable playback device can utilize dedicated high-frequency audio transducers for data communication, particularly in devices that typically lack high-frequency drivers such as tweeters. These transducers, which may operate in ultrasonic or near-ultrasonic frequency ranges so as to be largely or completely inaudible to users, can be incorporated into various components of a media playback system, including subwoofers, LP turntables, audio/video components, and even data storage devices such as smart wallets. This approach enables secure and localized data transmission through acoustic waves, offering an alternative or complementary channel to traditional wireless communication methods. Additional details regarding the use of acoustic signatures to communicate information between devices can be found in U.S. Pat. No. 8,930,005, issued Jan. 6, 2015, titled "Acoustic Signatures in a Playback System," which is hereby incorporated by reference in its entirety for all purposes. Additionally or alternatively, audible audio signals (e.g., using conventional audio transducers configured to output audible audio signals) can be utilized for data transmission between playback devices.

One particularly advantageous application of this technology is the ability to communicate with air-gapped devices such as cryptographic smart wallets. For security reasons, such air-gapped devices are isolated from standard network communication channels and are preferably only selectively and/or never directly connected to the internet. By equipping these security-critical devices with a dedicated high-frequency transducer and one or more microphones, the blockchain-integrated device can establish an acoustic data channel for secure information exchange. This method of communication can enhance the overall security of the system by allowing sensitive operations, such as cryptographic key management or transaction signing, to occur on devices physically isolated from networks while still maintaining a functional connection to the blockchain-capable audio ecosystem. Additional details regarding the use of high-frequency transducers for data communication can be found in International Patent Application No. PCT/US2024/17126, filed Feb. 23, 2024, titled "Playback Devices with Dedicated High-Frequency Transducers," which is hereby incorporated by reference in its entirety for all purposes.

In various examples of the present technology, the concept of blockchain-capable playback devices extends beyond traditional home audio systems to encompass a wide range of environments and devices. This broader definition includes, but is not limited to, automobiles, mobile devices, augmented reality (AR) and extended reality (XR) personal devices, and other platforms capable of media playback outside the home. For instance, a vehicle's audio system can be integrated as a blockchain-capable playback device, allowing seamless incorporation and/or continuation of a user's media experience from home to car and vice versa. This integration may be particularly advantageous in the context of autonomous vehicles, where the automobile may evolve into an extension of the household living space. A s autonomous driving technology becomes more prevalent, vehicles are likely to transform into mobile entertainment and productivity hubs, fully incorporated into a user's blockchain-capable media ecosystem. Similarly, mobile devices and AR/XR wearables can function as portable blockchain-capable playback devices, maintaining consistent user experiences and preferences across various contexts and locations. This expanded conception reflects the potential for blockchain technology to provide a unifying framework for managing media experiences across diverse platforms, environments, playback devices, and/or playback device networks.

d. Example Record Sets

As shown in FIG. 2, the system 200 can maintain one or more record sets 212, which can include among other examples content experience record sets (CERS) 214, content network record sets (CNRS), and/or auxiliary record sets 218. In some examples, the various record sets 212 can be specific to an individual user (optionally associated with a single identifier such as a DID described above). As noted previously, at least a portion of the data can be stored directly on-chain via the distributed ledger(s) 202 (e.g., all data written directly to blocks of a blockchain, permitting public access thereto). Additionally or alternatively, some or all of the data may be stored off-chain, for instance via an "identity hub" or other intermediary device or service, via the blockchain-integrated playback device 210, or via other off-chain storage device. In such instances, on-chain data can include a pointer to the off-chain data that permits a user to provide selective access to particular data (e.g., a subset of the record sets 212, a subset of the CERS, etc.) via the distributed ledger(s) 202.

FIG. 3 illustrates an example structure for CERS data 300. In various implementations, the CERS data 300 can reflect an aggregated history of the user's content consumption history. In the illustrated example, the CERS data 300 is organized according to content consumption events, however other structures may also be used. For each content consumption event, corresponding data can be recorded. As shown in FIG. 3, the corresponding data can include event time (e.g., time, duration, scrub information) as well as the associated playback device and/or platform used. The corresponding data can further include any identified user preferences (e.g., preferred service provider, other preferences such as playback settings (e.g., EQ, cross-fade, etc.)), as well as the entity adding the particular record. For instance, the record of a given media consumption event can be added to the CERS by a playback device, a hardware provider, a media content service, or other entity, and the identity of this entity can be associated with the corresponding entry in the CERS.

With continued reference to FIG. 3, the CERS data 300 includes a source of the record (e.g., how was the record information identified as being associated with the particular user) and content metadata (e.g., track name, artist name, album name, universal ID, etc.). Finally, the CERS data 300 can include a record of all transport control performed during the consumption event (e.g., pause, skip, etc.). Any additional data associated with the media consumption event can likewise be stored as CERS data 300 for storage via the distributed ledger(s) 202.

FIG. 4 illustrates an example structure for CNRS data 400. In various implementations, the CNRS data 400 can reflect a record of the various devices, platforms, content services (and so on) that form the user's overall network or ecosystem of content consumption. The CNRS data 400 can be divorced from any particular content consumption event. However, appropriate items from the CNRS associated with the user may be referenced by the CERS in association with any given consumption event (e.g., identifying a particular playback device or platform associated with the user).

In operation, the CNRS can include a wide range of data with many alternative fields for potential population. FIG. 4 illustrates an example structure for CNRS data 400 with only a select few examples shown. As depicted in FIG. 4, the CNRS data 400 can include the participant category (e.g., individual user, device, platform, content service, voice service, etc.), as well as an associated provider name (e.g., a company name associated with a platform, affiliated entities, etc.). Specific information related to a device, user type, or account type as well as network ID information can likewise be stored via the CNRS. The entity's playback settings (preferred or actual) such as equalization, brightness, etc. can be stored, as well as configuration data (e.g., grouping or pairing of playback devices, room or location, etc.). The CNRS data 400 can further include time information indicating when the particular entity was registered, time of activity or inactivity, time of purchase (in the case of a device), etc. Finally, additional metadata such as an assigned name, location information, and/or any other suitable information associated with an entity's CNRS can be included in the CNRS data. In operation, the CNRS data 400 can be maintained and/or accessed via the distributed ledger(s) 202 as described elsewhere herein.

In addition to the CERS 214 and the CNRS 216, one or more auxiliary record sets 218 can be stored and/or accessed via the distributed ledger(s) 202. In various implementations, any other type of data or record sets may be implemented either instead of or in addition to the example information reflected in the CERS 214 and CNRS 216. Additionally, auxiliary record sets 218 can be maintained as a different type or tier of record set from the CERS 214 or CNRS 216. For instance, such auxiliary record sets 218 might not be defined or required by the system 200 for operation via the distributed ledger(s) 202, but may be implemented at the discretion of third parties. In some examples, various such data may be stored in smart contracts (e.g., smart contract(s) 222) associated with the distributed ledger(s) 202.

One example auxiliary record set 218 includes playlists. For instance, a user may create a playlist of media content. The underlying data for the playlist may then be stored as a smart contract 222 or NFT 220, with a pointer to the smart contract 222 or NFT 220 stored in the user's CERS 214. Creation of the playlist (and an associated playlist ID) can be stored in the user's CERS 214, with reference to the network address and criteria for the corresponding smart contract 222 or NFT 220. Moreover, the CERS 214 may maintain playback, interaction, edit, and/or preference information associated with the playlist. Separately, the user may attach various access rights or conditions to the smart contract 222 effecting the playlist for future interactions by others (e.g., only certain users may access the playlist; requiring payment to access the playlist; limiting editing or addition rights, etc.). Optionally, the user may establish a payment gateway for access to the playlist by the public (e.g., designating a recipient address to receive cryptocurrency via the distributed ledger(s) 202 that automatically grants access to the playlist (e.g., via a smart contract 222)).

Another example of an auxiliary record set 218 is an aggregated playlist. A third party (e.g., a hardware provider platform) may generate a playlist based on mining of selected public user CERS information (e.g., all users in the Boston metro area). The aggregate playlist can be stored and/or maintained via the distributed ledger(s) 202 as described above. Optionally, the third-party owner of the aggregated playlist can require payment for access, or otherwise credential access (e.g., based on subscription, membership, etc.) to the aggregated playlist, optionally using a smart contract 222.

In some implementations, auxiliary record sets 218 can relate to premium information or experiences provided by a hardware provider 206 or other suitable entity. For instance, a hardware provider 206 (or other third party) may provide access to information or settings to deliver unique content experiences. As one example, such an entity may provide artist-curated equalization or other playback settings for use with particular playback device configurations when listening to that artist's content. As another example, the unique content experience can include supplemental content associated with given media content (e.g., artist narrative accompanying a song, visual content accompanying a song, an extended edition of a song, etc.). The third party may require payment, credentials, or otherwise gate access to such unique content experiences, optionally utilizing a smart contract 222.

In another aspect, the auxiliary record sets 218 can include additional information beyond media content consumption and preferences. Examples include additional sensor data (e.g., sensor data from playback devices or other network sensors reflecting data characterizing a user's environment), contextual awareness information (e.g., user presence, relative locations of playback devices, user activity levels, etc.), or any other suitable data.

In various implementations, device characteristics and/or settings may be included within auxiliary record sets 218, the CERS 214, and/or the CNRS 216. Suitable examples include device model, version number, capabilities (e.g., number and type of audio transducers, supported wireless communication protocols, voice-processing capabilities, etc.). Further examples include settings or configurations, which may be associated with a particular playback event (e.g., calibration/equalization settings, volume, etc.).

As another example, an auxiliary record set can encompass a wide range of data relevant to the environmental context for use in personalizing media playback. Additional details regarding such data relevant to environmental context and control using machine learning can be found in U.S. Provisional Application No. 63/516,343, filed Jul. 28, 2022, titled "Personalization Techniques for Media Playback Systems," which is hereby incorporated by reference in its entirety for all purposes. Among examples, such an auxiliary record set may include data collected from various sensors, general device metadata, and comprehensive positioning or localization information, whether in raw, formatted, or conditioned forms. Sensor data may be derived from a variety of different sources, such as Bluetooth, WiFi, ultra wide-band technology, acoustic signaling, ultrasound, or other signaling and communication means that facilitate localiza-tion, acoustic topology mapping, or similar spatial and contextual information. Such an auxiliary record set may also incorporate input data representing user interactions with the media playback system, along with associated context information like date, time, and location. Device configuration data, including the identity of affected play-back devices, current volume settings, bonding group status and composition, and the devices' present locations may also be included. User interaction data may encompass volume adjustments, audio content source selections (e.g., playlists, streaming channels, radio stations), and playback device grouping or ungrouping commands. Additionally or alternatively, the auxiliary record set can include movement or localization information, potentially indicating a user's relocation of portable playback devices, as obtained through a positioning system application. Such data collection may enable machine learning applications for enhanced house-hold context awareness and control.

e. Example Methods for Maintaining, Accessing, and Modi-fying Record Sets Via Distributed Ledger(s)

Figure 5:
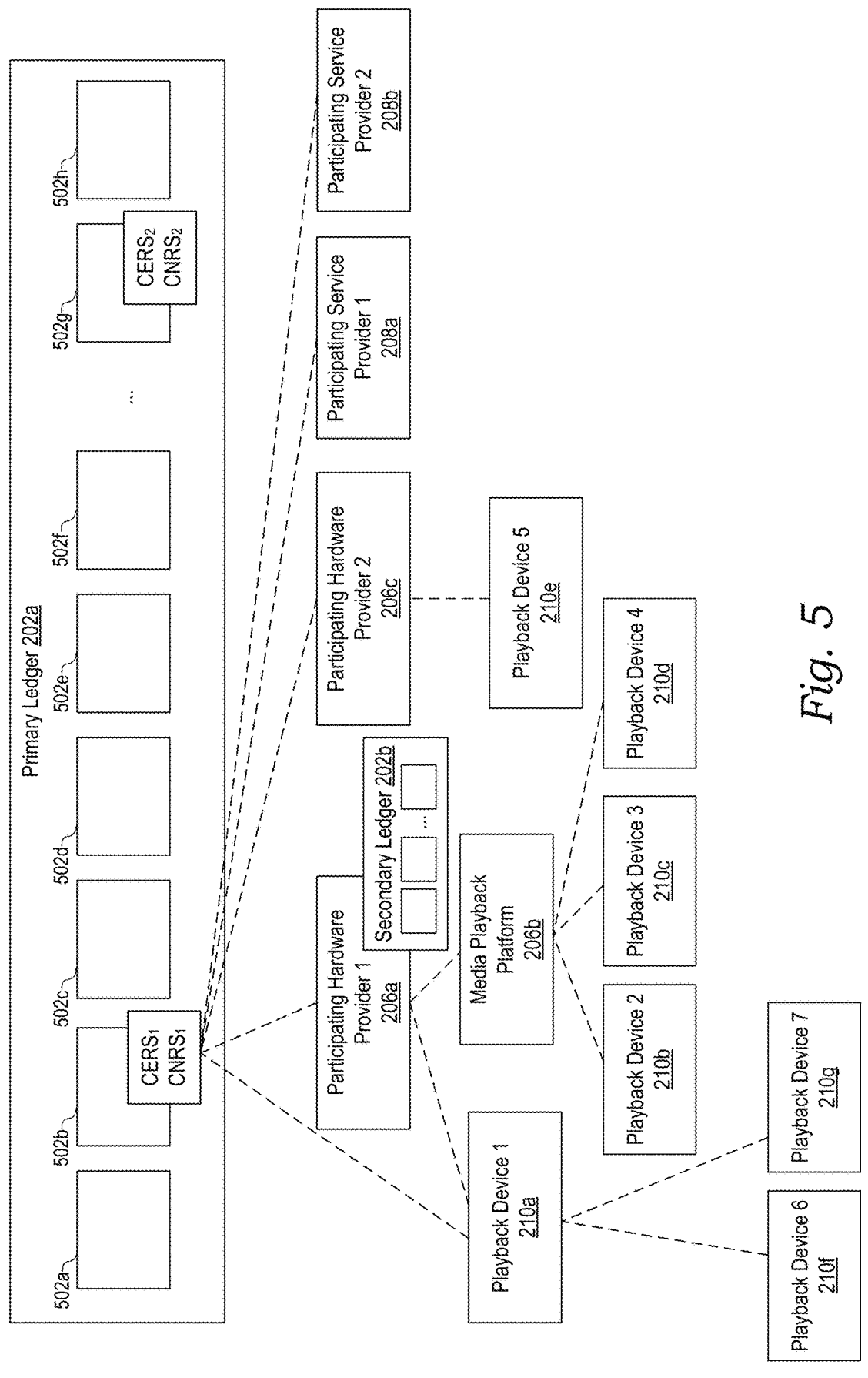
FIG. 5 is a schematic diagram illustrating media playback system interactions involving a distributed ledger in accordance with aspects of the disclosed technology.

FIG. 5 is a schematic diagram illustrating media playback system interactions involving a distributed ledger. As illus-trated, a primary ledger 202*a* (e.g., Bitcoin, Ethereum, or any other distributed ledger 202 as described previously) can take the form of a blockchain in which data is stored in a series of blocks 502*a*-*h*, with each block reflecting all the data of the preceding blocks in addition to appending newly added data. In this manner, any given block 502 reflects the entire history of the primary ledger 202*a* up to that point in time. In the example shown in FIG. 5, CERS and CNRS data is first written to the primary ledger 202*a* at block 502*b* (labeled as CERS$_1$ and CNRS$_1$). Subsequently, updated CERS and CNRS data can be written to the primary ledger 202*a* at block 502*g* (labeled as CERS$_2$ and CNRS$_2$). This updated entry of CERS and CNRS data can reflect, for example, any interactions, media consumption events, or other activity that has occurred between the previous entries recorded at block 502*a*. In this manner, updates to the CERS and CNRS data can be written to the primary ledger 202*a* on an ongoing basis to maintain up-to-date information acces-sible by other network participants of the media playback system that are in communication with the primary ledger 202*a*.

A s shown in FIG. 5, the CERS and CNRS data can be drawn from a variety of entities. For instance, a first play-back device 210*a* can write data directly to the primary ledger 202 for entry in the CERS and CNRS. Additionally or alternatively, the first playback device 210*a* can commu-nicate its data to a first participating hardware provider 206*a*, which may in turn transmit the associated data to primary ledger 202*a* for entry in the CERS and CNRS. The first participating hardware provider 206*a* can also have associ-ated therewith a media playback platform 206*b* (e.g., the SONOS media playback platform), which in turn can be associated with second, third, and fourth individual playback devices 210*b*, 210*c*, and 210*d* respectively. These playback devices 210*b*, 210*c*, and 210*d* may be part of the same household or environment, for instance, and may each transmit their respective data to the media playback platform 206*b*, which in turn transmits this data (and optionally additional data collected at the level of the media playback platform 206*b*) to the first participating hardware provider 206*a*. As noted below with respect to FIGS. 10-17, in some implementations a blockchain-capable playback device can also include software and/or hardware that enables capabil-ity involving artificial intelligence, including generative media components and/or generative context and control components. Among examples, any of the devices depicted in FIG. 5 can take the form of such a blockchain-capable device that includes generative media components and/or generative context and control components.

In another aspect, an individual playback device (e.g., first playback device 210*a*) can aggregate data from other play-back devices (e.g., sixth playback device 210*f* and seventh playback device 210*g*). This aggregated data (e.g., data from each of the first, sixth, and seventh playback devices 210*a*, 210*f*, and 210*g*) can be sent from the first playback device 210*a* to the primary ledger 202*a*. Additionally or alterna-tively, such aggregated data can be transmitted first from the first playback device 210*a* to a hardware provider, a play-back network (e.g., a household), a media platform, or other entity, which in turn communicates with the primary ledger 202*a*. In yet another implementation, each individual play-back device may communicate directly with the primary ledger 202*a* without data being aggregated by any interme-diaries.

Accordingly, the first participating hardware provider 206*a* can aggregate data from the various playback devices 210*a*-*d* as well as the media playback platform 206*b*. Optionally, and as illustrated in FIG. 5, the first participating hardware provider 206*a* can implement a secondary ledger 202*b*, which can store some or all of the collected data from the various devices. This secondary ledger 202*b* can take the form of a blockchain, which may be public or permissioned. Additionally or alternatively, the secondary ledger 202*b* can be a non-blockchain database that aggregates data collected from a variety of different devices and platforms. The first participating hardware provider 206*a* may transmit data to the primary ledger 202*a* periodically, continuously, or oth-erwise for entry in the CERS and CNRS, as appropriate.

In some implementations, a secondary ledger 202*b* can be implemented at the level of the media playback platform 206*b*, one or more individual playback devices 210, or a playback network (e.g., a collection of individual playback devices 210 grouped together within an environment such as a household). In such scenarios, one or more devices may operate together to implement private or semi-private block-chain that operates using a conventional blockchain proto-col, with individual devices within the network (e.g., within the same household) serving as nodes for that particular blockchain.

In various examples, the CERS and/or CNRS data can be updated (e.g., data from the various devices, providers, and platforms can be incorporated into the CERS and/or CNRS and written to the primary ledger 202*a*) according to various timing schemes. In some instances, the data is updated at regular intervals (e.g., each minute, hour, day, etc.). The data can also be updated in response to certain trigger events or conditions. For instance, following each media consumption event, the CERS data may be updated. Similarly, following the addition of a new device or service to a user's account associated with the media playback platform 206*b*, the CNRS data can be updated. A s another example, CERS and/or CNRS data can be updated based on a user prompt or instruction received from another network device. In one example use case, when a user wishes to stop paying for a given service but wants to retain access to her listening history through that service, she may provide instructions for her CERS and/or CNRS data to be updated so that she can port the data over to a different media content service.

As depicted in FIG. 5, the CNRS and CERS data also reflect contributions from a second participating hardware provider 206c, which in turn can receive data from a fifth playback device 210e. Optionally, the second participating hardware provider 206c can be different from the first 206a (e.g., SONOS vs. SAM SUNG). Furthermore, a first participating service provider 208a and a second participating service provider 208b can provide data for updating the CERS and/or CNRS via the primary ledger 202a. In this manner, data regarding media content consumption (e.g., consumption history, preferences, or other suitable information) can be aggregated from a variety of different entities within a user's ecosystem, with data from all the different sources contributing to the CERS and/or CNRS stored via the primary ledger 202a. As such, the different entities can each separately communicate openly and permissionlessly with the primary ledger 202a, allowing for a user to aggregate data across various entities that may otherwise be reluctant to share information or cooperate with one another.

As depicted in FIG. 5, the CERS and/or CNRS data is updated overtime. This can reflect additional data newly received from one or more of the depicted entities (e.g., first participating hardware provider 206a, second participating service provider 208b, etc.) subsequent to the previous entry to the primary ledger 202a (i.e., subsequent to block 502b of the primary ledger 202a). In some examples, data is collected from some or all of the entities for each "update" to the CERS and/or CNRS, even if no new data has been generated or obtained in that interval.

While FIG. 5 depicts updating the CERS and CNRS data concurrently, in various implementations these data sets can be updated separately and/or according to distinct schedules, trigger conditions, etc. Additionally, while CERS and CNRS data is depicted, the same architecture can be used for updating additional data associated with particular entities, including auxiliary record sets associated with media content, or data not associated with media content.

In some instances, multiple parties may submit records associated with the same event. For instance, if a user plays back media content via the first playback device 210a that is streamed from the first participating service provider 208a (e.g., SPOTIFY), then both the first playback device 210a and the first participating service provider 208a may submit corresponding data to the primary ledger 202a for updating the CERS. In this example, the first playback device 210a may capture data including, for instance, an identification of the media content (either directly captured or inferred), an identification of the playback device and system configuration associated with the event, and broader state information, among other information that may be proprietary to the first playback device 210a and/or the first participating hardware provider 206a with which the first playback device 210a is associated. On the other hand, the first participating service provider 208a (e.g., SPOTIFY) may capture data regarding the media playback event that includes absolute information regarding the content ID, associated media information specific to the media content service (e.g., playlist or album), broader preference or taste information corresponding to the content, among other information that is proprietary to the service provider's view on the event.

In such cases, both the first playback device 210a and the first participating service provider 208a may submit data regarding the event—together with all of their respective proprietary information regarding the event—for addition to user's CERS stored via the primary ledger 202a. In some implementations, such entries can be automatically identified and reconciled (e.g., using a smart contract to collect data from the various entries and perform reconciliation before outputting an updated CERS to the primary ledger 202a). Additionally or alternatively, a user interface can be provided that allows a user to manually interact with the CERS (or CNRS or other data stored on-chain). The interface may include tools for the user to indicate potential duplicate entries and an option to reconcile by merging the entries, deleting one of the entries, or otherwise reconciling the two. In operation, such reconciliation can take the form of the CERS being updated at the next instance of being written to the primary ledger 202a. And while the primary ledger 202a may maintain an immutable history of previous states of the CERS, a user querying the primary ledger 202a to access the CERS can access the updated version, in which the reconciliation has been indicated. Moreover, in some implementations a "raw," unedited and/or unreconciled version of the CERS data (or CNRS or other data) may be maintained in addition to the edited version. In some cases, different versions of the data may be made use of in different ways, and for different applications.

In various aspects, individual participating entities (e.g., participating users 204, hardware providers 206, playback devices 210, etc.) may interact with the primary ledger 202a directly or via one or more intermediaries. In some instances, the use of an intermediary can simplify or otherwise aid the user experience by managing the on-chain interactions on behalf of a user or other participating entity. Additionally, because blockchain data storage can be expensive and inefficient, it can be useful to maintain at least a portion of the relevant data via an intermediary computing device, with the data periodically written, in whole in part, directly to the primary ledger 202a. In at least some cases, intermediated access also provides a user with more fine-tuned control over data permissions. For instance, while record sets can ultimately be maintained on (or by ultimate reference to) a primary ledger 202a, in some instances user data can be stored via intermediary devices that are not publicly accessible. As public blockchains are generally transparent and permissionless, providing visibility to all data written thereto, it can be beneficial to provide a mechanism for revealing only select user data to outside observers.

For instance, an individual playback device (e.g., first playback device 210a) may itself interact directly with the primary ledger 202a to contribute data to the CERS and/or CNRS data stored on-chain. In another instance, a participating provider (e.g., first participating hardware provider 206a) may interact with the on-chain record set on behalf of the player device (e.g., first playback device 210a) and/or user that is a part of the participating provider's platform. In such an instance, the first participating hardware provider 206a may batch information (e.g., on an hourly, daily, or weekly basis; or on an event-driven basis) and as a result, reduce cost of interaction with the primary ledger 202a. In various implementations, the first participating hardware provider 206a can update on an ongoing basis or may do so in response to instruction from a user or other network entity. In some instances, user instructions may be provided by a user interface prompt presented to a user via a platform (e.g., a controller device associated with the media playback platform 206b), or in response to other user activity.

In some cases, it may be infeasible or undesirable to store all relevant user data directly on the primary ledger 202a, either due to concerns for privacy or due to cost or efficiency considerations. In such scenarios, data can be stored via the secondary ledger 202b which is maintained privately by the first participating hardware provider 206a or other participating entity. Optionally, the secondary ledger 202b can be configured such that user data may only be accessed by a using the same private key that a user or other entity would use to access user data stored via the primary ledger 202a. Alternatively, a separate peer-to-peer network (e.g., Inter-Planetary File System (IPFS)) can be used for storage of data including CERS and CNRS data. In yet other implementations, a participating entity can serve as an identity hub for storing encrypted user data associated with a DID. As noted previously, identity hubs can provide owners with granular control over who can access the stored information, with the ability to grantor revoke permissions for specific entities or applications. This can allow a participant to selectively disclose relevant information from their identity hub to the primary ledger 202a (e.g., only selecting certain media consumption events to reveal, or only certain device or platform information). Among examples, any suitable participant can serve as an identity hub. In particular examples, a dedicated intermediary service device 211 serves as an identity hub for permitting fine-tuned control of which user data to publish to the primary ledger 202a.

In instances in which an individual playback device 210a implements an identity hub (or other local storage service that can communicate with the distributed ledger(s) 202), such a playback device 210a may store data associated with a particular user. Other data also associated with that particular user may be stored via a second playback device (e.g., another playback device within the same household). In some example, data might be stored redundantly across multiple playback devices associated with the user. Data might also be stored on BOTH a playback device owned and/or controlled by the particular user while also being stored by a provider (e.g., a cloud-service provider). Any of these instances of storing may be primary or secondary repositories of user data, depending on the desired configuration. In some cases, one instance might be accessible via the distributed ledger(s) 202, while other instances may serve only as offline backups that might be restored to the online system if desired.

Using identity hubs (e.g., implemented as intermediary device(s) 211) or other suitable approaches, participants (e.g., end users 204) may elect to make their data (e.g., record sets 212 (FIG. 2)) entirely private, publicly viewable, usable, or otherwise aggregable with a high degree of control. As such, users may enjoy benefits offered by making their data available, ranging from mutual benefit of participating in experiences enabled by aggregation of data, the "unlocking" of various benefits offered by other participants (e.g., exclusive access to certain media content), and/or even direct (on-chain) payment for access to the user's data (among many other potential examples). In some implementations, participants are able to selectively make their data (e.g., CERS, CNRS, or other data) available to specific participants (e.g., providers, end users, etc.). Additionally, the data may be made accessible with different degrees or tiers of access, for instance providing some users (a spouse or a friend) with full access, while providing only limited access to another participant (e.g., a media content service).

In various examples, CERS data as maintained by a given participating hardware provider, service, or platform may remain proprietary to that participating entity. This arrangement may offer individual providers the ability to tailor the nature of their interactions with the primary ledger 202a to align with their particular interests and business objectives. In at least some instances, however, once a version of that data has been added to the primary ledger 202a (e.g., written to a block of the blockchain as CERS data, CNRS data, or other such data), the submitted data then resides with the associated user. For instance, the associated user is free to access, transport, and/or modify (e.g., by appending further data to the records via the primary ledger 202a) the data as the user sees fit and without any constraint imposed by other entities.

In various implementations, each hardware provider, platform, service provider, or other participant may provide user-facing tools or interfaces to allow users to manage their own data (e.g., to read/write data to/from the primary ledger 202a or to/from an intermediary device storing data). In one example, a user may be prompted to approve updated data before it is submitted to the primary ledger 202a for incorporation in the CERS data.

Optionally, a given end user may utilize multiple different identifiers, which may be maintained separately or may be linkable together according to user preference. For instance, a user may wish to have a first identifier associated with family media content enjoyed by all members of the household, and a second identifier associated with personal media content that the user enjoys but that the remaining members of her household do not. In various implementations, different identifiers may have different functions, rights, constraints, or other configurations depending on their designation. As one example, a fully public identifier may be associated with immutable and fully viewable public data. In contrast, a fully private identifier may be entirely editable, with only select aspects publicly accessible to external observers. As noted above, users may optionally link and/or port data been such associated identifiers. Among examples, a user may have an identifier that legibly corresponds to a real-world ID (e.g., the user's legal name) or it can be a pseudonymous identifier. Moreover, a given individual might have or operates multiple identifiers (e.g., a personal ID as a consumer, a second personal ID as a social influencer or tastemaker, an artist ID as a content creator, and/or a business ID as a service or hardware provider). In various examples, multiple different entities (e.g., participants of the system 200) may help verify or otherwise lend some sort of validation to a given user ID. Verification and/or validation can be increased by cross-correlating interactions among services (e.g., each of SPOTIFY and SONOS may have separate and unique verification processes, but a user may attach benefit from each and the resulting ID benefits from both). In some implementations, such identifiers may be included as metadata to be recorded among the record sets (e.g., who is watching/listening, which user profiles are accessing given content, etc.).

FIGS. 6-9 are flow diagrams of example methods 600, 700, 800, 900 for accessing and/or updating content record data via a distributed ledger. The methods 600, 700, 800, 900 can be implemented by any of the devices or systems described herein (e.g., system 200 or any of the entities described therein, such as a participating user 204, hardware provider 206, service provider 208, and/or playback device 210), or any other devices or systems now known or later developed. Various examples of the methods 600, 700, 800, 900 include one or more operations, functions, or actions illustrated by blocks. Although the blocks are illustrated in sequential order, these blocks may also be performed in parallel, and/or in a different order than the order disclosed and described herein. A lso, the various blocks may be combined into fewer blocks, divided into additional blocks, and/or removed based upon a desired implementation.

In addition, for the methods 600, 700, 800, 900 and for other processes and methods disclosed herein, the flowcharts show functionality and operation of possible implementations of some examples. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random-Access Memory (RAM). The computer readable medium may also include non-transitory media, such as secondary or persistent long-term storage, like read only memory (ROM), optical or magnetic disks, compact disc read only memory (CD-ROM), for example. The computer readable media may also be any other volatile or non-volatile storage systems. The computer readable medium may be considered a computer readable storage medium, for example, or a tangible storage device. In addition, for the methods and for other processes and methods disclosed herein, each block in FIGS. 6-9 may represent circuitry that is wired to perform the specific logical functions in the process.

Figure 6:
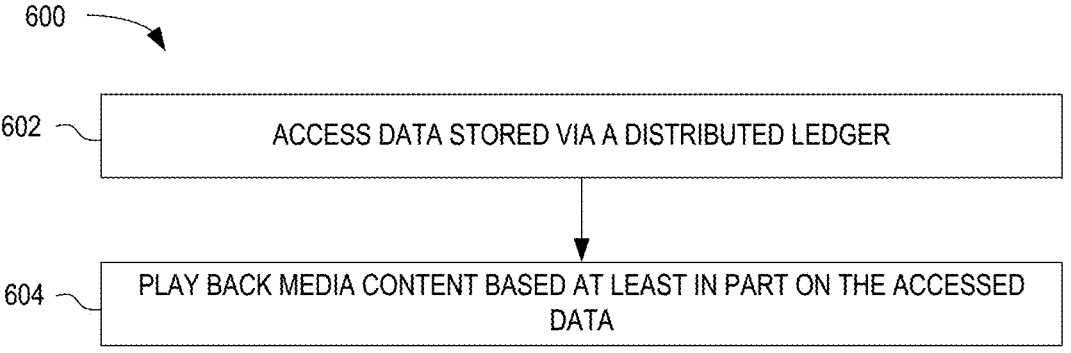

With reference to FIG. 6, the method 600 begins at block 602, which involves accessing data stored via a distributed ledger. In various implementations, the data can be stored directly on the distributed ledger (in whole or in part), or the data can be stored via other devices (e.g., intermediary devices, user devices, etc.), with pointer data being stored directly on the distributed ledger. The distributed ledger can be a public blockchain such as Ethereum, Bitcoin, Solana, etc., or may optionally be a private or semi-private blockchain or non-blockchain ledger as described above. In various examples, the data can include any of the record sets described previously herein (e.g., content experience record sets (CERS), content network record sets (CNRS), auxiliary record sets, etc.). As noted above, in some cases such data is stored directly on the distributed ledger itself, while in other instances the blockchain can store a pointer (e.g., a URL or URI) that directs to the stored location of the data.

At block 604, the method 600 involves playing back media content based at least in part on the accessed data. As one example, the accessed data may include particular media content (e.g., audio data stored via an NFT, or a pointer to media content stored elsewhere, a playlist of media content, etc.), in which case block 604 may involve playing back the particular media content. In some instances, the accessed data obtained in block 602 can include particular content preferences, such as equalization settings, brightness or color settings (in the case of visual content), or other such playback settings. In such cases, the media played back in block 604 may be played back using settings or other playback characteristics informed by the data stored via the distributed ledger, or generated in real-time seeded by the distributed ledger data.

Figure 7:
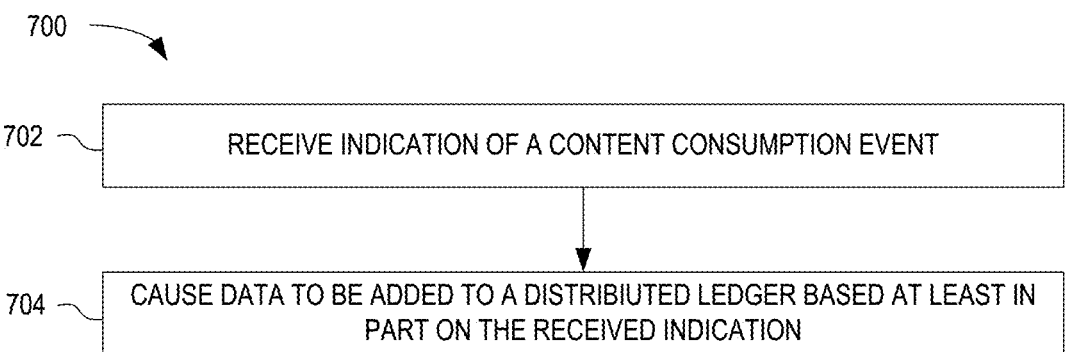

FIG. 7 illustrates an example method 700, which begins in block 702 with receiving an indication of a content consumption event. Examples of suitable content consumption events include initiation or modification of media playback, modification of a playlist of media content, or any other activity associated with a user's consumption of media content. In some examples, an indication of such an event can be obtained by the same playback device that was involved in the event (e.g., the playback device via which the user initiated playback of a particular song). Alternatively, an indication of such an event may be obtained from a different device. For instance, a controller device associated with a media playback system may detect the content consumption event and transmit the indication to a different network device, such as a blockchain-integrated network device.

In block 704, the method 700 involves causing data to be added to a distributed ledger based at least in part on the received indication. As described previously with respect to FIG. 5, a content experience record set (CERS) can be stored, maintained, and/or updated via one or more distributed ledger(s). Among examples, a blockchain-integrated network device (e.g., a suitable playback device or other computing device) can cause data reflecting the content consumption event to be written to the distributed ledger in a manner that updates the CERS, appends data to the CERS, or otherwise adds data to the distributed ledger. In various examples, the data can be written directly via the network device that received the indication in block 702 (e.g., a blockchain-integrated playback device), or alternatively the data can be provided to one or more intermediaries, which in turn cause data to be written to the distributed ledger.

With reference to FIG. 8, the method 800 begins in block 802 with receiving an indication of a content network event. A content network event can include any modification of the various data associated with a content network record set (CNRS) as described previously. Examples of suitable content network events include a user's new association with a particular media playback platform, content service, voice service, or playback device; a user adding a playback device to the user's media content platform and/or household; any modifications to grouping or bonding of the user's playback devices; use of a new network ID by the user to access media content; a modification of playback settings (e.g., equalization, brightness or other visual modifications for video playback, etc.), or any other change to data that may be stored via a corresponding content network record set (CNRS) associated with a user. In some examples, an indication of such an event can be obtained by the same device that was involved in the event (e.g., the control device by which the user associated a new media content service with her media playback system). Alternatively, an indication of such an event may be obtained from a different device.

In block 804, the method 800 involves causing data to be added to a distributed ledger based at least in part on the received indication. As described previously with respect to FIG. 5, a CNRS can be stored, maintained, and/or updated via one or more distributed ledger(s). Among examples, a blockchain-integrated network device (e.g., a suitable playback device or other computing device) can cause data reflecting the content network event to be written to the distributed ledger in a manner that updates the CNRS, appends data to the CNRS, or otherwise adds data to the distributed ledger. In various examples, the data can be written directly via the network device that received the indication in block 804 (e.g., a blockchain-integrated playback device), or alternatively the data can be provided to one or more intermediaries, which in turn cause data to be written to the distributed ledger.

FIG. 9 illustrates another example method 900 in which one aggregating playback device can collect information from a variety of different submitting playback devices, and then updating the distributed ledger based on the aggregated information. As illustrated, the method 900 begins in block 902 with receiving, at an aggregating playback device, first content information from a first submitting playback device. And in block 904, the aggregating playback device receives second content information from a second submitting playback device. The content information can include any suitable information, including but not limited to the data types relating to the CERS as described above with respect to FIG. 3.

Among examples, the aggregating playback device, the first submitting playback device, and/or the second submitting playback device may be positioned within the same environment (e.g., as part of the same household, the same playback network, connected over a Local Area Network, or other such association). Additionally or alternatively, at least one of the first submitting playback device or the second submitting playback device can be remote from the aggregating playback device (e.g., connected over a Wide Area Network connection).

At block 906, the aggregating playback device stores the first and second content information. In various implementations, this data storage can include local storage on the aggregating playback device itself, storage via other local devices on the same local network, remote storage via cloud servers, or using private or semi-private distributed ledgers (e.g., private blockchains as described previously).

The method 900 continues in block 908 with causing data to be added to a distributed ledger based at least in part on the stored first and second content information. As described previously with respect to FIG. 5, CERS (or other content information) can be stored, maintained, and/or updated via one or more distributed ledger(s). Among examples, the aggregating playback device can be a blockchain-integrated network device (e.g., a suitable playback device or other computing device) that causes data reflecting the first and second content information to be written to the distributed ledger in a manner that updates, appends, or otherwise adds data to the distributed ledger. In various examples, the data can be written directly via the aggregating playback device, or alternatively the data can be provided to one or more intermediaries, which in turn cause data to be written to the distributed ledger.

f. Example User Data Export Using Decentralized Ledgers

The use of decentralized ledgers can improve the usability and/or facilitate the export of user data associated with media services, offering improvements in both data portability and user control over personal information. Blockchain-enabled management of user data, as described above, can enable users to manually submit their historical media consumption data to a blockchain-based record set, thereby enhancing data interoperability across various streaming services.

Modern streaming platforms typically offer users the ability to download extensive personal data related to their service usage. A given service, for instance, may provide "Account Data" and "Extended Streaming History" and/or other such similar app usage information. This data typically encompasses a wide range of information including listening history, playlists, search queries, library, follow information, payments, user data (e.g., username, email, location, etc.), liked content, customer service history, inferences, voice input, and user interactions. Any of these pieces of information (or other such information related to user interactions with media content services) can form part of a user's CERS or CNRS as described above.

The process of submitting this data to a blockchain record set may involve several steps. Initially, a user can download her personal data from the streaming service's platform. This downloaded data, often in formats like JSON, then undergoes conversion and extraction to fit the blockchain record set format. This step may generally involve curating or conditioning the downloaded data including, for example, extracting only the information that maps to available records, converting data from its original format to a blockchain-compatible one, and tailoring the conversion process for each specific service to accommodate variations in data structure and content.

Users may then submit the downloaded and/or converted data to the blockchain record set through a facilitated interface. The system stores both a conditioned/cleaned version of the data conforming to standard record sets and/or potentially a "raw" version of the original data for preservation purposes. Among examples, this process may include storing additional proprietary information not directly related to playback events, such as content added to the user's library over time, locally downloaded content, user-created playlist details, "liked" or "followed" artists and other users, search query history, and voice request history for content.

This approach allows users to contribute their listening history to their CERS and/or CNRS directly, rather than relying solely on service-facilitated submissions. The submitted data may be reconciled with or used to supplement information from other sources, including data submitted directly by the service providers. This aligns with various data portability laws and regulations throughout the work including, for example, GDPR's data portability objectives, enabling users to transmit their personal data for use in other services and helping to break down the data silos that exist between different content services. Moreover, the use of blockchain technology in this context ensures that the submitted data is securely stored, immutable, and accessible across different platforms. It provides users with greater control over their personal data and allows for a more comprehensive and portable record of their media consumption history.

g. Example Methods for Additional Data Management via Distributed Ledger(s)

In addition to or instead of the data management techniques described above that utilize distributed ledger(s) for managing of a user's media content consumption data, aspects of the present technology can also be usefully applied to other contexts, such as reputation management, rights management, and/or artist compensation. For instance, in addition to or instead of merely recording data, a distributed ledger can be leveraged to enable actual participation in content experiences. Examples include maintaining a record regarding ownership of content or other digital assets (e.g., media content owned by a user, supplemental content associated with media content). Such ownership may be reflected via tokens held by the user (e.g., secured by private keys held by the user; held within the user's wallet, etc.). In some examples, a particular token (e.g., NFT or otherwise) may be required for a user to access certain experiences or content.

In some implementations, a user may wish to broadcast his user data stored on the distributed ledger(s), for instance to share a curated playlist with followers, for an artist to share content, or other such applications. Optionally, the CERS data can log and/or maintain personally curated content such as playlists as well as a record of the extent to which a playlist has been accessed by others.

In additional aspects of the present technology, distributed ledger interactions as described herein can be used to facilitate rights management and associated artist compensation for use of the underlying media content. As one example, user data regarding content consumption (e.g., CERS data) may be used to establish and/or manage a foundation whereby listening (and/or viewing) information is used to compensate artists based on the number of listens. Such a foundation may be established and/or managed by a participating hardware provider. Additionally or alternatively, such a foundation may be established as a DAO, in which case automated input regarding media consumption events can be transmitted to the associated smart contract, which can trigger transfer of tokens (e.g., virtual currencies) to effect payment from listeners (or other participating entities) to the artist.

As another example, participants (e.g., individual users) may establish proprietary mechanisms by which they pay or tip the artists that they listen to most often. For instance, a user may choose to add $100 per year in virtual currency onto the platform, which may then be used to pay or tip particular artists on a proportional basis corresponding to the total amount of cross-platform listening history.

With the increased availability of on-chain data regarding content consumption, content networks, and otherwise, it can be beneficial to provide analytics services that evaluate and/or monitor content activity (as recorded by users who have opted in share data) that provides artists, labels, and other commercial entities additional insight into listening preferences and trends. Such an analytics service may be operated by a participating entity such as a hardware provider or service provider. Because such data can capture user behavior across a range of platforms and services, the resulting analysis may provide a more accurate and comprehensive perspective on user engagement with the particular content.

In an additional aspect of the present technology, an artist-facing interface can be provided to enable artists to offer auxiliary content to fans. Such auxiliary content may include, for example, exclusive media content (e.g., artist interviews, alternative versions of media content, accompanying visual artwork, etc.) that the artist wishes to share only with select fans. Access can be gated via the distributed ledger(s) as described above. For instance, participant entities may access the auxiliary content only if they verify ownership of a corresponding token (e.g., an NFT), or if they verify ownership of a particular album or other content item, etc. A participating hardware provider, service provider, or other participating entity may provide an interface by which an artist can easily upload the auxiliary data which is then stored on-chain and restricted to be accessed only via designated users. In some instances, this can be achieved using a smart contract as described above.

While example configurations, applications, and use cases associated with the use of distributed leger(s) to maintain, store, update, and/or access user data (e.g., content experience data, content network data, and/or any other suitable data), the present technology can be extended to other configurations (e.g., using other types of publicly or semi-publicly accessible data structures besides blockchains or distributed ledgers). Additionally, the present technology can be extended to applications beyond media content consumption, such as maintenance, access, and ownership of other user data that reflects real-world activity, other on-line activity, or both.

Another example use case of blockchain-capable playback devices involves validating one or more aspects of blockchain data, for instance verifying data provenance, confirming data originates from a human, confirming consistency with other data sources, or other such data validation. As blockchain-capable playback devices increasingly rely on distributed ledger data for personalized experiences and content management, verifying the provenance of this data becomes increasingly important. Utilizing blockchain data enables the verification that the data originates from known and desired sources. This verification process can be particularly important in distinguishing between data generated by real-world, human sources and that produced by machine learning or AI systems, and can be especially desirable in applications where such data is used for training of AI models. The proliferation of AI-generated synthetic data poses a growing concern. Estimates suggest that in the near future, the ratio of AI-generated to human-generated data could range from 10:1 to as high as 1000:1. This vast disparity underscores the critical need for robust verification mechanisms to authenticate human-sourced data, a problem that blockchain technology is well-positioned to address.

In response to these challenges, blockchain-capable playback devices can implement various strategies to confirm the provenance of data when obtaining or storing blockchain-based information. One approach involves verifying that the data is cryptographically signed with the private key of a known and trusted individual or entity. This digital signature serves as a proof of the data's origin and integrity, linking it to a specific identity within the blockchain ecosystem.

Additionally or alternatively, a blockchain-capable playback device can incorporate mechanisms to validate the legitimacy of data through specific representations or attestations. These may include explicit declarations of the data's authenticity or detailed metadata about its origin, such as timestamps, location data, or information about the generation process. Such attestations can be encoded directly into the blockchain transaction or smart contract associated with the data.

The verification process can be applied to data stored directly on the blockchain as well as to centrally stored data that uses blockchain-based signatures or attestations for provenance validation. In the latter case, the blockchain serves as a decentralized, immutable ledger of data authenticity, even when the data itself resides off-chain.

By implementing these provenance verification mechanisms, blockchain-capable playback devices can ensure the integrity and authenticity of the data they use for personalization, content recommendations, and other critical functions. This approach not only enhances the reliability of the media playback experience but also contributes to the broader ecosystem of trusted, verifiable data for use in a wide variety of contexts.

As another example, blockchain technology can be used to verify software activation licenses and usage, for instance in the context of media codecs and specialized playback standards. For instance, a blockchain-based system may be implemented to verify and record the use of proprietary audio technologies, such as Dolby Atmos, in consumer devices like soundbars. In this scenario, each decoding event-such as the playback of home theater content using the Dolby Atmos standard-could be recorded as a transaction on a distributed ledger. This immutable record would serve as proof that a particular device was legitimately licensed and actively used the technology. Software providers like Dolby could use this blockchain-based verification system to track usage, ensure compliance with licensing agreements, and potentially implement more flexible, usage-based licensing models. Similar approaches could be utilized during encoding scenarios. Additionally, this system could provide consumers with transparency about their device's capabilities and usage, while offering manufacturers a tamper-proof method to demonstrate compliance with licensing requirements.

IV. Blockchain-Capable Playback Devices with
Generative Components

Figure 10:
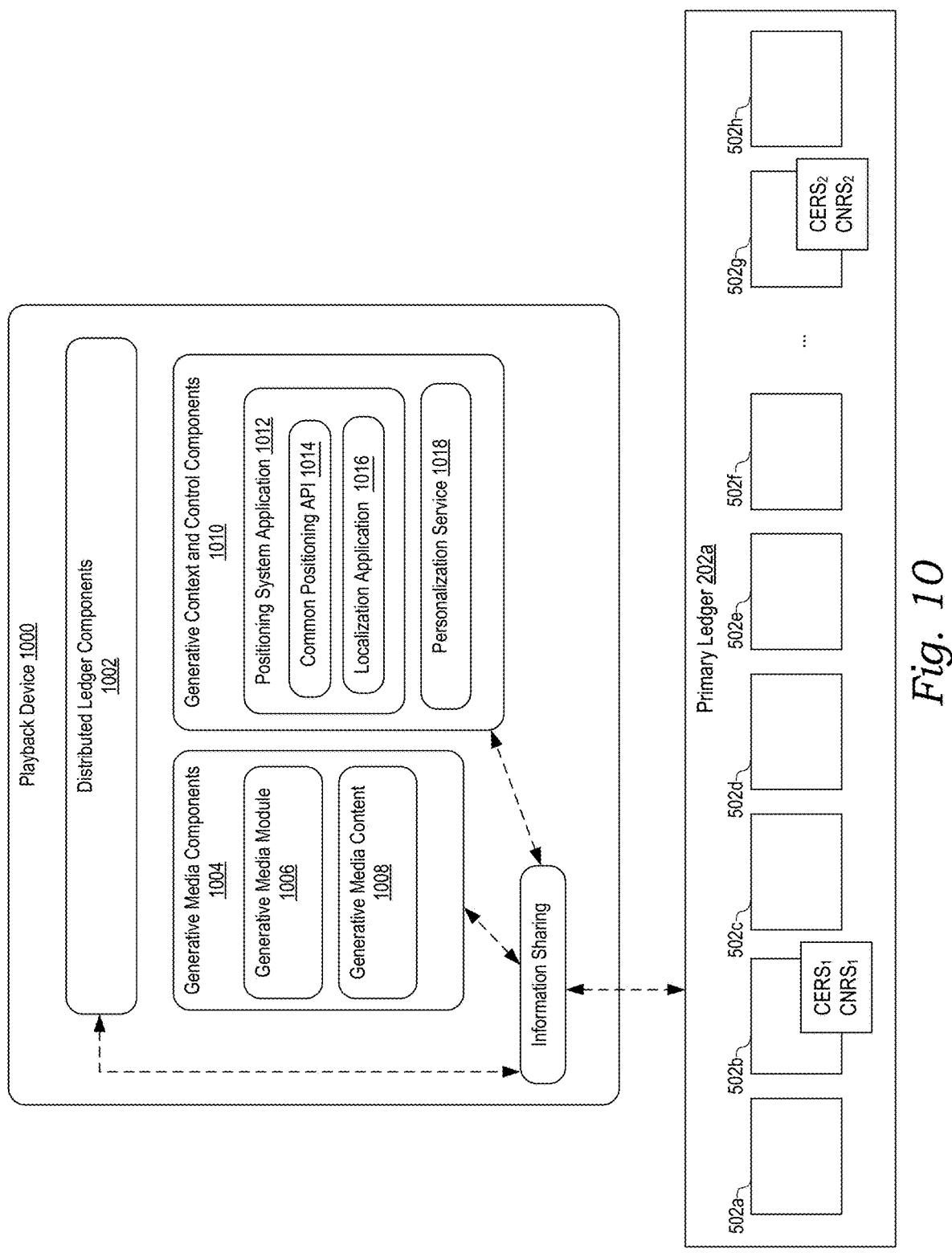
FIG. 10 is a schematic diagram illustrating a blockchain-capable playback device with generative media components and generative context and control components in accordance with aspects of the disclosed technology.

In some implementations, a blockchain-capable playback device can also include generative media components and/or generative context and control components. In various examples, these components can each receive inputs from, and/or write outputs to, a blockchain or other distributed ledger. FIG. 10 illustrates a schematic diagram of a blockchain-capable playback device 1000, which can include three component groups: distributed ledger components 1002, generative media components 1004, and generative context and control components 1010. These components can work in concert, for instance sharing information with one another and with one or more blockchains, to produce a personalized and responsive media playback ecosystem that leverages both on-chain data and real-time contextual information.

The distributed ledger components 1002 facilitate interaction with one or more blockchain networks (as described previously herein), allowing the device to access, store, and update data on distributed ledgers. This capability enables the playback device to maintain and/or utilize decentralized records of user preferences, listening history, and other relevant data. In various implementations, the distributed ledger components 1002 can be used to interact with one or more generative components, such as an artificial intelligence inference model that is implemented by the playback device or by the media playback system including the playback device. Such an artificial intelligence inference model can obtain inputs from and/or write outputs to, a blockchain or other distributed ledger using the distributed ledger components 1002.

The generative media components 1004 include a generative media module 1006 capable of producing novel, synthetic generative media content 1008. These components can leverage artificial intelligence algorithms and models to create or modify media content in real-time, providing users with unique and dynamically generated listening experiences. Additional details regarding suitable generative media components can be found in International Patent Application No. PCT/US2021/072454, filed Nov. 17, 2021, titled "Playback of Generative Media Content," which is hereby incorporated by reference in its entirety for all purposes.

The generative context and control components 1010 encompass various applications and services that inform and guide the behavior of the playback device or other components of a media playback system including the playback device. These include a positioning system application 1012 with common positioning API 1014 and a localization application 1016. The generative context and control components 1010 can further include a personalization service 1018. These components work together to analyze the device's environment and user behavior, enabling context-aware adjustments to both the generative media output and the overall playback experience. In various examples, the generative context and control components 1010 can provide an output in the form of a system recommendation, for instance relating to media playback, configuration of a media playback system, or for other aspects of the user's environment, media playback system, or components thereof. Additional details regarding suitable generative context and control components can be found in U.S. Provisional Application No. 63/516,343, filed Jul. 28, 2022, titled "Personalization Techniques for Media Playback Systems," which is hereby incorporated by reference in its entirety for all purposes.

The interaction between these component groups allows the blockchain-capable playback device 1000 to deliver personalized and dynamic media playback. By combining secure, decentralized data management with advanced generative capabilities and contextual awareness, the device can create audio experiences that are tailored to each user's preferences, environment, and current situation. As described in more detail below, the blockchain-capable playback device 1000, which may be equipped with generative components, can use blockchain data as both inputs and outputs for its generative models, creating a dynamic and interconnected ecosystem of personalized audio experiences. As inputs, the generative media components 1004 can utilize blockchain-stored data such as user preferences, listening history, and collaborative filtering data from the content experience record sets (CERS) to inform the generation of novel audio content. For example, a generative model might create a unique musical composition based on the user's preferred genres and artists as recorded on the blockchain.

Similarly, the generative context and control components 1010 can use blockchain data about device configurations and environmental preferences to adapt playback settings in real-time. As for outputs, the device 1000 can record generated content metadata, user interactions with generated content, and performance metrics of the generative models back to the blockchain. For instance, if the device 1000 generates a personalized playlist, it could store the playlist structure and user engagement data on the blockchain for future reference or sharing. Additionally, the device could contribute improvements to the generative models themselves, such as updated parameters or new training data, by recording these advancements on the blockchain for other devices to access and incorporate. This bidirectional flow of data between the blockchain and the generative components can create a continuously evolving and improving system of personalized media content experiences.

a. Example Generative Media Components

The integration of both blockchain technology with generative media techniques can provide highly personalized and dynamic media content experiences. For instance, by leveraging data stored on distributed ledgers as input parameters for AI models, such as generative AI and/or generative media models, blockchain-capable playback devices can create tailored content and draw from a wide variety of data sources that may be available via one or more blockchains. This approach can also allow for a more individualized understanding of user preferences, listening history, and environmental factors, all of which can inform the generative process.

Blockchain data, such as content experience record sets (CERS) and content network record sets (CNRS) described above, can provide a rich source of information for generative media models. As noted previously, these decentralized records can include detailed histories of user interactions, preferred audio characteristics, and even collaborative filtering data from similar users. When fed into generative algorithms, this blockchain-sourced data enables the creation of media content that not only reflects individual tastes but can also incorporate broader trends and patterns observed across the network.

Additionally or alternatively, the outputs of generative media models and the resulting generative media content can be recorded or otherwise stored, in whole or in part, on decentralized ledgers. This process can, in some cases, create a feedback loop, in which the generated content and associated playback data become part of the user's blockchain-recorded history. By writing this information to the distributed ledger, the system ensures a transparent and immutable record of the generative media experience, which can then be used to further refine future content generation. This cyclical flow of data between blockchain and generative systems allows for continuous improvement and personalization of the media content experience.

According to some aspects, generative media content can include any media content (e.g., audio, video, image, audio-visual output, tactile output, text, olfactory, or any other suitable media content) that is dynamically created, synthesized, and/or modified by a non-human, via one or more algorithms or models (e.g., neural networks such as, for instance, a transformer models or similar suitable models). This creation or modification can occur for playback in real-time or near real-time. Additionally or alternatively, generative media content can be produced or modified asynchronously (e.g., ahead of time before playback is requested), and the particular item of generative media content may then be selected for playback at a later time. As used herein, a "generative media module" includes any system, whether implemented in software, a physical model, or combination thereof, that can produce generative media content based on one or more inputs. In some examples, such generative media content includes novel synthetic media content that can be created as wholly new or can be created by mixing, combining, manipulating, or otherwise modifying one or more pre-existing pieces of media content. Although several examples throughout this discussion refer to audio content (e.g., music, spoken work, and/or other sound(s)), the techniques disclosed herein can be applied in some examples to other types of media content, e.g., video, audio-visual, tactile, text, or otherwise.

Figure 11:
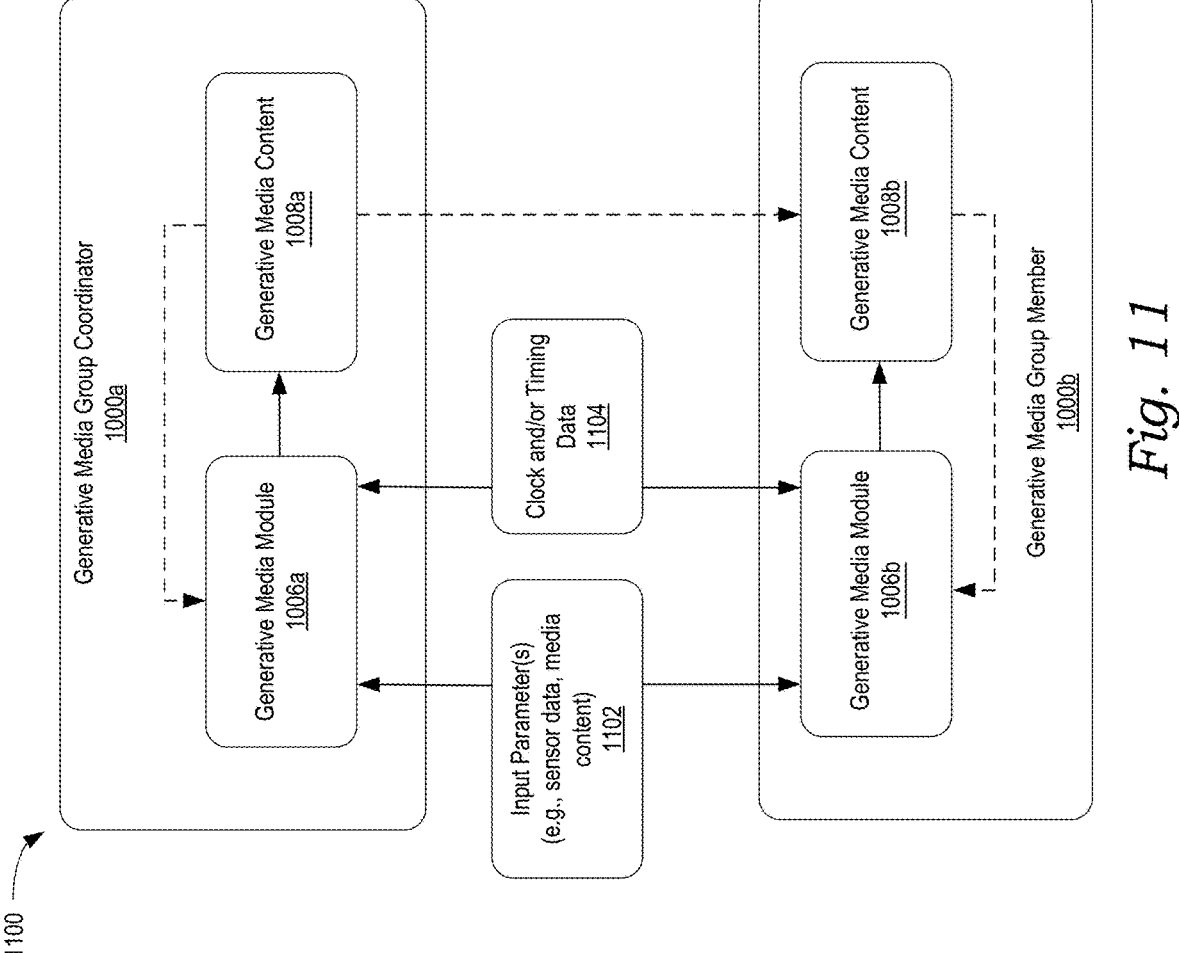
FIG. 11 is a functional block diagram illustrating aspects of generative media production and playback in accordance with aspects of the disclosed technology.

FIG. 11 illustrates a system 1100 for generating and managing playback of generative media content. As shown in FIG. 11, the system 1100 includes a generative media group coordinator 1000a, which is in communication with at least one generative media group member 1000b. One or both of the coordinator device 1000a and the group member device 1000b can take the form of a blockchain-capable playback device 1000 as described above with respect to FIG. 10. Communication between the devices can be carried out via one or more network(s), which can include any suitable wired or wireless network connections or combinations thereof (e.g., WiFi network, a Bluetooth, a Z-Wave network, a ZigBee, an Ethernet connection, a Universal Serial Bus (USB) connection, etc.). Optionally, one or more remote computing device(s) can also be in communication with the group coordinator 1000a and/or group member 1000b, and the remote computing device(s) can form part of the generative media group. In operation, these devices can communicate with one another and/or with other components (e.g., sensor data source(s), a control device 130, media content source(s), or any other suitable data sources or components) to facilitate the production and playback of generative media content.

In various examples, some or all of the devices 1000a and/or 1000b can be co-located within the same environment (e.g., within the same household, store, etc.). In some examples, at least some of the devices 1000a and/or 1000b can be remote from one another, for example within different households, different cities, etc.

The coordinator device 1000a and/or the member devices 1000b can include some or all of the components of the playback device 110, 210 or network microphone device 120 described above with respect to FIGS. 1A-1H. For example, the coordinator device 1000a and/or member devices 1000b can optionally include playback components (e.g., transducers, amplifiers, audio processing components, etc.), or such components can be omitted in some instances.

In some examples, the coordinator device 1000a is a playback device itself, and as such may also operate as a member device 1000b. In these scenarios, the coordinator device 1000a may comprise a portable playback device, such as a mobile device (e.g., a smartphone, battery-powered audio and/or video device, laptop, tablet), or a wearable device, such as an AR and/or XR headset, smartwatch, etc. In other examples, the coordinator device 1000a can be connected to one or more member devices 1000b (e.g., via direct wired connection or via network) but the coordinator device 1000a does not itself play back generative media content. In various examples, the coordinator device 1000a can be implemented on a bridge-like device on a local network, on a playback device that is not itself part of the generative media group (i.e., the playback device does not itself play back the generative media content), and/or on a remote computing device (e.g., a cloud server).

In various examples, one or more of the devices can include a generative media module 1006 thereon. Such generative media module(s) 1006 can produce novel, synthetic media content based on one or more inputs, for example using a suitable generative media content model. As shown in FIG. 11, in some examples the coordinator device 1000a can include a generative media module 1006 for producing generative media content, which can then be transmitted to the member device 1000b for concurrent and/or synchronous playback. Additionally or alternatively, some or all of the member devices 1000b (e.g., member device 1000b as shown in FIG. 11) can include a generative media module 1006, which can be used by the member device 1000b to locally produce generative media content based on one or more inputs. In various examples, the generative media content can be produced via remote computing device(s), optionally using one or more input parameters received from local devices. This generative media content can then be transmitted to one or more of the local devices for coordination and/or playback.

In some examples, at least some of the member devices 1000b do not include a generative media module 1006 thereon. Alternatively, in some instances each member device 1000b can include a generative media module 1006 thereon, and can be configured to produce generative media content locally. In at least some examples, none of the member devices 1000b includes a generative media module 1006 thereon. In such cases, generative media content can be produced by the coordinator device 1000a. Such generative media content can then be transmitted to the member devices 1000b for concurrent and/or synchronous playback.

In some instances the coordinator device 1000a can facilitate playback of generative media content via multiple different playback devices (which may or may not include the coordinator device 1000a itself). In operation, coordination components of the coordinator device 1000a are configured to facilitate synchronization of both generative media creation (e.g., using one or more generative media modules 1006, which may be distributed among the various devices) as well as generative media playback. For example, the coordinator device 1000a can transmit timing data to the member devices 1000b to facilitate synchronous playback. Additionally or alternatively, the coordinator device 1000a can transmit inputs, generative media model parameters, or other data relating to the generative media module 1006 to one or more member devices 1000*b* such that the member devices 1000*b* can produce generative media locally (e.g., using a locally stored generative media module 1006), and/or such that the member devices 1000*b* can update or modify the generative media modules 1006 based on the inputs received from the coordinator device 1000*a*.

In some implementations, the generative media module(s) 1006 are configured to produce generative media based on one or more inputs using a generative media content model (or multiple generative models). The inputs can include sensor data, user input (e.g., as received from a control device 130 or via direct user interaction with the coordinator device 1000*a* or member devices 1000*b*), and/or media other content source(s). For example, a generative media module 1006 can produce and continuously modify generative media by adjusting various characteristics of the generative audio based on one or more input parameters (e.g., sensor data relating to one or more users relative to the devices 1000*a*, 1000*b*).

Suitable media content source(s) can include, in various examples, one or more local and/or remote media content sources. For example, the media content source(s) can include one or more local audio sources as described above (e.g., audio received over an input/output connection such as from a mobile device (e.g., a smartphone, a tablet, a laptop computer) or another suitable audio component (e.g., a television, a desktop computer, an amplifier, a phonograph, a Blu-ray player, a memory storing digital media files)). Additionally or alternatively, the media content source(s) can include one or more remote computing devices accessible via a network interface (e.g., via communication over the network(s) 102). Such remote computing devices can include individual computers or servers, such as, for example, a media streaming service server storing audio and/or other media content, etc. Additionally or alternatively, the media content source(s) can be a blockchain or other distributed ledger as described previously herein.

In various examples, the media available via the media content source(s) can include pre-recorded audio segments in the form of complete sounds, songs, portions of songs (e.g., samples), or any audio component (e.g., pre-recorded audio of a particular instrument, synthetic beats or other audio segments, non-musical audio such as spoken word or nature sounds, etc.). In operation, such media can be utilized by the generative media modules 1006 to produce generative media content, for example by combining, mixing, overlapping, manipulating, or otherwise modifying the retrieved media content to produce novel generative media content for playback via one or more devices. In some examples, the generative media content can take the form of a combination of pre-recorded audio segments (e.g., a pre-recorded song, spoken word recording, etc.) with novel, synthesized audio being created and overlaid with the pre-recorded audio. As used herein, "generative media content" or "generated media content" can include any such combination.

As noted above, the generative media module 1006 can include any system, whether instantiated in software, a physical model, or combination thereof, that can produce generative media content based on one or more inputs. In various examples, the generative media module 1006 can utilize a generative media content model, which can include one or more algorithms or mathematical models that determine the manner in which media content is generated based on the relevant input parameters. In some instances, the algorithms and/or mathematical models can themselves be updated over time, for example based on instructions received from one or more remote computing devices (e.g., cloud servers associated with a music service or other entity), or based on inputs received from other group member devices within the same or a different environment, from blockchain data, or any other suitable input. In some examples, various devices within the group can have different generative media modules 1006 thereon—for example with a first member device having a different generative media module 1006 than a second member device. In other cases, each device within the group that has a generative media module 1006 can include substantially the same model or algorithm.

Any suitable algorithm or combination of algorithms can be used to produce generative media content. Examples of such algorithms include those using machine learning techniques (e.g., generative adversarial networks, neural networks, etc.), formal grammars, Markov models, finite-state automata, and/or any other suitable algorithms. Transformer models, originally developed for natural language processing tasks, have been successfully adapted for media generation. These models utilize self-attention mechanisms to capture long-range dependencies in sequential data, making them well-suited for modeling complex audio structures. In the context of audio generation, transformer-based architectures like OpenAI's Jukebox have shown the ability to generate multi-instrumental music with coherent long-term structure, even incorporating stylistic elements and rudimentary lyrics. These models can be conditioned on various inputs, including genre, artist style, and even textual descriptions, allowing for fine-grained control over the generated audio content.

As another example, diffusion models have emerged as a powerful alternative for high-fidelity audio synthesis. These models work by learning to reverse a gradual noising process, effectively reconstructing audio from pure noise. Notable examples in the audio domain include Google's AudioLM and Meta AI's AudioGen. Diffusion models have demonstrated exceptional capability in generating realistic environmental sounds, speech, and music. They excel at capturing fine-grained audio details and maintaining consistency over extended durations. Moreover, diffusion models have shown promise in tasks such as text-to-audio generation and audio inpainting, where missing segments of audio are convincingly reconstructed.

Both transformer and diffusion models can be integrated into blockchain-capable playback devices. By utilizing on-chain data as conditioning inputs, these models can generate audio content that is not only high-quality but also personalized to individual user preferences and listening histories. For instance, a transformer model could leverage a user's CERS data to generate music that reflects their preferred genres, artists, and compositional structures. Similarly, a diffusion model might use CNRS data to synthesize ambient soundscapes tailored to a user's typical listening environments or device configurations.

Generative models may also be categorized based on their data type and modeling approach. Continuous latent models like AudioLDM and RAVE employ iterative refinement techniques, while discrete latent models such as MusicGen and LLM s utilize next-token prediction or autoregressive methods. Models working directly with raw audio data, like MaskGIT and WaveGAN, use masked prediction and one-step generation approaches respectively. Each of these models offers unique capabilities and trade-offs in generating audio content. For instance, MusicLM and MusicGen, introduced in 2023, represent significant advancements in connecting text and music modalities. Other notable models in the evolution of this technology include SoundStream, Encodec, CLIP, CLAP, and AudioLM from earlier years, as well as more recent developments like Stable Audio, Suno, and UDio in 2024. In addition to audio-specific models, more general purpose (and optionally multimodal) models may be utilized (e.g., ChatGPT from OpenAI, Claude.ai from Anthropic, Llama from M eta, Gemini from Google, or other suitable models).

In various examples, the generative media module(s) 1006 can utilize adaptive or deterministic models. Each approach offers distinct advantages in the production of media content. Deterministic models follow a fixed set of rules or parameters to generate output, producing consistent results given the same inputs. These models are predictable and can be precisely controlled, making them suitable for applications where reproducibility is desired. In contrast, adaptive models dynamically adjust their behavior based on real-time feedback or changing contextual inputs. These models can learn and evolve their output strategies over time, potentially producing more varied and context-aware content. In the realm of generative audio, adaptive models might adjust musical elements like tempo, harmony, or instrumentation in response to user interactions, environmental factors, or biometric data. This adaptability allows fora more responsive and personalized audio experience, potentially better suited to the dynamic nature of block-chain-capable playback devices. However, the choice between adaptive and deterministic approaches often depends on the specific use case, with some applications benefiting from a hybrid approach that combines elements of both model types. In various examples, the generative media module(s) 1006 can utilize any suitable generative algorithms now existing or developed in the future.

In line with the discussion above, producing the generative media content (e.g., audio content) can involve changing various characteristics of the media content in real time and/or algorithmically generating novel media content in real-time or near real-time. In the context of audio content, this can be achieved by storing a number of audio samples in a database that can be remotely located and accessible by the coordinator device 1000a and/or the member devices 1000b over a network, or alternatively the audio samples can be locally maintained on the devices 1000a, 1000b themselves. The audio samples can be associated with one or more metadata tags corresponding to one or more audio characteristics of the samples. For instance, a given sample can be associated with metadata tags indicating that the sample contains audio of a particular frequency or frequency range (e.g., bass/midrange/treble) or a particular instrument, genre, tempo, key, release date, geographical region, timbre, reverb, distortion, sonic texture, or any other audio characteristics that will be apparent.

In operation, the generative media modules 1006 (e.g., of the coordinator device 1000a and/or the second member device 1000b) can retrieve certain audio samples based on their associated tags and mix the audio samples together to create the generative audio. The generative audio can evolve in real time as the generative media module(s) 1006 retrieve audio samples with different tags and/or different audio samples with the same or similar tags. The audio samples that the generative media module(s) 1006 retrieve can depend on one or more inputs, such as sensor data, time of day, geographic location, weather, or various user inputs, such as mood selection or physiological inputs such as heart rate or the like. In this manner, as the inputs change, so too does the generative audio. For example, if a user selects a calming or relaxation mood input, then the generative media module(s) 1006 can retrieve and mix audio samples with tags corresponding to audio content that the user may find calming or relaxing. Examples of such audio samples might include audio samples tagged as low tempo or low harmonic complexity or audio samples that have been predetermined to be calming or relaxing and have been tagged as such. In some examples, the audio samples can be identified as calming or relaxing based on an automated process that analyzes the temporal and spectral content of the signals. Other examples are possible as well. In any of the examples herein, the generative media module(s) 1006 can adjust the characteristics of the generative audio by retrieving and mixing audio samples associated with different metadata tags or other suitable identifiers.

Modifying characteristics of the generative audio can include manipulating one or more of: volume, balance, removing certain instruments or tones, altering a tempo, gain, reverb, spectral equalization, timbre, or sonic texture of the audio, etc. In some examples, the generative audio can be played back differently at different devices, for example emphasizing certain characteristics of the generative audio at the particular playback device that is nearest to the user. For instance, the nearest playback device can emphasize certain instruments, beats, tones, or other characteristics while the remaining playback devices can act as background audio sources.

As described elsewhere herein, the media content module(s) 1006 can be configured to produce media intended to direct a user's mood and/or physiological state in a desired direction. In some examples the user's current state (e.g., mood, emotional state, activity level, etc.) is constantly and/or iteratively monitored or measured (e.g., at predetermined intervals) to ensure the user's current state is transitioning toward the desired state or at least not in a direction opposite the desired state. In such examples, the generative audio content can be varied to steer the user's current state towards the desired end state.

In any of the examples herein, the generative media module(s) can use hysteresis to avoid making rapid adjustments to the generative audio that could negatively impact the listening experience. For example, if the generative media module modifies the media based on an input of a user location relative to a playback device, when a user rapidly moves nearer to and farther from a playback device, the playback device could rapidly alter the generative audio in any of the manners described herein. Such rapid adjustments may be unpleasant to the user. In order to reduce these rapid adjustments, the generative media module 1006 can be configured to employ hysteresis by delaying the adjustments to the generative audio for a predetermined period of time when the user's movement or other activity triggers an adjustment. For instance, if the playback device detects that the user has moved within the threshold distance of the playback device, then instead of immediately performing one of the adjustments described above, the playback device can wait a predetermined amount of time (e.g., a few seconds) before making the adjustment. If the user remains within the threshold distance after the predetermined amount of time, then the playback device can proceed to adjust the generative audio. If, however, the user does not remain within the threshold distance after the predetermined amount of time, then the generative media module(s) 1006 can refrain from adjusting the generative audio. The generative media module(s) 1006 can similarly apply hysteresis to the other generative media adjustments described herein.

As noted previously, the generative media module(s) 1006 can produce generative media based at least in part on input parameters that can include sensor data and/or other suitable input parameters. With respect to sensor input parameters, the sensor data source(s) can include data from any suitable sensor, wherever located with respect to the generative media group and whatever values are measured thereby. Examples of suitable sensor data includes physiological sensor data such as data obtained from biometric sensors, wearable sensors, etc. Such data can include physiological parameters like heart rate, breathing rate, blood pressure, brainwaves, activity levels, movement, body temperature, etc.

Suitable sensors include wearable sensors configured to worn or carried by a user, such as a headset, watch, mobile device, brain-machine interface (e.g., Neuralink), headphone, microphone, or other similar device. In some examples, the sensor can be a non-wearable sensor or fixed to a stationary structure. The sensor can provide the sensor data, which can include data corresponding to, for example, brain activity, voice, location, movement, heart rate, pulse, body temperature, and/or perspiration. In some examples, the sensor can correspond to a plurality of sensors. For example, as explained elsewhere herein, the sensor may correspond to a first sensor worn by a first user, a second sensor worn by a second user, and a third sensor not worn by a user (e.g., fixed to a stationary or structure). In such examples, the sensor data can correspond to a plurality of signals received from each of the first, second, and third sensors.

The sensor can be configured to obtain or generate information generally corresponding to a user's mood or emotional state. In one example, the sensor is a wearable brain sensing headband, which is one of many examples of the sensor described herein. Such a headband can include, for example, an electroencephalography (EEG) headband having a plurality of sensors thereon. In some examples, the headband can correspond to any of the Muse™ headbands (InteraXon; Toronto, Canada). The sensors can be positioned at varying locations around an inner surface of the headband, e.g., to correspond to different brain anatomy (e.g., the frontal, parietal, temporal, and sphenoid bones) of the user. As such, each of the sensors can receive different data from the user. Each of the sensors can correspond to individual channels that can be streamed from the headband to the system devices 1000a and/or 1000b. Such sensor data can be used to detect a user's mood, for example by classifying the frequencies and intensities of various brainwaves or by performing other analyses. Additional details of using a brain-sensing headband for generative audio content can be found in International Patent Application No. PCT/US2021/071260, filed Aug. 24, 2021, titled "Mood Detection and/or Influence Via Audio Playback Devices," which is hereby incorporated by reference in its entirety.

In some examples, the sensor data source(s) include data obtained from networked device sensor data (e.g., Internet-of-Things (IoT) sensors such as networked lights, cameras, temperature sensors, thermostats, presence detectors, microphones, etc.). Additionally or alternatively, the sensor data source(s) 218 can include environmental sensors (e.g., measuring or indicating weather, temperature, time/day/week/month, etc.). In some implementations, the inputs can take the form of data from the generative context and control components 1010, which are described in more detail below. Those inputs may be obtained directly from other network devices such as playback devices and/or playback device networks, and/or may be obtained via blockchain. In some examples, for instance, the inputs may be associated with a DAO (or perhaps several DAOs) and stored on a blockchain ledger (or several ledgers). Such personalization information (e.g., including media content usage patterns, localization information, recommendation engine outputs, etc.) can be used as an input to the generative media module 1006 for production of generative audio that is tailored to a particular user or users, environment, or context.

In some examples, the generative media module 1006 can utilize input in the form of playback device capabilities (e.g., number and type of transducers, output power, other system architecture), device location (e.g., either location relative to other playback devices, relative to one or more users). Additional examples of creating and modifying generative audio as a result of user and device location are described in more detail in commonly owned U.S. Pat. No. 11,409,495, issued Aug. 9, 2022, titled "Audio Conflict Resolution," which is hereby incorporated by reference in its entirety. Additional inputs can include a device state of one or more devices within the group, such as a thermal state (e.g., if a particular device is in danger of overheating, the generative content can be modified to reduce temperature), battery level (e.g., bass output can be reduced in a portable playback device with low battery levels), and bonding state (e.g., whether a particular playback device is configured as part of a stereo pair, bonded with a sub, or as part of a home theatre arrangement, etc.). Any other suitable device characteristic or state may similarly be used as an input for production of generative media content.

Another example input parameter includes user presence—for example when a new user enters a space playing back generative audio, the user's presence can be detected (e.g., via proximity sensors, a beacon, etc.) and the generative audio can be modified as a response. This modification can be based on number of users (e.g., with ambient, meditative audio for 1 user, relaxing music for 2-4 users, and party or dance music for greater than 4 users present). The modification can also be based on the identity of the user(s) present (e.g., a user profile based on the user's characteristics, listening history, or other such indicia).

In one example, a user can wear a biometric device that can measure various biometric parameters, such as heart rate or blood pressure, of the user and report those parameters to the devices 1000a and/or 1000b. The generative media modules 1006 of these devices 1000a and/or 1000b can use these parameters to further adapt the generative audio, such as by increasing the tempo of the music in response to detecting a high heart rate (as this may indicate that the user is engaging in a high motion activity) or decreasing the tempo of the music in response to detecting a high blood pressure (as this may indicate that the user is stressed and could benefit from calming music).

In yet another example, one or more microphones of a playback device (e.g., microphones 115 of FIG. 1F) can detect a user's voice. The captured voice data can then be processed to determine, for example, a user's mood, age, or gender, to identify a particular user from among several users within a household, or any other such input parameter. Other examples are possible as well.

As shown in FIG. 11, there can be various types of interactions between a coordinator device 1000a and a member device 1000b. The interactions and processes described herein can be applied to interactions involving a plurality of additional coordinator devices 1000a and/or member devices 1000b. As shown in FIG. 11, the coordinator device 1000a includes a generative media module 1006a that receives inputs including input parameters 1102 (e.g., sensor data, media content, model parameters for the generative media module 1006a, blockchain data (e.g., CERS or CNRS data), or other such input) as well as clock and/or timing data 1104. In various examples, the clock and/or timing data 1104 can include synchronization signals to synchronize playback and/or to synchronize generative media being produced by various devices within the group. In some examples, the clock and/or timing data 1104 can be provided by an internal clock, processor, or other such component housed within the coordinator device 1000a itself. In some examples, the clock and/or timing data 1104 can be received via a network interface from remote computing devices.

Based on these inputs, the generative media module 1006a can output generative media content 1008a. Optionally, the output generative media content 1006a can itself serve as an input to the generative media module 1006a in the form of a feedback loop. For example, the generative media module 1006a can produce subsequent content (e.g., audio frames) using a model or algorithm that depends at least in part on the previously generated content.

In the illustrated example, the member device 1000b likewise includes a generative media module 1006b, which can be substantially the same as the generative media module 1006a of the coordinator device 1000a, or may differ in one or more aspects. The generative media module 1006b can likewise receive input parameter(s) 1102 and clock and/or timing data 1104. These inputs can be received from the coordinator device 1000a, from other member devices, from other devices on a local network (e.g., a locally networked smart thermostat supplying temperature data), and/or from one or more remote computing devices (e.g., a cloud server providing clock and/or timing data 1104, or weather data, or any other such input). Based on these inputs, the generative media module 1006b can output generative media content 1008b. This produced generative media content 1008b can optionally be fed back into the generative media module 1006b as part of a feedback loop. In some examples, the generative media content 1008b can include or consist of generative media content 1008a (produced via the coordinator device 1000a) which has been transmitted over a network to the member device 1000b. In other cases, the generative media content 1008b can be produced independently and separately of the generative media content 1008a produced via the coordinator device 1000a.

The generative media content 1008a and 1008b can then be played back, either via the devices 1000a and 1000b themselves, and/or as played back by other devices within the group. In various examples, the generative media content 1008a and 1008b can be configured to be played back concurrently and/or synchronously. In some instances, the generative media content 1008a and 1008b can be substantially identical or similar to one another, with each generative media module 1006 utilizing the same or similar algorithms and the same or similar inputs. In other instances, the generative media content 1008a and 1008b can differ from one another while still being configured for synchronous or concurrent playback.

b. Example Generative Context and Control Components

Figure 12:
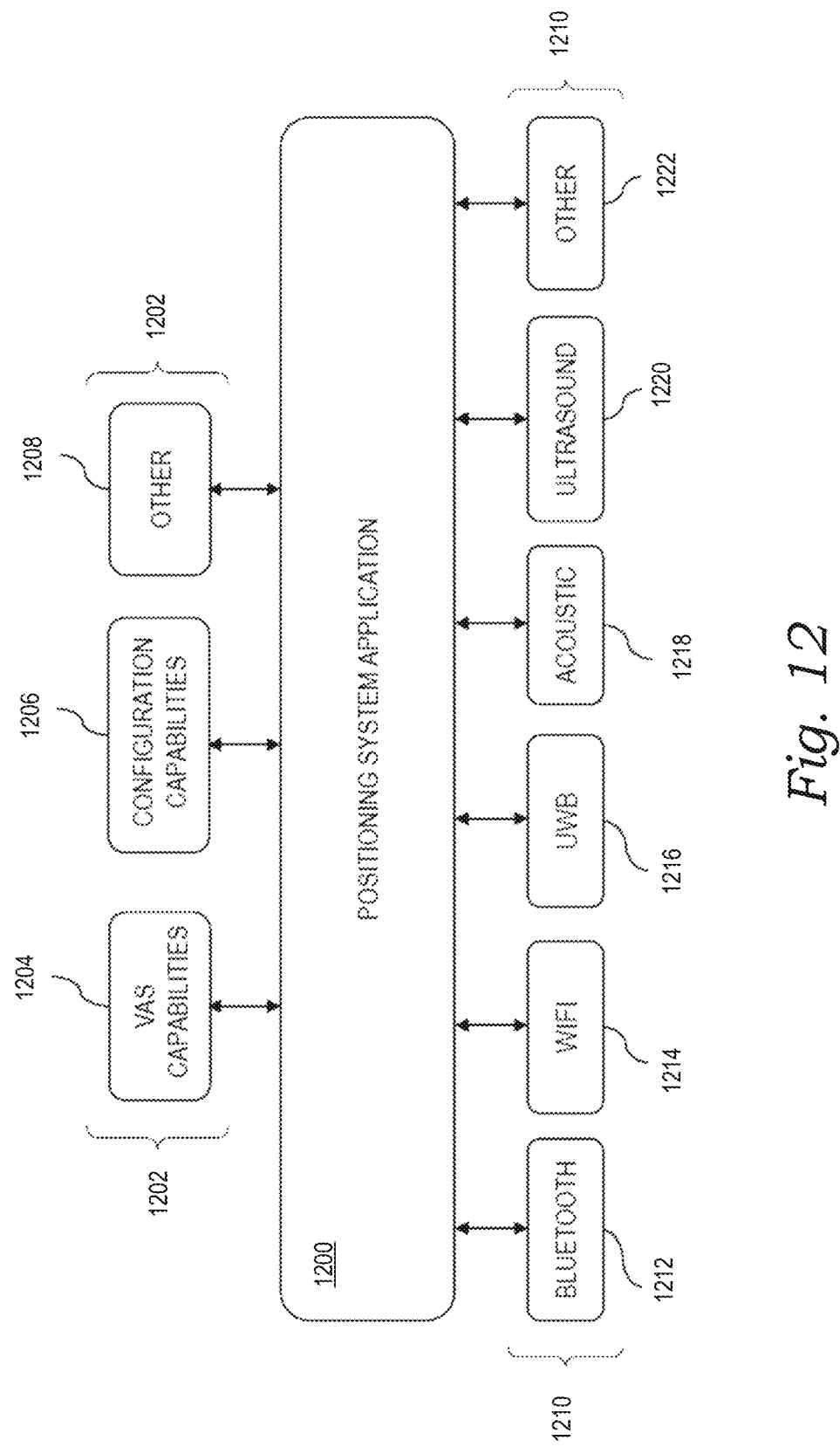
FIG. 12 is a schematic diagram illustrating aspects of a positioning system architecture in accordance with aspects of the disclosed technology.
Figure 13:
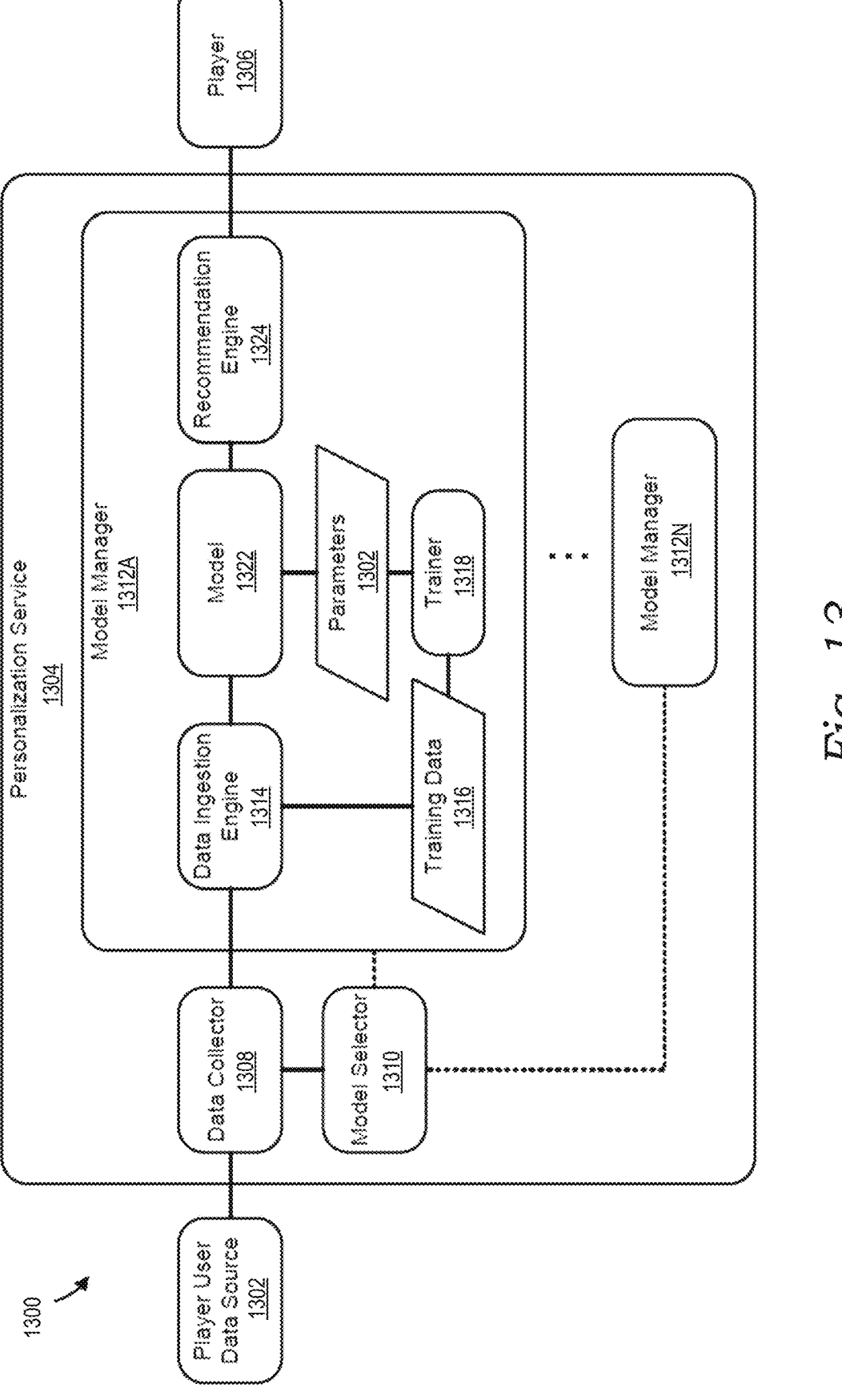
FIG. 13 is a block diagram of one example of a system including a personalization service in accordance with aspects of the disclosed technology.

FIGS. 12 and 13 illustrate additional details regarding the interaction of generative context and control components with blockchain data in a blockchain-capable playback device. The generative context and control components 1010 (FIG. 10), which include localization applications and positioning system applications, can both retrieve data from and contribute data to blockchain sources. This bidirectional flow of information allows for a dynamic interplay between historical, persistent data stored on-chain and real-time, dynamic data generated by the playback device and its environment.

Localization and positioning system application data may be sourced from the blockchain, forming its own distinct "record set" within the broader blockchain ecosystem. This data can be used in combination with information stored locally on the device, on other devices within the same household/network, devices associated with a community and/or a DAO, or in traditional cloud storage. For example, a user's playback and listening history or media environment configuration might be retrieved from the blockchain (e.g., by accessing a CERS or CNRS), providing a comprehensive and portable record of preferences and behaviors. Meanwhile, current device positioning information, which may be more sensitive and require real-time accuracy, might be stored locally within the household network for improved privacy and reduced latency.

In some implementations, even sensitive or private information can be stored on-chain when appropriate privacy-preserving techniques are employed. For instance, zero-knowledge proofs can be utilized to verify certain attributes or conditions without revealing the underlying data, allowing for the benefits of blockchain-based data management while maintaining user privacy.

The interaction between blockchain data and generative context and control components enables a more personalized approach to media playback. In an example approach, historical data from the blockchain can inform long-term preferences and patterns, while real-time contextual data allows for immediate responsiveness to the user's current environment and situation. In some examples, contextual and/or input data can be collected and shared among devices within the MPS 100 to support generative context and control operations. Examples of suitable contextual data can be found in International Application No. PCT/US2022/077185, filed Sep. 28, 2022, titled "Spatial Mapping of Media Playback System Components," which is hereby incorporated by reference in its entirety for all purposes.

In some implementations, generative models are used for purposes of context and control as described in more detail below. Additional details regarding suitable generative models can also be found in International Patent Application No. PCT/US2024/029969, filed May 17, 2024, titled "Learned Device Targeting," which is hereby incorporated by reference in its entirety for all purposes.

Additional details regarding mapping contextual or environmental data with respect to subscriber devices can be found in International Patent Application No. PCT/US2024/026459, filed Apr. 26, 2024, titled "Providing Moodscapes and Other Media Experiences," which is hereby incorporated by reference in its entirety for all purposes. Among examples, such data regarding a map of provider contextual or environmental data with respect to subscriber devices can be stored via a distributed ledger (e.g., as part of a CERS or CNRS). The use of a blockchain allows for a verified experience such that individual subscribers can confirm and trust that the moodscape simulated at their location corresponds (optionally in real-time) to the provider moodscape. Additionally or alternatively, to facilitate production of a suitable moodscapeas described in the above-referenced application, a personalization model (as described in more detail below) may be used to tailor the moodscape for the listener's context and environmental conditions.

According to certain aspects, a positioning system can be implemented to determine relative positioning of devices within the environment and optionally to control or modify behavior of one or more devices based on the relative positions. Positioning or localization information can be acquired through various techniques, optionally using sensors in some instances, examples of which are discussed below. In certain examples, one or more devices in the MPS 100, such as one or more blockchain-capable playback devices 1000, playback devices 110, NMDs 120, or controller devices 130 may host a localization application that may implement features that process localization information to enhance user experiences with the MPS 100. Examples of such features include sophisticated acoustic manipulation (e.g., features directed to psychoacoustic effects during audio playback) and autonomous device configuration/reconfiguration (e.g., features directed to detection and configuration of new devices or devices that have moved or otherwise been changed in some way), among others. The requirements that these features place on localization information vary, with some features requiring low latency, high precision localization information and other features being able to operate using high latency, low precision localization information.

According to certain examples, a positioning system can be implemented in the MPS 100 using a variety of different devices to generate the localization information utilized by certain application features. However, the number, arrangement, and configuration of these devices can vary between examples. Additionally, or alternatively, the communications technology and/or sensors employed by the devices can vary. Given the number of variables in play within any particular MPS and the concomitant inefficiencies that this variability imposes on MPS application feature development and maintenance, some examples disclosed herein utilize one or more blockchain-capable playback devices 1000, playback devices 110, NMDs 120, or controller devices 130 to implement a positioning system using a common positioning application programming interface (API) that decouples the positioning/localization information from specific devices or underlying enabling technologies, as illustrated conceptually in FIG. 12.

Referring to FIG. 12, any one or more blockchain-capable playback devices 1000, playback devices 110, NMDs 120, or controller devices 130 in the MPS 100 ("MPS devices") can host a positioning system application 1200. In certain implementations, one or more remote computing devices can facilitate hosting the application. The positioning system application 1200 implements an application programming interface (API) that exposes positioning/localization information, and metadata pertinent thereto, to MPS application features 1202. The MPS features 1202 may include a wide variety of features relating to various user experiences and aspects of the operation of the MPS 100. For example, the MPS features 1202 may include one or more VAS features 1204, such as voice disambiguation features and arbitration between different NMDs receiving the same voice inputs, for example. The MPS features 1202 may also include one or more MPS and/or device configuration features 1206, such as automatic home theater configuration or reconfiguration, dynamically accommodating portable playback devices in home theater environments, dynamic room assignment for portable playback devices or their associated docks, and contextual orientation of controller devices 130, to name a few. The MPS features 1202 may further include one or more other features 1208 that use positioning/localization information. To support these and other MPS features 1202, positioning/localization information may be used to determine various pieces of information related to the locations of MPS devices within the environment. For example, the positioning/localization information may be used by some MPS features 1202 to keep track of which playback devices 110 or NMDs 120 are in a given room or space (e.g., which playback devices are in the Living Room 101*f*, in which room is playback device 110*d*, or which playback devices 110 are closest to the controller device 130). The positioning/localization information may further be used to determine the distance and/or orientation between playback devices 110 (with varying levels of precision), or to determine the acoustic space around NMDs 120 or NMD-equipped playback devices 110 (e.g., which playback devices 110 can be heard from NMD 120*a*). Thus, the positioning/localization information may be used to determine information about the topology of the MPS 100 within the environment 101, which information may then be used to automatically and dynamically create or modify user experiences with the MPS 100 and support the MPS features 1202.

The positioning/localization information and metadata exposed by the positioning system application 1200 may vary depending on the underlying communications technologies and/or sensor capabilities 1210 within the MPS devices that are used to acquire the information and/or the needs of the particular MPS feature 1202. For example, certain MPS devices may be equipped with one or more network interfaces that support any one or more of the following communications capabilities: Bluetooth 612, WIFI 614 or ultra wide-band technology (UWB 616; a short-range radio frequency communications technology). Further, certain MPS devices may be equipped to support signaling via acoustic signaling 1218, ultrasound 1220, or other signaling and/or communications means 1222. Certain technologies 1210 may be well-suited to certain MPS features 1202 while others may more useful in other circumstances. For example, UWB 1216 may provide high precision distance measurements, whereas WIFI 1214 (e.g., using RSSI signal strength measurements) or ultrasound 1220 may provide "room-level" topology information (e.g., presence detection indicating that a particular MPS device is within a particular room or space of the environment 101). In some examples, combinations of the different technologies 1210 may be used to enhance the accuracy and/or certainty of the information derived from the positioning/localization information received from one or more MPS devices via the positioning system application 1200. For example, as discussed further below, in some instances, presence detection may be performed primarily using ultrasound 1220; however, RSSI measurements may be used to confirm the presence detection and/or provide more precise localization information in addition to the presence detection.

Examples of MPS devices equipped with ultrasonic presence detection are disclosed in U.S. Patent Publication Nos. 2022/0066008 and 2022/0261212, each of which is hereby incorporated herein by reference in its entirety for all purposes. Examples of localizing MPS devices based on RSSI measurements are disclosed in U.S. Patent Publication No. 2021/0099736, which is herein incorporated by reference in its entirety for all purposes. Examples of performing location estimation of MPS devices using WIFI 1214 are disclosed in U.S. Patent Publication No. 2021/0297168, which is herein incorporated by reference in its entirety for all purposes.

In addition to the positioning/localization information itself, some examples of the positioning system application 1200 can expose metadata that specifies localization capabilities of the host MPS device, such as precision and latency information and availability of the various underlying capabilities 1210. As such, the positioning system application 1200 enables the MPS features 1202 each to utilize a common set of API calls to identify the localization capability present within their host MPS device and to access positioning/localization information made available through the identified capabilities 1210.

As shown in FIG. 12 and discussed above, the positioning system application 1200 can interoperate with MPS devices that support a wide variety of localization capabilities, such as Bluetooth 1212, WIFI 1214, UWB 1216, acoustic signaling 1218 and/or ultrasound 1220, among others 1222. In some examples, the positioning system application 1200 includes one or more adapters configured to communicate with MPS devices using syntax and semantics specific to the localization capability 1210 of the MPS devices. This architecture shields the MPS features 1202 from the complexity of interoperating with each type of MPS device. In some examples, each adapter can receive and process a stream of positioning/localization data from the MPS devices using any one or more of the communications capabilities 1210. The adapters can interoperate with an accumulation engine within the positioning system application 1200 that analyzes and merges (e.g., using a set of configurable rules) positioning/localization data obtained by the adapters and populates data structures that contain the positioning/localization information and the metadata described above. These data structures, in turn, are accessed and the positioning/localization information, and metadata, are retrieved by the positioning system application 1200 in response to API calls received by the positioning system application 1200 to support the MPS features 1202. The positioning/localization information, and metadata, can specify, in some examples, position/location of a device relative to other device, absolute position/location (e.g., within a coordinate system) of a device, presence of device (e.g., within a structure, room, or as a simple Boolean value), and/or orientation of a device.

For instance, in some examples, the positioning/localization information is expressed in two dimensions (e.g., as coordinates in a Cartesian plane), in three dimensions (e.g., as coordinates in a Cartesian space), or as coordinates within other coordinate systems. In certain examples, the positioning/localization information is stored in one or more data structures that include one or more records of fields typed and allocated to store portions of the information. For instance, in at least one example, the records are configured to store timestamps in association with values indicative of location coordinates of a portable playback device taken at a time given by the associated timestamp. Further, in at least one example, the records are configured to store timestamps in association with values indicative of a velocity of a portable playback device taken at a time given by the associated timestamp. Further, in at least one example, the records are configured to store timestamps in association with values indicative of a segment of movement (starting and ending coordinates) of a portable playback device taken at times given by associated timestamps. Other examples of positioning/localization information, and structures configured to store the same, will be apparent in view of this disclosure.

It should be noted that the API and adapters implemented by the positioning system application 1200 may adhere to a variety of architectural styles and interoperability standards. For instance, in one example, the API is a web services interface implemented using a representational state transfer (REST) architectural style. In this example, the API communications are encoded in Hypertext Transfer Protocol (HTTP) along with JavaScript Object Notation and/or extensible markup language. In some examples, portions of the HTTP communications are encrypted to increase security. Alternatively, or additionally, in some examples, the API is implemented as a .NET web API that responds to HTTP posts to particular URLs (API endpoints) with localization data or metadata. Alternatively, or additionally, in some examples, the API is implemented using simple file transfer protocol commands. Also, in some examples, the adapters are implemented using a proprietary application protocol accessible via a user datagram protocol socket. Thus, the adapters and the API as described herein are not limited to any particular implementation.

In addition to adhering to the interoperability standards discussed above, the API and adapters implemented by the positioning system application may adhere to standards that facilitate seamless interaction with distributed ledger technologies. This alignment allows for efficient storage and retrieval of positioning and contextual data on blockchain networks, ensuring data integrity and enabling cross-platform compatibility. For instance, the API could be designed to interact with decentralized identity (DID) systems, allowing users to maintain sovereign control over their location data while still benefiting from the positioning system's capabilities. Furthermore, the use of standardized data formats and protocols can enable the positioning system to write data directly to blockchain-based record sets, contributing to a comprehensive and interoperable ecosystem of spatial and contextual information.

Aspects and embodiments are directed to personalization techniques within a media playback system that may enhance user experiences, increase user awareness of new and existing features within the media playback system, and/or encourage user involvement with their media playback system. Techniques disclosed herein may collect household pattern data (e.g., device configuration settings, such as volume, playlist selection, etc., device movement within the environment, bonding information, etc.) to use in predicting user preferences while also taking steps to maintain user privacy, as discussed further below. In addition, personalization techniques disclosed herein may include aspects to address uncertainty when determining whether or in what manner to execute system personalization actions and/or train the personalization models, to minimize friction for user adoption and exploration.

Routines are an important aspect of how users interact with technology, and in particular, of how users engage with audio and music through their media playback systems. Users typically listen differently at different times of day; for example, from some quiet background music to help them focus through the workday, to creating a party atmosphere when having friends over in the evening. While generalized trends and shifts in routine can provide useful information, techniques disclosed herein provide additional value through the ability to adapt personalization to behaviors of individual users. For example, one user may consistently choose a certain type of playlist or radio station and set the volume fairly high on a playback device in one room each morning, possibly indicating a workout routine, while otherwise having their playback devices inactive during the day and selecting a lower volume setting for some time during the evening. Another user might consistently have the volume on one or more players set relatively low throughout the day, while having it slightly louder around early evening. Listening behaviors can vary significantly among different users and therefore there can be value in user-specific personalization, rather than relying on generalized rule-based configurations.

Various recommendation systems exist that provide an approach for some degree of personalization. These recommendation systems generally offer users suggestions from a set of items based on some other item that was previously selected by the user. For example, a streaming service may recommend program D if a user has previously watched programs A, B, and C because collected data indicates that users who have watched programs A, B, and C, typically also watch program D. This approach relies on collecting vast quantities of data from a large population of users. In contrast to this list-based approach, techniques disclosed herein monitor specific user interactions with that user's media playback system to detect individual patterns of behavior and offer or apply personalization settings unique to that user based on the detected patterns. In this context, a user can be an individual person or a group of persons (e.g., a household) associated with a particular media playback system. According to certain examples, rather than identifying latent correlations (as is done in the recommendation system approach discussed above), personalization techniques disclosed herein determine when a trend or pattern within a particular media playback system has been established, such that there exists a relatively high likelihood that the user would want system configurations or behavior to be automated in the future according to this pattern.

Unlike traditional recommendation systems, certain examples involve context awareness as an important aspect in determining and applying personalization features. As discussed above, routines play a significant role in users' interactions with their media playback system, and these routines can shift over time. For example, users may have a different routine during the week versus over the weekend, during the summer versus during the winter, or during school vacation periods versus during school semesters. As discussed further below, aspects and examples disclosed herein incorporate contextual influence in the system's predictions, allowing the system to adapt to changing behavior over both long and short timeframes. In particular, as discussed above, examples apply continual learning and confidence indicators to robustly determine patterns and apply personalization only in high confidence scenarios, thereby reducing the likelihood of suggesting personalization settings that are undesirable.

As discussed in more detail below, one example of a personalization setting is volume personalization. There are many scenarios where the right or wrong volume can have a significant impact on user perceptions of their playback device(s) or media playback system. For example, a user may get up early in the morning, hit "play" on their playback device in the kitchen to start their morning playlist, and be unpleasantly surprised when the sound starts many decibels too high because the playback device has retained its settings from the previous evening when music was being enjoyed at a much higher volume. In such scenarios, the user may quickly hit the "volume down" button many times, trying to reduce the volume as quickly as possible. For example, the user may hit the "volume down" button 10 or even 20 times in quick succession, which is indicative of a very frustrating user experience. Aspects and examples may provide a better experience for the user by enabling the media playback system 100 to learn from user behaviors and predict based on context (e.g., time of day) and recognized behavioral patterns when the user may want room-filling sound versus a softer, more discrete volume level. For example, machine learning models can be applied to learn from user behavior in order to facilitate smarter volume (or other) interactions, thereby improving user confidence and reducing the potential for frustrating interactions.

Further examples of volume personalization and playback device grouping personalization are discussed below. However, it will be appreciated, given the benefit of this disclosure, that the personalization techniques and approaches discussed herein may be applied to a wide variety of other features, configurations, and/or behaviors of one or more playback devices (or NMDs) in a media playback system.

Referring to FIG. 13, there is illustrated a block diagram of one example of a personalization service that may be implemented within a media playback system, such as the media playback system 100 discussed above. The personalization service 1304 receives data from a player user data source 1302 and provides personalization instructions to a player 1306. Based on the instructions received from the personalization service 1304, the player 1306 may automatically apply a personalization setting or may offer a personalization setting suggestion to a user, as discussed further below. The player 1306 may be any blockchain-capable playback device 1000, playback device 110 or 210 discussed above, or may be any NMD 120, 320 discussed above, for example. The player user data source 1302 may include any one or more blockchain-capable playback devices 1000, playback devices 110, 210, NMDs 120, 310, or control devices 130 in the media playback system 100.

As shown in FIG. 13, in one example, the personalization service 1304 includes a data collector 1308, a model selector 1310, and a plurality of model managers 1312A-N. Each model manager 1312 is associated with a respective machine learning model 1322. For simplicity, in FIG. 13 components of only model manager 1312A are shown; however, it will be appreciated all other model managers 1312 include the same components. As shown, the model manager 1312A includes a data ingestion engine 1314, training data 1316, a trainer 1318, one or more sets of one or more parameters ("parameters") 1320 of the respective machine learning model 1322, the respective machine learning model 1322, and a recommendation engine 1324. Each of these components is described further below. The personalization service 1304 may be implemented, in whole or in part, on one or more network devices (e.g., blockchain-capable playback device 1000, playback devices 110, 210, NMDs 120, 320, or controller devices 130) within the media playback system 100, or may be implemented, in whole or in part, on a cloud network device 102, for example. The personalization service 1304 may be implemented in software or using any combination of hardware and software capable of performing the functions disclosed herein.

According to certain examples, the data collector 1308 collects input data from the player user data source 1302. The input data collected by the data collector 1308 can include any type of data representing user interactions with the media playback system 100 as well as context information (such as date, time, location, etc.) associated with the user interactions, and device configuration data (e.g., identity of playback device being affected by the user interaction, current volume level setting, whether the device is in a bonded group, and if so, with which other players, present location of the playback device, etc.). In various examples, the player user data source 1302 can be or include blockchain data, such as CERS, CNRS, or other suitable data accessed via a distributed ledger. For example, the input data associated with user interactions may include volume up or down commands, a command to select a particular audio content source, such as a particular playlist, audio streaming channel, radio station, etc., a command to group or ungroup one or more playback devices, and the like. The input data may also include movement or localization information (which may represent a user's relocation of a portable playback device from one position to another, for example) as may be obtained via the positioning system application 1200 discussed above, for example. Data collection may occur at various intervals over time. For example, a data collection event may occur each time a user interacts with a network device in the media playback system or may occur at other periodic or aperiodic times. The input data collected at each data collection event is used by the personalization service 1304 to learn user routines and to offer or apply personalization settings when a learned routine has been established.

According to certain examples, the model 1322 is a parameterized machine learning model configured to operate based on one or more features extracted from the collected input data. Examples of features may include the time of day, the day of the week, the type of user interaction (e.g., volume up/down, play, group, etc.), and the previous/existing setting for the corresponding playback device (e.g., previous volume that the playback device was set to, or previous bonded group setting for the playback device, etc.). The respective model 1322 associated with each of the model managers 1312A-N may operate based on different features. For example, different models may be applied for different personalization configurations, such as a volume level model, a bonded group model, etc., and different features may be relevant for these different personalization configurations. In one example of a volume level model, a set of features that can be used to learn trends in volume interactions includes: time since the start of the day (which allows the model to learn how volume interactions change over the course of the day), time since the start of the week (which allows the model to learn how volume interactions changeover the course of the week), previous volume (which may provide volume-related context for the interaction), and type of interaction (e.g., volume, volume down, or play, which allows the model to determine, based on a given current volume level, whether the volume should likely be increased, decreased, or kept the same). Similarly, sets of relevant features can be selected for other personalization models, as will be appreciated given the benefit of this disclosure.

In addition to selecting an appropriate feature set for each personalization model, different types of machine learning models can be selected for different applications. According to certain examples, it is desirable to select a machine learning model that is capable of adapting to a variety of different contexts and to shifting routines over time, that can accommodate uncertainty (e.g., by using confidence indicators, as discussed above), and that is capable of learning based on relatively little data (e.g., hundreds to thousands of data points, rather than millions of data points). In one example, the model 1322 is a Gaussian Process (GP) model. Gaussian Process models do not require large data sets, facilitate principled model uncertainty estimation, and can be tailored to specific tasks or patterns in the data through selection and/or configuration of the covariance function (kernel). Gaussian Process models can be used to interpret data with a strong periodic component (as many user behavioral patterns have) using a periodic kernel. Thus, a Gaussian Process model can be configured to encode periodic information related to user routines, which may be particularly relevant due to the strong periodicity present in many user interactions.

Examples of kernels that can be used for a Gaussian Process model 1322 include a Gaussian kernel, a Matern kernel, and a periodic kernel. In addition to these kernels, white noise kernels are also used in some examples to account for variation in the input data.

The Gaussian kernel is described by the function:

$$\sigma^2 \exp\left(-\frac{(x-x')^2}{2l^2}\right) \tag{F1}$$

In the function F1, l represents length scale, which is the learned parameter of the model. Using the Gaussian kernel, the similarity between data points increases with the square of their distance.

The Matern kernel is a generalization of the Gaussian kernel, allowing the smoothness of the corresponding function, F2, to be controlled via the parameter v. The additional flexibility allows the Matern kernel to adapt to "real world" data that may have significant variability. The Matern kernel is described by the function, F2:

$$\frac{1}{\Gamma(v)2^{v-1}}\left(\frac{\sqrt{2v}}{l}d(x,x')\right)^v K_v\left(\frac{\sqrt{2v}}{l}d(x,x')\right) \tag{F2}$$

In the function, F2, l represents length scale, which is the learned parameter of the model, and v is the smoothness parameter.

The periodic kernel is described by the function:

$$\sigma^2 \exp\left(\frac{-2\sin_2(\pi|x-x'|/p)}{l^2}\right) \tag{F3}$$

In the function, F3, l represents length scale and p represents periodicity, which are both learned parameters of the model. Using the periodic kernel, data points are similar if they occur in similar regions of a periodic function. For example, 7 pm on Tuesday may be similar to 6:45 pm on Wednesday.

In some examples of the model 1322, multiple kernels are combined in a Gaussian Process model to produce a more expressive covariance function. In addition, as discussed further below, in some examples, multiple models 1322 are combined to enhance the system's predictive performance based on the available input data.

Still referring to FIG. 13, in some examples, the data collector 1308 may process the input data according to the various features associated with the models 1322 to identify different player user data types and categorize the data accordingly. In addition, the data collector 1308 may also tag or categorize the input data based on certain contexts or identities associated with a given data collection event. For example, the data collector 1308 may categorize data received via voice commands from user A separately from data received via voice commands from user B, so as to allow the system to learn different patterns and personalization predictions for the two individual users. In another example, input data associated with a particular playback device or group of playback devices can be tagged to be associated with that particular playback device or group of playback devices. This may allow the system to learn different patterns regarding the same feature (e.g., volume personalization) that may apply to different playback devices. For example, a user may consistently choose certain volume settings when using the playback device 110f in the office 101e and consistently choose different volume settings when using the playback device 110c on the patio 101i. Player user data types can also be based on the type of command or activity detected, for example a volume level data type, a bonding group data type, an audio content selection data type, etc. Thus, for each data collection event, the data collection may categorize the corresponding input data into one or more player user data types. The data collector may also apply a time stamp to each collected player user data type since, as discussed above, many potential behavioral patterns have a time component. Accordingly, time information may be important for the system to correctly determine behavioral patterns and trends. The time stamp may include time of day as well as date information.

Once input data has been collected by the data collector 1308 during a data collection event, the personalization service 1304 can provide the input data, as processed by the data collector 1308, to one or more of the model managers 1312A-N to be used to train the respective model 1322 and/or to generate a personalization recommendation. As discussed above, different model managers 1312 (with their respective models 1322) can be used for different personalization settings, such as volume personalization or bonding personalization, for example. Accordingly, a given sample of input data acquired during a given data collection event may be relevant to one or more of the model managers 1312, but potentially not to others. For example, input data corresponding to a command to group two playback devices and localization information for the two playback devices is relevant to a bonding personalization model, but may not be relevant to a volume personalization model. Accordingly, the model selector 1310 can evaluate input data samples acquired by the data collector 1308 and direct the input data samples to the appropriate model managers 1312.

c. Example Methods Involving Blockchain-Capable Playback Devices with Generative Media Components and/or Generative Context and Control Components The integration of blockchain capabilities, generative media components, and generative context and control components within playback devices enables an array of useful applications. These technologies, when combined in whole or in part, may enable the delivery of enhanced, personalized, and context-aware media experiences. The following section outlines several example methods that demonstrate the potential of this integration, showcasing how blockchain-capable playback devices can utilize on-chain data as inputs for generative media creation, how real-time contextual information can influence both blockchain interactions and media generation, and how the outputs of generative processes can be recorded and utilized via distributed ledgers. The following examples are for purposes of illustration only, and many other such use-cases are possible.

FIGS. 14-17 are flow diagrams of example methods 1400, 1500, 1600, 1700, which can be implemented by any of the devices or systems described herein (e.g., the blockchain-capable playback device 1000 or any of the other devices described herein), or any other devices or systems now known or later developed. Various examples of the methods 1400, 1500, 1600, 1700 include one or more operations, functions, or actions illustrated by blocks. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

Figure 14:
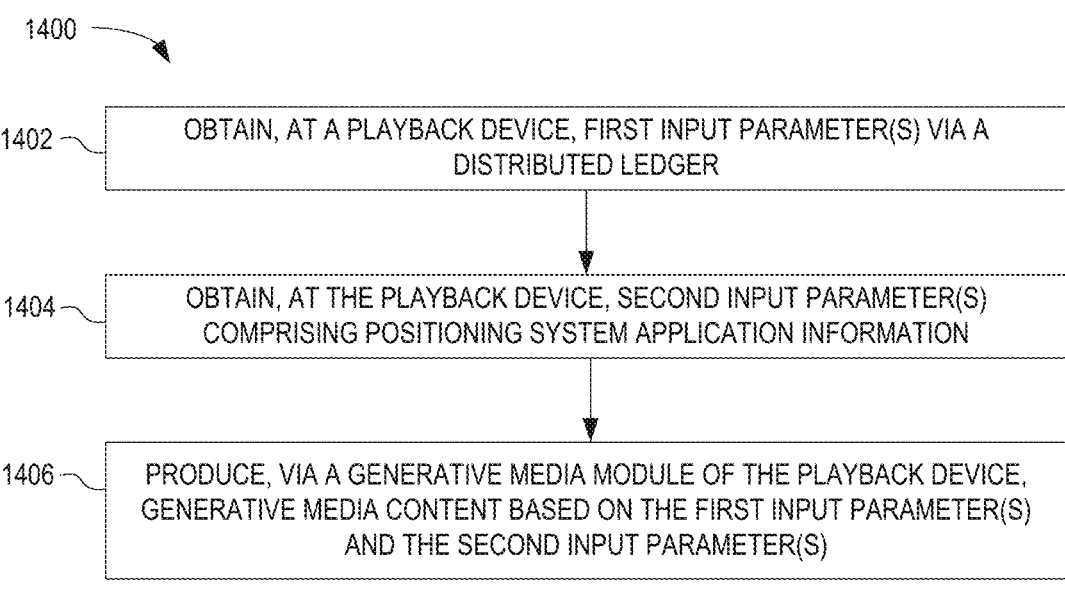

FIG. 14 illustrates a method 1400 for generating media content using a blockchain-capable playback device with integrated generative media components. This method leverages blockchain-stored data and/or real-time positioning information to create unique and contextualized audio experiences. The method begins at block 1402, where the playback device obtains first input parameter(s) via a distributed ledger. These parameters may include persistent or historical information such as user preferences, listening history, or other relevant data stored on the blockchain. In an example, this data can provide the context of the user's relatively long-term behavior and preferences, which can inform the generative process.

At block 1404, the playback device obtains second input parameter(s) comprising positioning system application information. This information represents dynamic, real-time data about the device's current context, such as its location within a room, the presence of other devices or users, or environmental factors. The positioning system application may utilize various technologies such as ultrasonic sensors, WiFi triangulation, or other localization methods to gather this data. In an example, the information obtained in connection with block 1404 is not obtained via a blockchain, and may instead be obtained directly from another network device, playback device, and/or playback device network.

Note, in some implementations of a method similar to method 1400, the playback device may not, or may optionally in a given implementation, obtain second input parameters. Further, such second input parameters may not, or may optionally in a given implementation, be obtained via a blockchain. That is, a playback device may obtain one or more sets of input parameters, and all such input parameters may be obtained only via a blockchain or may be obtained via a combination of a blockchain and directly from other devices and/or networks.

In block 1406, the playback device produces generative media content based on at least the obtained input parameters, such as the first input parameter(s) and the second input parameter(s) via a generative media module. In an example, this step involves using both the blockchain-derived historical data and the real-time positioning data as inputs for the generative model(s) within the generative media module. In some implementations, producing the generative media content in connection with block 1406 may be based on additional inputs and/or information than the input parameters obtained in connection with block 1402 and/or block 1404. In an alternative implementation, producing generative media content may be based on first input parameters such as those discussed with respect to block 1402, and the playback device may not necessarily also obtain and use second input parameters.

In some implementations, the input data may be preconditioned into a suitable format for generative models. This preconditioning can occur at various stages, including (i) at the time of initial collection/storage; (2) after data storage but before use; or (3) just prior to generative use. In the case of (1), the raw data could be processed and formatted as it is collected, ensuring it is immediately ready for use in generative models. In the case of (2), the playback device may periodically process stored data into appropriate formats, creating preconditioned datasets ready for rapid use. And in the case of (3), the playback device can format the data on-demand, allowing for the most up-to-date information to be included but potentially increasing processing time. The choice of when to precondition the data may depend on factors such as the computational capabilities of the playback device, the desired responsiveness of the system, and the rate at which the underlying data changes. Additionally or alternatively, the blockchain-obtained input parameters can be verified (e.g., to confirm provenance or other parameters as described above) before, during, or after use of the input parameters to produce generative media content.

By combining blockchain-stored historical data with real-time positioning information, the generative media module can create audio content that is not only personalized to the user's long-term preferences but also responsive to their immediate environment and context. This could result in generative audio that adapts its style, tempo, or other characteristics based on the user's location in a room, the time of day, or the presence of other individuals, all while maintaining consistency with the user's established tastes and preferences.

After producing the generative media content in connection with block 1406, the playback device may then cause the generative media content to be played back. In an example, this may include the playback device itself playing back the generative media content. In another example, this may include the playback device causing one or more other network devices, playback devices, and/or playback device networks to play back the generative media content, possibly together with the playback device itself.

Figure 15:
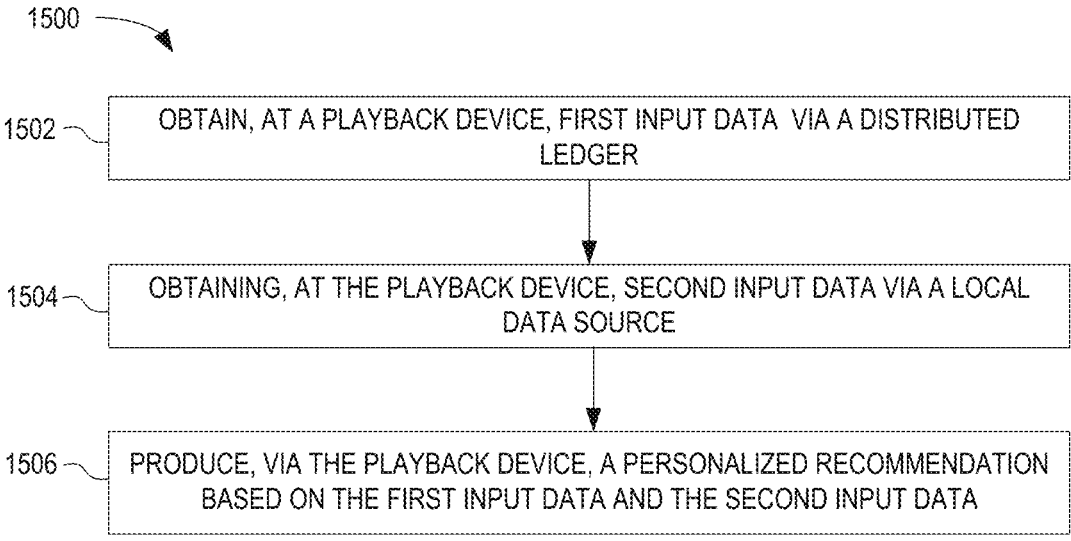

FIG. 15 illustrates a method 1500 for producing personalized recommendations using a blockchain-capable playback device with an integrated personalization service. This method combines blockchain-stored data with locally-stored information to generate contextualized and adaptive recommendations for media playback. The method begins at block 1502, where the playback device obtains first input data via a distributed ledger. This data can represent relatively persistent, historical information stored on-chain, which may include long-term user preferences, comprehensive listening history, and aggregated behavioral patterns. The blockchain layer allows for secure, tamper-resistant storage of this data, ensuring its integrity and availability across different devices or platforms.

At block 1504, the playback device obtains second input data via a local data source. This second input data can include dynamic, real-time information from the positioning system application and potentially other local sensors. It may include data such as the current location of the playback device within a room, the number of users present, the time of day, or other contextual information that can be determined by sensors or direct user input.

In block 1506, the playback device produces a personalized recommendation based on the first input data and the second input data. In various examples, the personalized recommendation may be a system recommendation, for instance relating to media playback, configuration of a media playback system, or for other aspects of the user's environment. T his step may involve the personalization service, acting as a recommendation engine, processing both the blockchain-derived historical data and the real-time local data to generate a "live" personalization recommendation tailored to the current context of the playback device and its environment. In some implementations, producing the personalized recommendation in connection with block 1506 may be based on additional inputs and/or information than the input parameters obtained in connection with block 1502 and/or block 1504. In an alternative implementation, producing the personalized recommendation may be based on first input parameters such as those discussed with respect to block 1502, and the playback device may not necessarily also obtain and use second input parameters. Additionally or alternatively, the blockchain-obtained input parameters can be verified (e.g., to confirm provenance or other parameters as described above) before, during, or after use of the input parameters to produce generative a personalized recommendation.

In an example, the personalization service can leverage historical data from the blockchain to understand long-term trends and preferences, while the real-time data allows for immediate responsiveness to the current situation. For example, the service might recommend different content or playback settings based on whether the user is alone or in a group, or adjust recommendations based on the time of day and the user's typical listening patterns at that time. Additional details regarding the use of blockchain data in generation of content can be found in International Patent Application No. PCT/US2023/066776, filed May 9, 2023, titled "Generating Digital Media Based on Blockchain Data," which is hereby incorporated by reference in its entirety for all purposes.

Moreover, the playback device can record transactions reflecting the playback of particular tracks on the blockchain layer, continuously enriching the historical dataset. This creates a feedback loop where current playback decisions inform future recommendations, allowing the system to learn and adapt over time.

The personalized recommendation produced in block 1506 could encompass various aspects of the media playback experience, such as content selection (e.g., suggesting specific tracks, albums, or playlists that align with both historical preferences and current context), playback settings (e.g., recommending appropriate volume levels, equalization settings, or spatial audio configurations based on the room layout and user presence), and/or device configuration (e.g., proposing optimal groupings of playback devices or suggesting transitions between devices as user move through different spaces).

After producing the personalized recommendation in connection with block 1506, the playback device may then cause the personalized recommendation to be implemented. In an example, this may include the playback device itself implementing the personalized recommendation. In another example, this may include the playback device causing one or more other network devices, playback devices, and/or playback device networks to implement the personalized recommendation, possibly together with the playback device itself.

FIG. 16 illustrates a method 1600 for a blockchain-enabled playback device to obtain and store data pertaining to a local generative model. The process begins at block 1602, where the playback device obtains data pertaining to a local generative model. This data could include user interactions, environmental inputs, or performance metrics of the generative model itself. The data obtained may be relevant to the local context of the playback device, potentially capturing unique usage patterns or environmental factors that influence the generative model's output. The local generative model can be a generative media model (e.g., the generative media module discussed above), or a model for generative context and control (e.g., the personalization service or recommendation engine discussed above).

In block 1604, the method proceeds with causing the data to be stored via a distributed ledger. This step involves preparing the obtained data for blockchain storage, which may include formatting, compression, or encryption as necessary. The distributed ledger could be a public blockchain for widely shareable data, a private blockchain for more sensitive information, or an intermediary ledger for temporary storage or further processing. By storing this data on a distributed ledger, the playback device contributes to a decentralized knowledge base that can potentially improve generative models across a network of devices.

FIG. 17 depicts a method 1700 for verifying and utilizing personalization information in a blockchain-enabled playback device. The process starts at block 1702, where the playback device obtains personalization information. This information could encompass user preferences, listening habits, or other data relevant to personalizing the media playback experience.

Moving to block 1704, the method involves verifying, via a distributed ledger, the personalization information. This step uses blockchain technology to authenticate the provenance of the data, ensuring it originates from genuine human-generated activity rather than AI-generated or synthetic sources. In some examples, the authentication may involve a Proof of Personhood (Pop) or other suitable protocol to verify a human source. In some instances, the PoP verification may be stored on a different blockchain than the underlying data being verified. In other examples, the PoP is stored in the same blockchain (and perhaps in the same block on the blockchain) as the underlying data. This verification process helps maintain the integrity and reliability of the personalization data used by the system.

Finally, in block 1706, the method concludes with modifying the operation of a media playback system, including the playback device, based on the verified personalization information. This step involves applying the authenticated personalization data to tailor the media playback experience. Modifications could include adjusting playback settings, curating content, or altering the behavior of the generative media module to align with the verified user preferences and behaviors.

In some examples, a blockchain-enabled playback device can be used to support (and/or be integrated within) extended reality (XR) devices such as heads-up displays, virtual reality visors or goggles, smartglasses, or any other suitable extended reality form factor. In many extended reality devices, it is desirable to generate out-loud immersive audio that adapts to both playback device positions and viewer locations within the virtual scene. This dynamic audio generation creates a more realistic and engaging XR environment, where sound behaves in ways that mirror real-world acoustic properties. Additional details regarding the production and management of out-loud audio to accompany extended reality displays can be found in U.S. Pat. No. 11,483,670, issued Oct. 25, 2022, titled "Systems and Methods of Providing Spatial Audio Associated with a Simulated Environment," ("Torgerson '670") which is hereby incorporated by reference in its entirety for all purposes.

The positioning of audio playback devices plays an important role in shaping these virtual scenes. By adjusting the virtual scene based on the physical locations of speakers or other audio output devices, the system can create a more seamless integration between the digital content and the user's physical environment. For example, if a user has a surround sound system, the virtual scene can be tailored to utilize each speaker's position for optimal audio placement within the XR experience. Torgerson '670 describes, for instance, transmitting device and/or listener locations to a media content provider (or other suitable service), which in turn, provides appropriately spatialized audio to provide a realistic three dimensional audio experience. In some examples, the playback device 1000 generates three dimensional audio (e.g., synthetic generative 3D audio) based on data received via the personalization service 1018, positioning system application, and/or one or more blockchain data sources described above, rather than an external or remote media content provider. In some examples, three dimensional audio is generated via a DAO rather than a media content provider.

Among examples, an XR-capable media playback system (or DAO) may adjust one or more aspects of the visual virtual content based on the playback device location data and/or acoustic properties of the room. For example, in response to receiving the locations of the playback devices relative to the walls and/or one or more dimensions of the room, the system may adjust the boundaries of the virtual scene. For instance, for some XR applications, it may be that matching the size of the virtual scene with the size of the room provides an improved listening environment for the user. In some cases, the system may adjust the boundary of the virtual scene to match or be slightly greater than an area defined by the playback devices. In some embodiments, the system may adjust the boundary of the virtual scene to be smaller than the area defined by the playback devices.

Utilizing blockchain technology in this context provides new possibilities for generating synthetic XR content. By accessing real-world device positions and user personalization data stored on a distributed ledger, an XR-capable media playback system (or DAO) can create customized and contextually relevant virtual scenes. This blockchain-based approach ensures that the generated content is not only personalized but also maintains a verifiable history of user preferences and device configurations, allowing for consistent experiences across different XR sessions or locations.

In some implementations, personalization and/or position data can be made available (via a blockchain or otherwise) as part of a "digital twin" metaverse. By making personalization and position data available via a blockchain, users can create virtual instances that closely mirror their real-world setups. This means that device locations, audio preferences, and other personalized settings in the virtual space can be automatically configured to match the user's physical environment. Such synchronization between real and virtual worlds enhances the immersive quality of the XR experience and provides a seamless transition between physical and digital realms.

Furthermore, the use of blockchain in this context offers additional benefits such as data portability and interoperability. Users can carry their personalized XR preferences and device configurations across different platforms or applications, ensuring a consistent experience regardless of the specific XR system being used. This blockchain-enabled continuity not only enhances user comfort and familiarity within virtual environments but also enables more complex and interconnected XR ecosystems where real-world and virtual elements coexist and interact with one another.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "example" means that a particular feature, structure, or characteristic described in connection with the example can be included in at least one example or embodiment of an invention. The appearances of this phrase in various places in the specification are not necessarily all referring to the same example, nor are separate or alternative examples mutually exclusive of other examples. As such, the examples described herein, explicitly and implicitly understood by one skilled in the art, can be combined with other examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present technology can be practiced without certain, specific details. In other instances, well known methods, procedures, components, and circuitry have not been described in detail to avoid unnecessarily obscuring aspects of the examples. Accordingly, the scope of the present disclosure is defined by the appended claims rather than the foregoing description of examples.

When any of the appended claims are read to cover a purely software and/or firmware implementation, at least one of the elements in at least one example is hereby expressly defined to include a tangible, non-transitory medium such as a memory, DV D, CD, Blu-ray, and so on, storing the software and/or firmware.

The disclosed technology is illustrated, for example, according to various examples described below. Various examples of examples of the disclosed technology are described as numbered examples (1, 2, 3, etc.) for convenience. These are provided as examples and do not limit the disclosed technology. It is noted that any of the dependent examples may be combined in any combination, and placed into a respective independent example. The other examples can be presented in a similar manner.

Example 1. A method comprising: accessing data stored on a distributed ledger to obtain a content experience record set (CERS); receiving a request to play back media content via a playback device, wherein the request is associated with the CERS; playing back the media content via the playback device; and after playing back the media content, causing the CERS to be modified.

Example 2. The method of any one of the preceding Examples, wherein transmitting the request to update the CERS comprises transmitting a request to add a record entry to the CERS based on playing back the media content.

Example 3. The method of any one of the preceding Examples, wherein the CERS comprises a set of media consumption events and event information corresponding to each respective media consumption event in the set of media consumption events.

Example 4. The method of any one of the preceding Examples, wherein the event information includes one or more of: an event time; an associated playback device; an associated playback group; an associated household; an associated playback network; an associated media service; user preferences; an entity associated with adding the media consumption event record; source data corresponding to the media consumption event record; media content metadata; transport controls associated with the media consumption event; a pointer to a smart contract comprising playlist data; or a pointer to a non-fungible token comprising playlist data with a playlist.

Example 5. The method of any one of the preceding Examples, wherein a particular media consumption event comprises one or more of: initiating media playback, modifying media playback, loading a media playlist, or modifying a media playlist.

Example 6. The method of any one of the preceding Examples, wherein the CERS is associated with an identifier.

Example 7. The method of any one of the preceding Examples, wherein the identifier is a unique distributed identifier associated with a user, a device, or an account.

Example 8. The method of any one of the preceding Examples, wherein the CERS is stored on the distributed ledger.

Example 9. The method of any one of the preceding Examples, wherein CERS comprises first data stored on the distributed ledger, and wherein causing the CERS to be modified comprises causing additional data to be appended to the CERS first data stored on the distributed ledger.

Example 10. The method of any one of the preceding Examples, wherein the CERS is stored via an intermediary computing device in communication with the distributed ledger.

Example 11. The method of any one of the preceding Examples, wherein the CERS comprises first data stored via the intermediary computing device, and wherein causing the CERS to be modified comprises causing the CERS first data stored on the intermediary computing device to be updated, the method further comprising causing second data to be added to the distributed ledger that reflects the modified CERS data stored on the intermediary computing device.

Example 12. The method of any one of the preceding Examples, wherein first pointer data corresponding to the CERS first data is stored directly on the distributed ledger, and wherein causing the second data to be added to the distributed ledger that reflects the modified CERS data stored on the intermediary computing device comprises causing an entry to be added to the distributed ledger indicating that the first pointer data corresponds to the modified CERS data.

Example 13. The method of any one of the preceding Examples, wherein the intermediary computing device supports an intermediary distributed ledger (e.g., temporary blockchain; private blockchain, etc.) to store the CERS.

Example 14. The method of any one of the preceding Examples, wherein the intermediary distributed ledger is supported by a plurality of intermediary computing devices (e.g., multiple playback devices within a household).

Example 15. The method of any one of the preceding Examples, wherein at least a portion of the CERS is stored directly on the distributed ledger.

Example 16. The method of any one of the preceding Examples, wherein at least a portion of the CERS is stored on an intermediary computing device without being stored directly on the distributed ledger.

Example 17. The method of any one of the preceding Examples, wherein the data is first data, and wherein causing the CERS to be modified comprises causing second data to be written to distributed ledger.

Example 18. The method of any one of the preceding Examples, wherein causing the CERS to be modified comprises transmitting a request to update the CERS to an intermediary computing device, wherein the intermediary computing device causes data to be written to the distributed ledger including batches of updates to a plurality of different CERS associated with different identifiers.

Example 19. The method of any one of the preceding Examples, further comprising, before causing the CERS to be modified, receiving an input authorizing an update the CERS.

Example 20. The method of any one of the preceding Examples, wherein: receiving the request comprises receiving the request via the playback device; and causing the CERS to be modified comprises transmitting, via the playback device, a request to modify the CERS.

Example 21. The method of any one of the preceding Examples, wherein: receiving the request comprises receiving the request via one or more computing devices associated with a media content service; playing back the media content via the playback device comprises transmitting the media content from the one or more computing devices associated with the media content service to the playback device for playback; and causing the CERS to be modified comprises transmitting, via the one or more computing devices associated with the media content service, a request to modify the CERS.

Example 22. The method of any one of the preceding Examples, wherein causing the CERS to be modified does not comprise transmitting, via the playback device, a request to modify the CERS.

Example 23. The method of any one of the preceding Examples, further comprising causing a user prompt to be output, the user prompt indicating an identified redundancy in the CERS.

Example 24. The method of any one of the preceding Examples, further comprising, after causing the user prompt to be output, transmitting a reconciliation instruction to update the CERS.

Example 25. The method of any one of the preceding Examples, further comprising accessing second data stored on the distributed ledger to obtain a content network record set (CNRS).

Example 26. The method of any one of the preceding Examples, wherein the CERS is associated with an identifier, and wherein the CNRS is associated with the same identifier.

Example 27. The method of any one of the preceding Examples, wherein the CNRS comprises a record of devices, media playback systems, and/or media content services associated with the identifier.

Example 28. The method of any one of the preceding Examples, wherein the distributed ledger is a first distributed ledger maintained by a first plurality of distributed computing devices, wherein a first instance of the CERS is stored via the first distributed ledger, and wherein a second instance of the CERS is stored via a second distributed ledger maintained by a second plurality of distributed computing devices, and wherein causing the CERS to be modified comprises causing both the first instance of the CERS and the second instance of the CERS to be modified on the first distributed ledger and the second distributed ledger, respectively.

Example 29. The method of any one of the preceding Examples, wherein causing the CERS to be modified comprises causing the CERS to be modified based on one or more trigger conditions.

Example 30. The method of any one of the preceding Examples, wherein causing the CERS to be modified based on one or more trigger conditions comprises causing the CERS to be modified: at predetermined intervals (e.g., hourly, daily, weekly monthly); after each media consumption event; after a threshold number of media consumption events; or after a user prompt.

Example 31. The method of any one of the preceding Examples, wherein the CERS comprises publicly accessible CERS data, the method further comprising, after playing back the media content, causing a comprehensive content record set to be updated, the comprehensive content record set including both the publicly accessible CERS data and data that is not publicly accessible.

Example 32. The method of any one of the preceding Examples, wherein the playback device is a first playback device, the method further comprising accessing, via a second device, data stored on the distributed ledger to obtain the CERS.

Example 33. The method of any one of the preceding Examples, wherein the second device comprises: a second playback device associated with the first playback device (e.g., within the same household).

Example 34. The method of any one of the preceding Examples, wherein the second device is not associated with the first playback device (e.g., another user's device, a device associated with a participating service provider, etc.).

Example 35. The method of any one of the preceding Examples, further comprising signing, via the playback device, a transaction associated with the distributed ledger.

Example 36. The method of any one of the preceding Examples further comprising causing, via the playback device, one or more tokens associated with the distributed ledger to be transferred to a destination address.

Example 37. The method of any one of the preceding Examples, further comprising interacting, via the playback device, with a smart contract running via the distributed ledger.

Example 38. The method of any one of the preceding Examples, further comprising validating, via the playback device, transactions via the distributed ledger.

Example 39. The method of any one of the preceding Examples, further comprising staking, via the playback device, one or more tokens via the distributed ledger.

Example 40. The method of any one of the preceding Examples, further comprising causing, via the playback device, token rewards associated with the distributed ledger to be received at a designated recipient address.

Example 41. The method of any one of the preceding Examples, wherein the designated recipient address is associated with the playback device or with a user account associated with the playback device.

Example 42. The method of any one of the preceding Examples, wherein the playback device comprises a blockchain-capable playback device having one or more special-purposes processors configured to interact with the distributed ledger.

Example 43. The method of any one of the preceding Examples, wherein the one or more special-purpose processors are configured to perform mining, staking, or validating processes associated with the distributed ledger.

Example 44. The method of any one of the preceding Examples, wherein the blockchain-capable playback device is configured to run a node of the distributed ledger.

Example 45. The method of any one of the preceding Examples, wherein the blockchain-capable device is configured to run a wallet associated with the distributed ledger.

Example 46. A method comprising: obtaining, at a playback device, first input parameter(s) via a distributed ledger (e.g., on-chain persistent/historical information); obtaining, at the playback device, second input parameter(s) comprising positioning system application information (e.g., dynamic, real-time information); and producing, via a generative media module of the playback device, generative media content based on the first input parameter(s) and the second input parameter(s) (e.g., pre-conditioning of positioning/personalization model data into suitable prompt for input to generative models).

Example 47. A method comprising: obtaining, at a playback device, first input data via a distributed ledger (e.g., on-chain persistent/historical information); obtaining, at the playback device, second data via a local data source (e.g., positioning system application information such as dynamic/real-time and/or local device/network stored information; examples include user's location, activity, number of users present, time of day, or any other input); and producing, via the playback device, a personalized recommendation for media playback based on the first input data and the second input data (e.g., "live" personalization recommendation that is updated dynamically).

Example 48. A method comprising: obtaining, at a playback device, data pertaining to a local generative model (e.g., personalization service or generative media module; data can be for immediate use via generative model); and causing the data to be stored via a distributed ledger (e.g., public, private, and/or intermediary).

Example 49. A method comprising: obtaining, at a playback device, personalization information (e.g., positioning system and/or personalization service information); verifying, via a distributed ledger, the personalization information (e.g., verifying provenance, verifying source as human-generated activity rather than AI-generated or synthetic); and modifying operation of a media playback system including the playback device based on the personalization information.

Example 50. A method comprising: obtaining, at a playback device via a blockchain, first information; obtaining, at a playback device, second information; executing, by the playback device, a generative model, wherein executing the generative model comprises: generating, based on at least the obtained first information and the obtained second information, a generative-model output; and implementing the generative-model output.

Example 51. The method of claim A1, wherein the second information comprises one or more of: (a) information obtained from another playback device; (b) information obtained via a sensor of the playback device; or (c) a control instruction obtained via a control device.

Example 52. The method of any of Examples 50-51, wherein obtaining the first information comprises: obtaining, from the blockchain, information regarding an off-chain storage system; and accessing the off-chain storage system.

Example 53. The method of any of Examples 50-52, wherein the generative model comprises a generative media module.

Example 54. The method of any of Examples 50-53, wherein the generative model comprises a machine learning model.

Example 55. The method of any of Examples 50-54, wherein the generative model comprises a recommendation engine.

Example 56. The method of any of Examples 50-55, wherein the generative model comprises a parameterized machine learning model.

Example 57. The method of any of Examples 50-56, wherein the generative model comprises a Gaussian Process model.

Example 58. The method of any of Examples 50-57, wherein the generative-model output comprises generative media content.

Example 59. The method of Example 58, wherein implementing the generative-model output comprises causing at least a portion of the generative media content to be played back by the playback device.

Example 60. The method of Example 58, wherein implementing the generative-model output comprises causing at least a portion of the generative media content to be played back by another playback device.

Example 61. The method of any of Examples 50-56, wherein the generative-model output comprises a system recommendation.

Example 62. The method of Example 61, wherein implementing the generative-model output comprises causing at least a portion of the system recommendation to be implemented by the playback device.

Example 63. The method of Example 61, wherein implementing the generative-model output comprises causing at least a portion of the system recommendation to be implemented by another playback device.

Example 64. The method of any of Examples 50-63, wherein the generative model is a first generative model, and wherein the generative-model output is a first generative-model output, the method further comprising: executing, by the playback device, a second generative model, wherein executing the second generative model comprises: generating a second generative-model output;

Example 65. The method of Example 64, wherein the first generative-model output comprises generative media content, and wherein the second generative-model output comprises a system recommendation.

Example 66. The method of any of Examples 50-65, the method further comprising: validating one or more aspects of the obtained first information.

Example 67. The method of any of Examples 50-66, the method further comprising: causing at least a portion of the generated generative-model output to be stored via the blockchain.

Example 68. The method of any of Examples 50-67, the method further comprising: causing an indication of the implementation of the generated generative-model output to be stored via the blockchain.

Example 69. The method of any of Examples 50-68, the method further comprising: causing at least a portion of the obtained second information to be stored via the blockchain.

Example 70. One or more tangible, non-transitory computer-readable media storing instructions that, when executed by one or more processors, cause the one or more processors to perform operations comprising the method of any one of the preceding Examples.

Example 71. A media playback system comprising: one or more processors; and the one or more computer-readable media of Example 70.

Example 72. A playback device comprising: one or more processors; and the one or more computer-readable media of Example 70.

The invention claimed is:

1. A computing system, comprising:

one or more processors;

memory storing instructions that, when executed by the one or more processors, cause the computing system to perform operations comprising:

receiving input data;

accessing, based on the received input data, first data stored on a first distributed ledger, wherein the first distributed ledger comprises a permissioned or partially permissioned distributed ledger implemented via a local network of devices that includes a first network device, and wherein a data attestation corresponding to at least a portion of the first data is periodically transmitted to a network address associated with a second distributed ledger comprising a public or permissionless distributed ledger;

generating, via one or more machine learning models based on the first data, an output comprising a recommendation; and causing the first network device to perform an operation according to the recommendation in the generated output.

2. The computing system of claim 1, wherein receiving the input data comprises detecting at least one of: a current time, user interaction with the first network device, or a location of the first network device.

3. The computing system of claim 1, wherein the input data comprises a voice command.

4. The computing system of claim 1, wherein the input data is received via the first network device.

5. The computing system of claim 1, wherein the input data is received via a second network device.

6. The computing system of claim 1, wherein the first data comprises media content consumption history data associated with a user of the first network device.

7. The computing system of claim 6, wherein the media content comprises at least one of: audio content, video content, photographs, or social media content.

8. The computing system of claim 1, wherein the distributed ledger comprises a blockchain implemented via a local network of media playback devices that includes the first network device.

9. The computing system of claim 1, wherein the second distributed ledger comprises a public blockchain.

10. The computing system of claim 1, wherein generating the output comprises generating a confidence metric corresponding to the recommendation in the generated output.

11. The computing system of claim 1, wherein the generated output comprises a recommended setting associated with the first network device.

12. The computing system of claim 1, wherein the generated output comprises media content and wherein causing the first network device to perform the operation comprises causing the first network device to play back the media content.

13. The computing system of claim 1, wherein the one or more machine learning models comprises one or more generative artificial intelligence (AI) models.

14. The computing system of claim 13, wherein at least one of the one or more generative artificial intelligence (AI) models resides on the first network device.

15. The computing system of claim 13, wherein at least one of the one or more generative artificial intelligence (AI) models comprises a transformer model.

16. The computing system of claim 1, wherein the first data comprises a record of media consumption events from a plurality of different media service providers.

17. A playback device, comprising:

one or more processors;

memory storing instructions that, when executed by the one or more processors, cause the playback device to perform operations comprising:

receiving input data;

accessing, based on the received input data, first data stored on a first distributed ledger, wherein the first distributed ledger comprises a permissioned or partially permissioned distributed ledger implemented via a local network of devices that includes the playback device, and wherein a data attestation corresponding to at least a portion of the first data is periodically transmitted to a network address associated with a second distributed ledger comprising a public or permissionless distributed ledger;

generating, via one or more machine learning models based on the first data, an output comprising a recommendation; and playing back media content according to the recommendation in the generated output.

18. The playback device of claim 17, wherein receiving the input data comprises detecting at least one of: a current time, user interaction with the playback device, or a location of the playback device.

19. The playback device of claim 17, wherein the input data comprises a voice command.

20. The playback device of claim 17, wherein the input data is received via the playback device.

21. The playback device of claim 17, wherein the input data is received via a second device in communication with the playback device.

22. The playback device of claim 17, wherein the first data comprises media content consumption history data associated with a user of the playback device.

23. The playback device of claim 17, wherein the first distributed ledger comprises a blockchain implemented via a local network of media playback devices that includes the playback device.

24. The playback device of claim 17, wherein the second distributed ledger comprises a public blockchain.

25. The playback device of claim 17, wherein generating the output comprises generating a confidence metric corresponding to the recommendation.

26. The playback device of claim 17, wherein the generated output comprises a recommended playback setting associated with the playback device.

27. The playback device of claim 17, wherein the one or more machine learning models comprises one or more generative artificial intelligence (AI) models.

28. A method, comprising:

receiving input data;

accessing, based on the received input data, first data stored on a first distributed ledger, wherein the first distributed ledger comprises a permissioned or partially permissioned distributed ledger implemented via a local network of devices that includes a first network device, and wherein a data attestation corresponding to at least a portion of the first data is periodically transmitted to a network address associated with a second distributed ledger comprising a public or permissionless distributed ledger;

generating, via one or more machine learning models based on the first data, an output comprising a recommendation; and causing a network device to perform an operation according to the recommendation in the generated output.

29. One or more tangible, non-transitory computer-readable media storing instructions that, when executed by one or more processors of a computing system, cause the computing system to perform the method of claim 28.

\* \* \* \* \*